(12) United States Patent
Fu et al.

(10) Patent No.: US 12,473,337 B2
(45) Date of Patent: Nov. 18, 2025

(54) HOMODIMERIC OR HETERODIMERIC INTERLEUKIN 12 FUSION PROTEINS, AND COMPOSITIONS AND THERAPEUTIC METHODS THEREOF

(71) Applicant: Shanghai KangaBio Co., Ltd., Shanghai (CN)

(72) Inventors: Yang-Xin Fu, Dallas, TX (US); Hua Peng, Beijing (CN); Diyuan Xue, Beijing (CN)

(73) Assignee: Shanghai Kangabio Co., Limited, Shanghai (CN)

( * ) Notice: Subject to any disclaimer, the term of this patent is extended or adjusted under 35 U.S.C. 154(b) by 914 days.

(21) Appl. No.: 17/049,021

(22) PCT Filed: Apr. 24, 2019

(86) PCT No.: PCT/US2019/028933
§ 371 (c)(1),
(2) Date: Oct. 19, 2020

(87) PCT Pub. No.: WO2019/209965
PCT Pub. Date: Oct. 31, 2019

(65) Prior Publication Data
US 2022/0162280 A1    May 26, 2022

(30) Foreign Application Priority Data

Apr. 25, 2018 (CN) .......................... 201810376920.1

(51) Int. Cl.
*C07K 14/54* (2006.01)
*A61K 38/00* (2006.01)
*A61P 35/00* (2006.01)

(52) U.S. Cl.
CPC .......... *C07K 14/5434* (2013.01); *A61P 35/00* (2018.01); *A61K 38/00* (2013.01); *C07K 2319/02* (2013.01); *C07K 2319/30* (2013.01)

(58) Field of Classification Search
CPC ............ C07K 14/5434; C07K 14/7155; C07K 2319/02; A61K 38/00
See application file for complete search history.

(56) References Cited

U.S. PATENT DOCUMENTS

| | | |
|---|---|---|
| 5,116,964 A | 5/1992 | Capon et al. |
| 5,480,981 A | 1/1996 | Goodwin et al. |
| 5,808,029 A | 9/1998 | Brockhaus et al. |
| 7,732,570 B2 | 6/2010 | Hinton et al. |
| 7,754,855 B1 | 7/2010 | Cox, III et al. |
| 2008/0311655 A1 | 12/2008 | Gillies et al. |

FOREIGN PATENT DOCUMENTS

| | | | | |
|---|---|---|---|---|
| CA | 3033475 | * | 2/2018 | ............ C07K 14/54 |
| CA | 3033475 A1 | | 2/2018 | |
| EP | 1418184 A1 | | 5/2004 | |
| EP | 3184548 A1 | * | 6/2012 | ............ C07K 16/30 |
| NO | 1997020062 A1 | | 6/1997 | |
| WO | 1997034631 A1 | | 9/1997 | |
| WO | 1998028427 A1 | | 7/1998 | |
| WO | 2007023614 A1 | | 3/2007 | |
| WO | 2007069090 A1 | | 6/2007 | |
| WO | 2018030806 A1 | | 2/2018 | |

OTHER PUBLICATIONS

Jung et al. (2018) OncoImmunology, 7, 7, p. e1438800.
Puskas et al. (2011) Immunology, 133, 2, 206-220.
CN 201810376920.A, Office Action and Notice of Grant.
EP 19792585.2, Extended European Search Report (2021).
PCT/US2019/028933, Int'l Search Report and Written Opinion (2019).
Eurasian Patent Application No. 202092459, Office Action, Aug. 29, 2022.
Glassman, Caleb R., et al., "Structural basis for IL-12 and IL-23 receptor sharing reveals a gateway for shaping actions on T versus NK cells," Cell, Feb. 18, 2021, 184, pp. 983-999.
Wojno, Elia D. Tait, et al., "The Immunobiology of the Interleukin-12 Family: Room for Discovery," Immunity Review, Apr. 16, 2019, 50, pp. 851-870.
Altschul, Stephen F., et al. "Basic local alignment search tool." Journal of molecular biology 215.3 (1990): 403-410.
Altschul, Stephen F., et al. "Webb Miller kαl David J. Lipman. Gapped blast and psiblast: a new generation of protein database search programs." Nucleic acids research 25.17 (1997): 3389-3402.
Angiolillo, Anne L., Cecilia Sgadari, and Giovanna Tosato. "A role for the interferon-inducible protein 10 in inhibition of angiogenesis by interleukin-12." Annals of the New York Academy of Sciences 795 (1996): 158-167.
Angiolillo, Anne L., et al. "Human interferon-inducible protein 10 is a potent inhibitor of angiogenesis in vivo." The Journal of experimental medicine 182.1 (1995): 155-162.
Arenberg, Douglas A., et al. "Interferon-gamma-inducible protein 10 (IP-10) is an angiostatic factor that inhibits human non-small cell lung cancer (NSCLC) tumorigenesis and spontaneous metastases." The Journal of experimental medicine 184.3 (1996): 981-992.
Batzer, Mark A., James E. Carlton, and Prescott L. Deininger. "Enhanced evolutionary PCR using oligonucleotides with inosine at the 3'-terminus." Nucleic acids research 19.18 (1991): 5081.
Capon, Daniel J., et al. "Designing CD4 immunoadhesins for AIDS therapy." Nature 337.6207 (1989): 525-531.
Chamow, Steven M., and Avi Ashkenazi. "Immunoadhesins: principles and applications." Trends in biotechnology 14.2 (1996): 52-60.

(Continued)

*Primary Examiner* — Elly-Gerald Stoica
(74) *Attorney, Agent, or Firm* — Edwin S. Flores; Daniel J. Chalker; Chalker Flores, LLP

(57) ABSTRACT

The invention provides novel fusion proteins of Interleukin 12 and prodrugs, and compositions and methods of preparation thereof, useful in treating various diseases and disorders (e.g., hyperplasia, solid tumor or hematopoietic malignancy).

19 Claims, 13 Drawing Sheets

Specification includes a Sequence Listing.

(56) References Cited

OTHER PUBLICATIONS

Chan, Susan H., et al. "Induction of interferon gamma production by natural killer cell stimulatory factor: characterization of the responder cells and synergy with other inducers." The Journal of experimental medicine 173.4 (1991): 869-879.

Colombo, Mario P., and Giorgio Trinchieri. "Interleukin-12 in anti-tumor immunity and immunotherapy." Cytokine & growth factor reviews 13.2 (2002): 155-168.

Dias, Sergio, Hilary Thomas, and Frances Balkwill. "Multiple molecular and cellular changes associated with tumour stasis and regression during IL-12 therapy of a murine breast cancer model." International journal of cancer 75.1 (1998): 151-157.

Dias, Sergio, Robert Boyd, and Frances Balkwill. "IL-12 regulates VEGF and MMPs in a murine breast cancer model." International journal of cancer 78.3 (1998): 361-365.

Fleer, Reinhard. "Engineering yeast for high level expression." Current opinion in biotechnology 3.5 (1992): 486-496.

Handel-Fernandez, Mary Ellen, et al. "Down-regulation of IL-12, not a shift from a T helper-1 to a T helper-2 phenotype, is responsible for impaired IFN-gamma production in mammary tumor-bearing mice." Journal of immunology (Baltimore, MD.: 1950) 158.1 (1997): 280-286.

Kobayashi, Michiko, et al. "Identification and purification of natural killer cell stimulatory factor (NKSF), a cytokine with multiple biologic effects on human lymphocytes." The Journal of experimental medicine 170.3 (1989): 827-845.

Lasek, Witold, Radosław Zagożdżon, and Marek Jakobisiak. "Interleukin 12: still a promising candidate for tumor immunotherapy?." Cancer Immunology, Immunotherapy 63 (2014): 419-435.

Lieberman, Michael D., et al. "Natural killer cell stimulatory factor (NKSF) augments natural killer cell and antibody-dependent tumoricidal response against colon carcinoma cell lines." Journal of Surgical Research 50.4 (1991): 410-415.

Lindgren, Maria, et al. "Cell-penetrating peptides." Trends in pharmacological sciences 21.3 (2000): 99-103.

Lundberg, Mathias, Sara Wikström, and Magnus Johansson. "Cell surface adherence and endocytosis of protein transduction domains." Molecular Therapy 8.1 (2003): 143-150.

Majewski, Slawomir, et al. "Interleukin-12 inhibits angiogenesis induced by human tumor cell lines in vivo." Journal of investigative dermatology 106.5 (1996): 1114-1118.

Ohtsuka, Eiko, et al. "An alternative approach to deoxyoligonucleotides as hybridization probes by insertion of deoxyinosine at ambiguous codon positions." Journal of Biological Chemistry 260.5 (1985): 2605-2608.

Rossolini, Gian Maria, et al. "Use of deoxyinosine-containing primers vs degenerate primers for polymerase chain reaction based on ambiguous sequence information." Molecular and Cellular Probes 8.2 (1994): 91-98.

Schwarze, Steven R., and Steven F. Dowdy. "In vivo protein transduction: intracellular delivery of biologically active proteins, compounds and DNA." Trends in Pharmacological Sciences 21.2 (2000): 45-48.

Sgadari, Cecilia, Anne L. Angiolillo, and Giovanna Tosato. "Inhibition of angiogenesis by interleukin-12 is mediated by the interferon-inducible protein 10." (1996): 3877-3882.

Smyth Templeton, Nancy. "Liposomal delivery of nucleic acids in vivo." DNA and Cell Biology 21.12 (2002): 857-867.

Snyder, Eric L., and Steven F. Dowdy. "Cell penetrating peptides in drug delivery." Pharmaceutical research 21 (2004): 389-393.

Voest, Emile E., et al. "Inhibition of angiogenesis in vivo by interleukin 12." JNCI: Journal of the National Cancer Institute 87.8 (1995): 581-586.

Wigginton, Jon M., et al. "Interleukin 12 primes macrophages for nitric oxide production in vivo and restores depressed nitric oxide production by macrophages from tumor-bearing mice: implications for the antitumor activity of interleukin 12 and/or interleukin 2." Cancer research 56.5 (1996): 1131-1136.

Jones, L., et al., "Molecular interactions within the IL-6/IL-12 cytokine/receptor superfamily," Immunol. Res., Oct. 2011, vol. 51(1), pp. 5-14.

Kridel, S.J., et al., "A Unique Substrate Binding Mode Discriminates Membrane Type-1 Matrix Metalloproteinase from Other Matrix Metalloprteinases," The Journal of Biological Chemistry, Jun. 28, 2002, vol. 277, No. 26, pp. 23788-23793.

Schröeder, J., et al., "Non-Canonical Interleukin 23 Receptor Complex Assembly, P40 Protein Recruits Interleukin 12 Receptor B1 via Site II and Induces P19/Interleukin 23 Receptor Interaction via Site III," The Journal of Biological Chemistry, Jan. 2, 2015, vol. 290, No. 1, pp. 359-3370.

Turk, B.E., et al., "Determination of Protease cleavage site motifs using mixture-based oriented peptide libraries," Nature Biotechnology, Jul. 2001, vol. 19, pp. 661-667.

* cited by examiner

FIG. 5
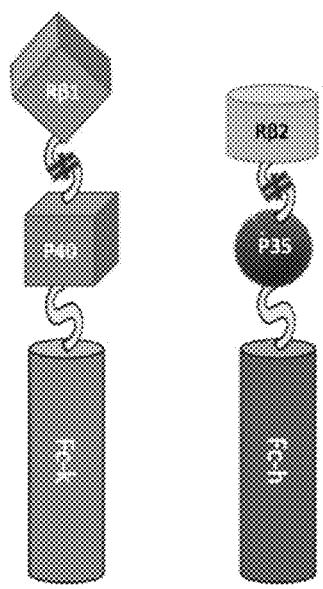
FUG. 6
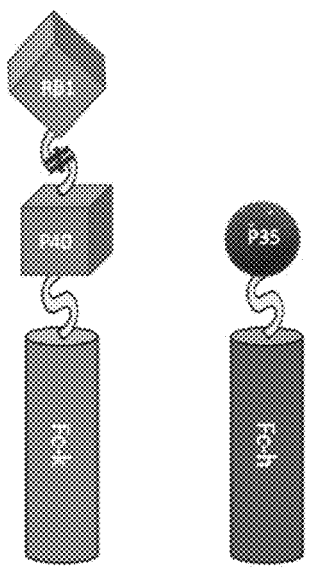

Mouse IL12

FIG. 9
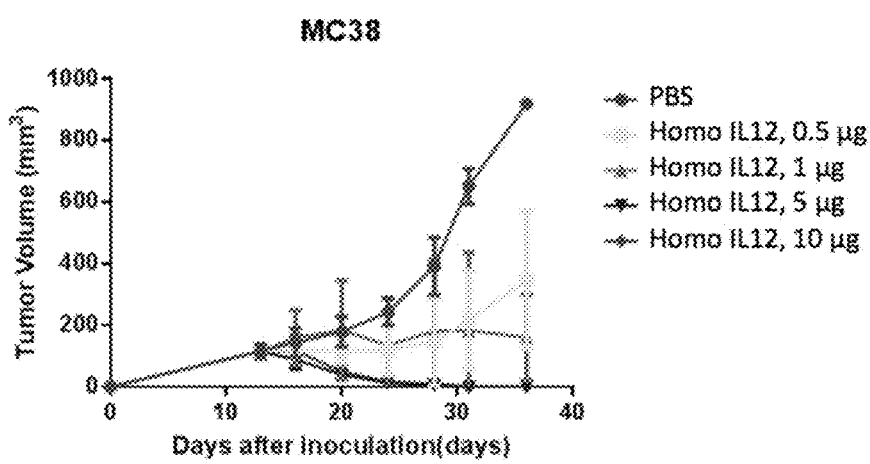
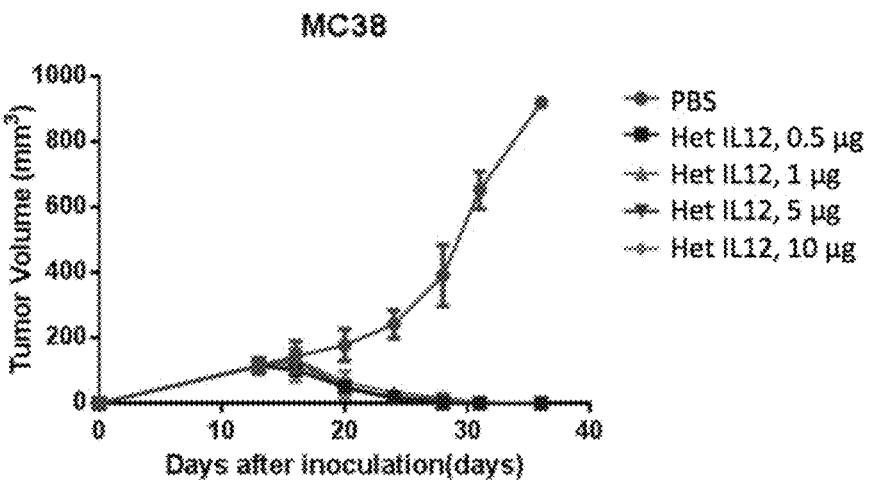

FIG. 11
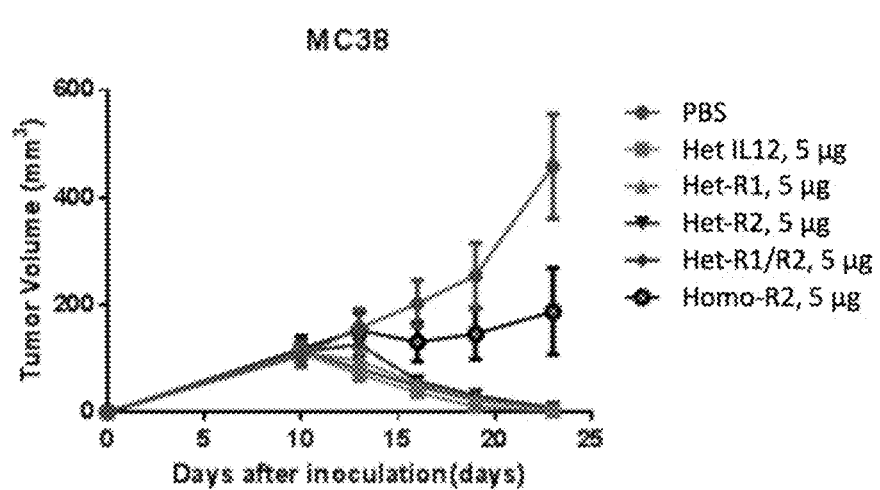
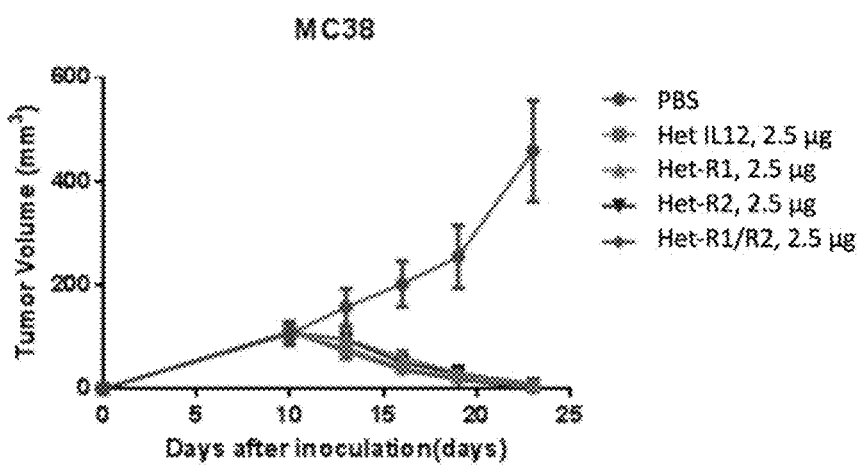

FIG. 12 (cont'd)
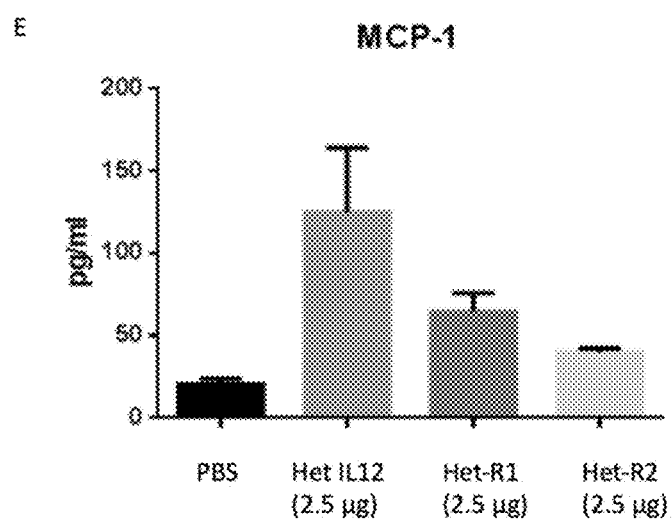
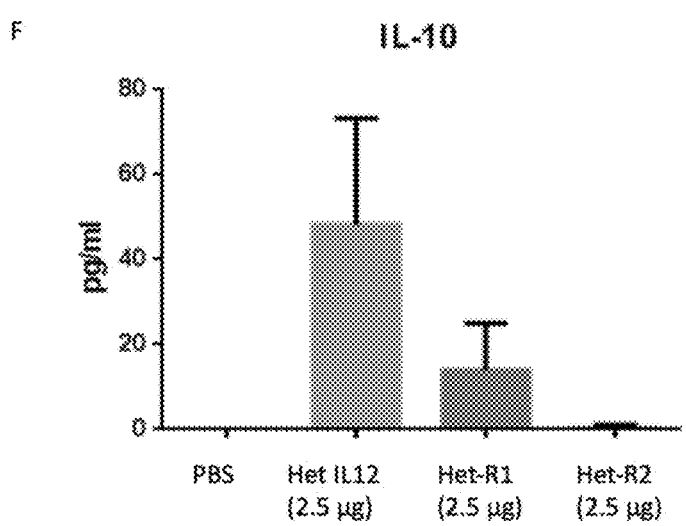

FIG. 14
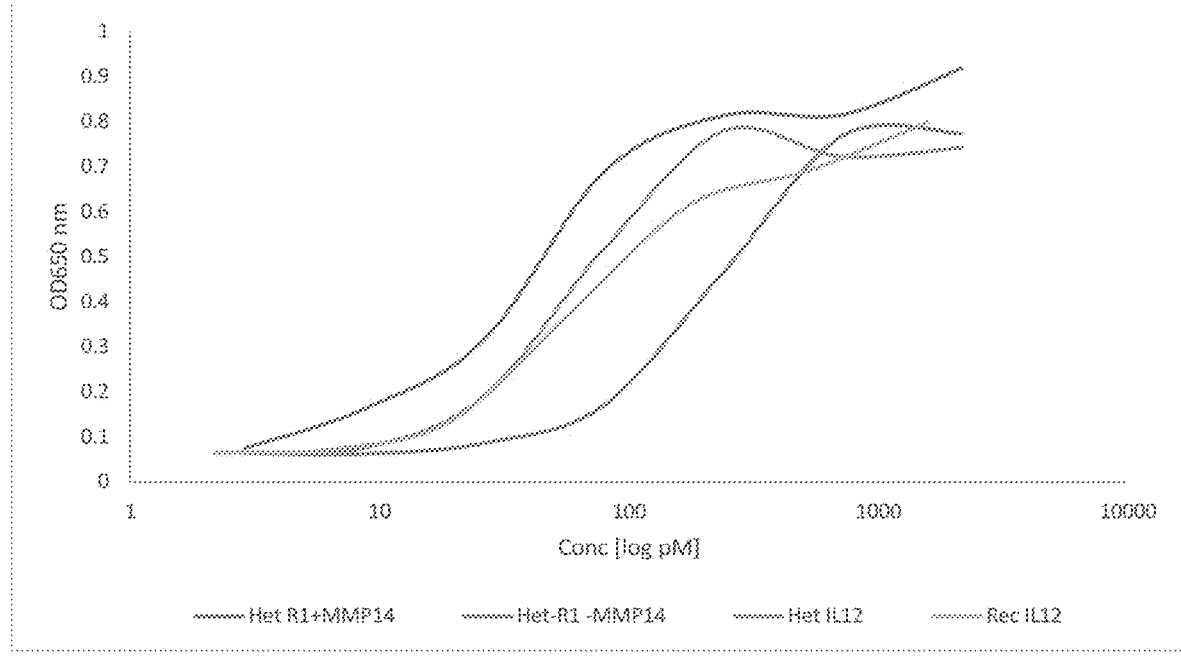
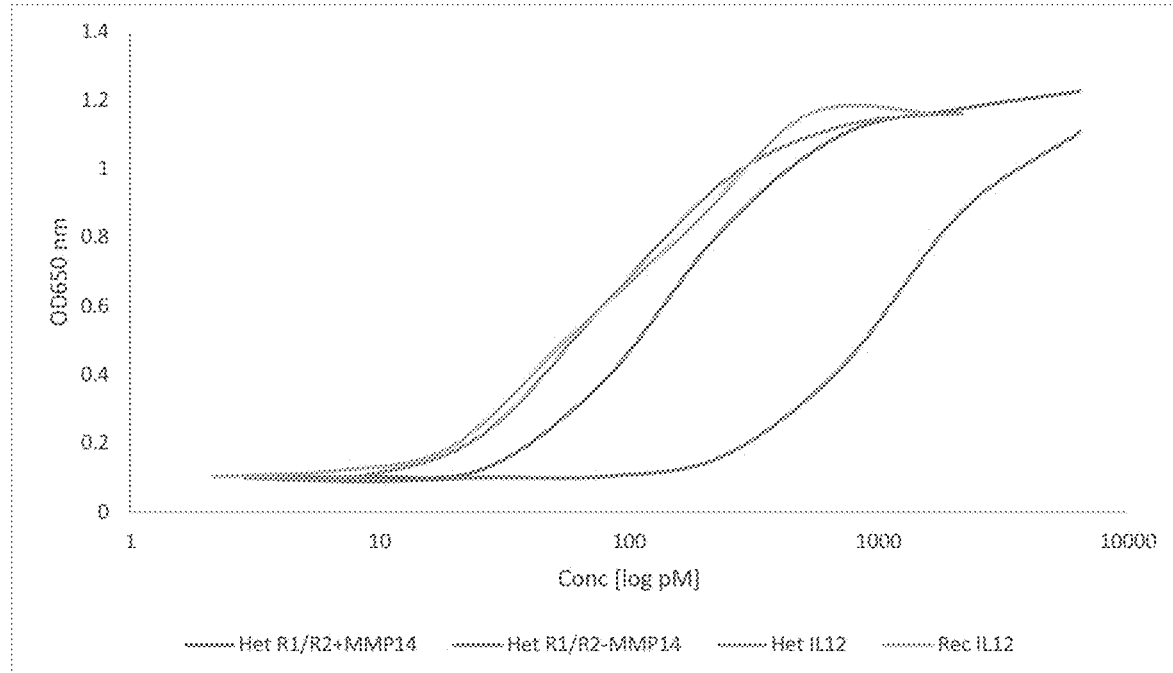

HOMODIMERIC OR HETERODIMERIC INTERLEUKIN 12 FUSION PROTEINS, AND COMPOSITIONS AND THERAPEUTIC METHODS THEREOF

SEQUENCE LISTING

The instant application contains a Sequence Listing which has been submitted electronically in ASCII format and is hereby incorporated by reference in its entirety. Said ASCII copy, created on Feb. 23, 2021, is named ITI-001US_SL.txt and is 173,826 bytes in size.

PRIORITY CLAIMS AND RELATED APPLICATIONS

This application claims the benefit to Chinese Application No. 201810376920.1, filed Apr. 25, 2018, the entire content of which is incorporated herein by reference for all purposes.

TECHNICAL FIELD OF THE INVENTION

The invention generally relates to novel fusion proteins and therapeutic uses thereof. More particularly, the invention provides novel fusion proteins of Interleukin 12 and prodrugs, and compositions and methods of preparation thereof, useful in treating various diseases and disorders (e.g., hyperplasia, solid tumor or hematopoietic malignancy).

BACKGROUND OF THE INVENTION

Interleukin-12 (IL12), also known as cytotoxic lymphocyte maturation factor (CLMF), was first identified in 1989 as a natural killer (NK) cell stimulating factor with multiple biological activities on peripheral blood lymphocytes. IL12 is produced in response to infection by a variety of cells of the immune system, including phagocytic cells, B cells and activated dendritic cells. (Colombo et al. 2002 *Cytokine & Growth Factor Reviews* 13: 155-168.) IL12 plays an essential role in mediating the interaction of the innate and adaptive arms of the immune system, acting on T-cells and natural killer (NK) cells, enhancing the proliferation and activity of cytotoxic lymphocytes and the production of other inflammatory cytokines, especially interferon-γ.

IL12 is a heterodimeric molecule composed of an α-chain (the p35 subunit) and a β-chain (the p40 subunit) covalently linked by a disulfide bridge to form the biologically active 74 kDa heterodimer. In humans and mice, IL12 is shown to be a potent activator of natural killer (NK) cell activity (Kobayashi, et al. 1989 *J Exp. Med.* 170:827-845) and a major inducer of IFN-γ from NK and T lymphocytes (Chan, et al. 1991 *J Exp. Med.* 173:869-879), a cytokine with important immune cell activating capabilities. IFN-γ is also an essential mediator of the antiangiogenic effects ascribed to IL12 (Voest, et al. 1995 *J. Natl Cancer Inst.* 87:581-586; Majewski, et al. 1996 *J. Invest. Dermatol.* 106:1114-1118).

Studies showed that IL12 enhances tumor cell killing mediated by immune cells specifically directed toward tumor targets by antitumor antibodies (antibody-dependent cellular cytotoxicity, ADCC) (Lieberman, et al. 1991 *J Surg. Res.* 50:410-415). IL12 stimulates nitric oxide production in vivo, resulting in delayed tumor progression in mice (Wigginton, et al. 1996 *Cancer Res.* 56:1131-1136). Endogenous IL12 production has also been documented to gradually diminish as tumor burden increases (Handel-Fernandez, et al. 1997 *J. Immunol.* 158:280-286), thus forming a rationale for providing IL12 to cancer patients to reconstitute cell-mediated antitumor responses.

IL12 has also been reported to be a potent inhibitor of tumor-driven angiogenesis (Voest, et al. 1995 supra; Majewski, et al. 1996 supra) demonstrating significant in vivo inhibition of tumor blood vessel formation in mice mediated through IFN γ inducible protein-10 (IP-10; Sgadari, et al. 1996 *Blood* 87:3877-3882), a chemokine that has a potent antiangiogenic effect on the vasculature of growing tumors (Angiolillo, et al. 1996 *Ann NY Acad. Sci.* 795:158-167; Arenberg, et al. 1996 *J. Exp. Med.* 184:981-992. In vitro, it inhibits the formation of tube-like structures by endothelial cells (Angiolillo, et al. 1995 *J. Exp. Med.* 182:155-162). In vivo, induction of IP-10 by IL12 results in central tumor necrosis with surrounding blood vessels showing intimal thickening, endothelial cell apoptosis, and partial to complete occlusion of the vessel lumens by thrombosis (Angiolillo, et al. 1996 supra; Dias, et al. 1998 *Int. J. Cancer* 75:151-157). IL12 has also been shown to exert antiangiogenic effects through its role as a regulator of VEGF and matrix metalloproteinase (MMP) production (Dias, et al. 1998 *Int. J. Cancer* 78:361-365).

While IL12 has shown potent anti-tumor effect in preclinical models, in the clinical trials, however, the systemic administration recombinant IL12 has resulted in severe side effects, such as fever, gastrointestinal reactions, lymphopenia, and abnormal liver function seriously, and deaths of patients have been attributed to IL12 administration due to its severe toxicity. (Lasek, et al. 2014 Cancer *Immunol Immunother.* 63(5): 419-435.)

The therapeutics and methods currently available for hyperplasia, solid tumor or hematopoietic malignancy are inadequate. There remains an urgent and ongoing need for novel and improved therapeutics to effectively treat such diseases and conditions.

SUMMARY OF THE INVENTION

The invention is based in part on the surprising discovery of novel fusion proteins and therapeutic uses thereof. Novel fusion proteins of IL12 and prodrugs thereof, compositions and methods of preparation thereof, are disclosed herein which are useful in treating various diseases and disorders, e.g., hyperplasia, solid tumor or hematopoietic malignancy, with reduced side effects and off-target toxicities.

In one aspect, the invention generally relates to a fusion protein. The fusion protein comprises: a first structural unit: one or two subunits of IL12 selected from P35 and P40 subunits, wherein the first structural unit is located at the N-terminus of the fusion protein; a second structural unit: an antibody Fc fragment, wherein the second structural unit is located at the C-terminus of the fusion protein; and a first linker segment covalently linking the first structural unit and the second structural unit or covalently linking the two subunits of the first structural unit.

In another aspect, the invention generally relates to a homodimeric or heterodimeric protein, which comprises a fusion protein disclosed herein.

In yet another aspect, the invention generally relates to a substantially purified protein, such as a fusion protein or a fragment, disclosed herein.

In yet another aspect, the invention generally relates to a polynucleotide encoding a protein, such as a fusion protein or a fragment thereof, disclosed herein.

In yet another aspect, the invention generally relates to an expression vector comprising a polynucleotide encoding a protein, such as a fusion protein or a fragment thereof, disclosed herein.

In yet another aspect, the invention generally relates to a pharmaceutical composition comprising a protein, such as a fusion protein or a fragment thereof, disclosed herein and a pharmaceutically acceptable excipient, carrier, or diluent.

In yet another aspect, the invention generally relates to a pharmaceutical composition comprising a polynucleotide encoding a protein, such as a fusion protein or a fragment thereof, disclosed herein and a pharmaceutically acceptable excipient, carrier, or diluent.

In yet another aspect, the invention generally relates to a method for treating a disease or condition. The method comprises administering to a patient in need thereof a therapeutically effective amount of a polynucleotide encoding a protein, such as a fusion protein or a fragment thereof, disclosed herein, wherein the disease or condition is selected from hyperplasia, solid tumor or hematopoietic malignancy.

In yet another aspect, the invention generally relates to use of a protein, such as a fusion protein or a fragment thereof, disclosed herein for treating or reducing a disease or disorder (e.g., hyperplasia, solid tumor or hematopoietic malignancy).

In yet another aspect, the invention generally relates to use of a polynucleotide encoding a protein, such as a fusion protein or a fragment thereof, disclosed herein for treating or reducing a disease or disorder (e.g., hyperplasia, solid tumor or hematopoietic malignancy).

In yet another aspect, the invention generally relates to use of a protein, such as a fusion protein or a fragment thereof, disclosed herein and a pharmaceutically acceptable excipient, carrier, or diluent, in preparation of a medicament for treating or reducing a disease or disorder (e.g., hyperplasia, solid tumor or hematopoietic malignancy).

In yet another aspect, the invention generally relates to use of a polynucleotide encoding a protein, such as a fusion protein or a fragment thereof, disclosed herein and a pharmaceutically acceptable excipient, carrier, or diluent, in preparation of a medicament for treating or reducing a disease or disorder (e.g., hyperplasia, solid tumor or hematopoietic malignancy).

In yet another aspect, the invention generally relates to a cell line comprising a polynucleotide encoding a protein, such as a fusion protein or a fragment thereof, disclosed herein.

In yet another aspect, the invention generally relates to a method for making a protein, comprising culturing the cell line. In certain embodiments, the method further comprises purifying or isolating a produced protein, such as a fusion protein or a fragment thereof, disclosed herein.

In yet another aspect, the invention generally relates to a method for making a protein. The method comprises: providing an expression vector encoding a protein, such as a fusion protein or a fragment thereof, disclosed herein; introducing the expression vector into a host cell; culturing the host cell in media under conditions sufficient to express the protein; and purifying the protein from the host cell or media.

In yet another aspect, the invention generally relates to an isolated protein produced by a method disclosed herein.

BRIEF DESCRIPTION OF THE DRAWINGS

FIG. 5 shows a schematic diagram of the structure of Heterodimer-IL12-Rβ1/Rβ2 dimer prodrug (Het-R1/R2), Fc-k is a short for Fc-knob, and Fc-h is short for Fc-hole.

FIG. 6 shows a schematic diagram of the structure of Heterodimer-IL12-Rβ1 dimer prodrug (Het-R1), Fc-k is a short for Fc-knob, and Fc-h is short for Fc-hole.

FIG. 9 shows exemplary data that injection of IL12-Fc, not linked to the IL12 receptor, completely eliminates MC38 tumors, and Het IL12 has a stronger clearance effect than Homo IL12.

FIG. 11 shows exemplary data that Het-R1, Het-R2, and Het-R1/R2 all effectively eliminate MC38 tumors.

FIG. 14 shows exemplary data that (A) human Het-R1 after MMP14 digest exhibits similar activity as Het IL12 and recombinant IL12 in vitro (B) human Het-R1/R2 after MMP14 digest exhibits similar activity as Het IL12 and recombinant IL12 using a HEK Blue-IL12 reporter cell line.

DEFINITIONS

Figure 1:
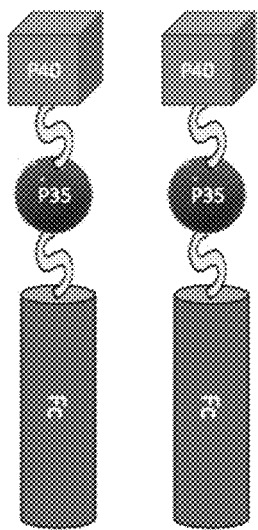
FIG. 1 shows a schematic diagram of the structure of IL12-Fc dimer prodrug: Homodimer-IL12-Fc (Homo IL12) in series form.

Unless defined otherwise, all technical and scientific terms used herein have the same meaning as commonly understood by one of ordinary skill in the art to which this invention belongs. The following terms, unless indicated otherwise according to the context wherein the terms are found, are intended to have the following meanings.

When trade names are used herein, the trade name includes the product formulation, the generic drug, and the active pharmaceutical ingredient(s) of the trade name product, unless otherwise indicated by context.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

As used herein, "at least" a specific value is understood to be that value and all values greater than that value.

As used herein, "more than one" is understood as 2, 3, 4, 5, 6, 7, 8, 9, 10, 11, 12, 13, 14, 15, 16, 17, 18, 19, 20, 25, 30, 40, 50, 100, etc., or any value there between.

In this specification and the appended claims, the singular forms "a," "an," and "the" include plural reference, unless the context clearly dictates otherwise.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein can be modified by the term about.

Unless specifically stated or obvious from context, as used herein, the term "or" is understood to be inclusive.

The term "comprising", when used to define compositions and methods, is intended to mean that the compositions and methods include the recited elements, but do not exclude other elements. The term "consisting essentially of", when used to define compositions and methods, shall mean that the compositions and methods include the recited elements and exclude other elements of any essential significance to the compositions and methods. For example, "consisting essentially of" refers to administration of the pharmacologically active agents expressly recited and excludes pharmacologically active agents not expressly recited. The term consisting essentially of does not exclude pharmacologically inactive or inert agents, e.g., pharmaceutically acceptable excipients, carriers or diluents. The term "consisting of", when used to define compositions and methods, shall mean excluding trace elements of other ingredients and substantial method steps. Embodiments defined by each of these transition terms are within the scope of this invention.

As used herein, the term "agonist" refers to a compound that, in combination with a receptor, can produce a cellular response. An agonist may be a ligand that directly binds to the receptor. Alternatively, an agonist may combine with a receptor indirectly by, for example, (a) forming a complex with another molecule that directly binds to the receptor, or (b) otherwise resulting in the modification of another compound so that the other compound directly binds to the receptor.

As used herein, the term "antagonist" refers to a compound that competes with an agonist or inverse agonist for binding to a receptor, thereby blocking the action of an agonist or inverse agonist on the receptor. However, an antagonist has no effect on constitutive receptor activity.

As used herein, the term "antibody" refers to molecules that are capable of binding an epitope or antigenic determinant. The term is meant to include whole antibodies and antigen-binding fragments thereof. The term encompasses polyclonal, monoclonal, chimeric, Fabs, Fvs, single-chain antibodies and single or multiple immunoglobulin variable chain or CDR domain designs as well as bispecific and multispecific antibodies. Antibodies can be from any animal origin. Preferably, the antibodies are mammalian, e.g., human, murine, rabbit, goat, guinea pig, camel, horse and the like, or other suitable animals. Antibodies may recognize polypeptide or polynucleotide antigens. The term includes active fragments, including for example, an antigen binding fragment of an immunoglobulin, a variable and/or constant region of a heavy chain, a variable and/or constant region of a light chain, a complementarity determining region (cdr), and a framework region. The terms include polyclonal and monoclonal antibody preparations, as well as preparations including hybrid antibodies, altered antibodies, chimeric antibodies, hybrid antibody molecules, F(ab)$_2$ and F(ab) fragments; Fv molecules (for example, noncovalent heterodimers), dimeric and trimeric antibody fragment constructs; minibodies, humanized antibody molecules, and any functional fragments obtained from such molecules, wherein such fragments retain specific binding.

As used herein, the term "antigen" as used herein is meant any substance that causes the immune system to produce antibodies or specific cell-mediated immune responses against it. A disease associated antigen is any substance that is associated with any disease that causes the immune system to produce antibodies or a specific-cell mediated response against it. An antigen is capable of being recognized by the immune system and/or being capable of inducing a humoral immune response and/or cellular immune response leading to the activation of B- and/or T-lymphocytes. An antigen can have one or more epitopes (B- and/or T-cell epitopes). An antigen will preferably react, typically in a highly selective manner, with its corresponding antibody or TCR and not with the multitude of other antibodies or TCRs which may be evoked by other antigens. Antigens as used herein may also be mixtures of several individual antigens.

As used herein, the term "biologically active" entity, or an entity having "biological activity," is one having structural, regulatory, or biochemical functions of a naturally occurring molecule or any function related to or associated with a metabolic or physiological process. A biologically active polypeptide or fragment thereof includes one that can participate in a biological process or reaction and/or can produce a desired effect. The biological activity can include an improved desired activity, or a decreased undesirable activity. For example, an entity demonstrates biological activity when it participates in a molecular interaction with another molecule, when it has therapeutic value in alleviating a disease condition, when it has prophylactic value in inducing an immune response, or when it has diagnostic and/or prognostic value in determining the presence of a molecule. A biologically active protein or polypeptide can be naturally-occurring or it can be synthesized from known components, e.g., by recombinant or chemical synthesis and can include heterologous components.

As used herein, the terms "cancer" and "cancerous" refer to or describe the physiological condition in mammals that is typically characterized by unregulated cell growth. Examples of cancer include but are not limited to, carcinoma, lymphoma, sarcoma, blastoma and leukemia. More particular examples of such cancers include squamous cell carcinoma, lung cancer, pancreatic cancer, cervical cancer, bladder cancer, hepatoma, breast cancer, colon carcinoma, and head and neck cancer.

As used herein, the term "cell" refers to any prokaryotic, eukaryotic, primary cell or immortalized cell line, any group of such cells as in, a tissue or an organ. Preferably the cells are of mammalian (e.g., human) origin and can be infected by one or more pathogens.

As used herein, the term "co-administer" refers to the presence of two pharmacological agents in the blood at the same time. The two pharmacological agents can be administered concurrently or sequentially.

As used herein, the term "co-expressed" is intended to mean that two distinct polypeptides are expressed simultaneously in a host cell such that the two polypeptides can interact or bind either in the host cell or in the host cell culture medium and form a complex.

As used herein, the terms "disease" or "disorder" refer to a pathological condition, for example, one that can be identified by symptoms or other identifying factors as diverging from a healthy or a normal state. The term "disease" includes disorders, syndromes, conditions, and injuries. Diseases include, but are not limited to, proliferative, inflammatory, immune, metabolic, infectious, and ischemic diseases.

As used herein, the term "effective amount" of an active agent refers to an amount sufficient to elicit the desired biological response. As will be appreciated by those of ordinary skill in this art, the effective amount of a compound of the invention may vary depending on such factors as the desired biological endpoint, the pharmacokinetics of the compound, the disease being treated, the mode of administration, and the patient.

As used herein, the term "expression of a nucleic acid molecule" refers to the conversion of the information contained in the nucleic acid molecule into a gene product. The gene product can be the direct transcriptional product of a gene (e.g., mRNA, tRNA, rRNA, antisense RNA, ribozyme, structural RNA, or any other type of RNA) or a peptide or polypeptide produced by translation of an mRNA. Gene products also include RNAs that are modified by processes such as capping, polyadenylation, methylation, and editing; and proteins modified by, for example, methylation, acetylation, phosphorylation, ubiquitination, ADP-ribosylation, myristilation, and glycosylation.

As used herein, the term "host cell" refers to an individual cell or a cell culture that can be or has been a recipient of any recombinant vector(s) or isolated polynucleotide(s). A host cell can be a transfected, transformed, transduced or infected cell of any origin, including prokaryotic, eukaryotic, mammalian, avian, insect, plant or bacteria cells, or it can be a cell of any origin that can be used to propagate a nucleic acid described herein. Host cells include progeny of a single host cell, and the progeny may not necessarily be completely identical (in morphology or in total DNA complement) to the original parent cell due to natural, accidental, or deliberate mutation and/or change. A host cell includes cells transfected or infected in vivo or in vitro with a recombinant vector or a polynucleotide of the invention. A host cell that comprises a recombinant vector of the invention may be called a "recombinant host cell."

Host cells include, without limitation, the cells of mammals, plants, insects, fungi and bacteria. Bacterial cells include, without limitation, the cells of Gram-positive bacteria such as species of the genus *Bacillus, Streptomyces* and *Staphylococcus* and cells of Gram-negative bacteria such as cells of the genus *Escherichia* and *Pseudomonas*. Fungal cells include, preferably, yeast cells such as *Saccharomyces, Pichia pastoris* and *Hansenula polymorpha*. Insect cells include, without limitation, cells of *Drosophila* and Sf9 cells. Plant cells include, among others, cells from crop plants such as cereals, medicinal or ornamental plants or bulbs. Suitable mammal cells for the present invention include epithelial cell lines (porcine, etc.), osteosarcoma cell lines (human, etc.), neuroblastoma cell lines (human, etc.), epithelial carcinomas (human, etc.), glial cells (murine, etc.), liver cell lines (monkey, etc.). CHO cells (Chinese Hamster Ovary), COS cells, BHK cells, cells HeLa, 911, AT1080, A549, 293 or PER.C6, human ECCs NTERA-2 cells, D3 cells of the line of mESCs, human embryonic stem cells such as HS293 and BGV01, SHEF1, SHEF2 and HS181, cells NIH3T3, 293T, REH and MCF-7 and hMSCs cells.

As used herein, the term "Fc" refers to a molecule or sequence comprising the sequence of a non-antigen-binding fragment of whole antibody, whether in monomeric or multimeric form. The original immunoglobulin source of the native Fc is preferably of human origin and may be any of the immunoglobulins (e.g., IgG1, IgG2). Native Fc's are made up of monomeric polypeptides that may be linked into dimeric or multimeric forms by covalent (i.e., disulfide bonds) and non-covalent association. The number of intermolecular disulfide bonds between monomeric subunits of native Fc molecules ranges from 1 to 4 depending on class (e.g., IgG, IgA, IgE) or subclass (e.g., IgG1, IgG2, IgG3, IgA1, IgGA2).

As used herein, the terms "Fc domain" or "Fc region" is meant to refer to the immunoglobulin heavy chain "fragment crystallizable" region. Generally, an Fc domain is capable of interacting with a second Fc domain to form a dimeric complex. The Fc domain may be capable of binding cell surface receptors called Fc receptors and/or proteins of the complement system or may be modified to reduce or augment these binding activities. The Fc domain may be derived from IgG, IgA, IgD, IgM or IgE antibody isotypes and effect immune activity including opsonization, cell lysis, degranulation of mast cells, basophils, and eosinophils, and other Fc receptor-dependent processes; activation of the complement pathway; and protein stability in vivo.

"Fc domain" encompasses native Fc and Fc variant molecules and sequences as defined herein. As with Fc variants and native Fc's, the term "Fc domain" includes molecules in monomeric or multimeric form, whether digested from whole antibody or produced by recombinant gene expression or by other means.

Fc fusion proteins have been reported to combine the Fc regions of IgG with the domains of another protein, such as various cytokines and soluble receptors. (e.g., Capon et al. 1989 *Nature* 337:525-531; Chamow et al. 1996 *Trends Biotechnol.* 14:52-60; U.S. Pat. Nos. 5,116,964 and 5,541, 087).

The use of Fc fusions is known in the art (e.g., U.S. Pat. Nos. 7,754,855; 5,480,981; 5,808,029; WO7/23614; WO98/28427 and references cited therein. Fc fusion proteins can include variant Fc molecules (e.g., as described in U.S. Pat. No. 7,732,570). Fc fusion proteins can be soluble in the plasma or can associate to the cell surface of cells having specific Fc receptors.

As used herein, the term "Fc variant" refers to a molecule or sequence that is modified from a native Fc but still comprises a binding site for the salvage receptor, FcRn. International applications WO 97/34631 (published Sep. 25, 1997) and WO 96/32478 describe exemplary Fc variants, as well as interaction with the salvage receptor, and are hereby incorporated by reference. Thus, the term "Fc variant" comprises a molecule or sequence that is humanized from a non-human native Fc. Furthermore, a native Fc comprises sites that may be removed because they provide structural features or biological activity that are not required for the fusion molecules of the present invention. Thus, in certain embodiments, the term "Fc variant" comprises a molecule or sequence that lacks one or more native Fc sites or residues that affect or are involved in (1) disulfide bond formation, (2) incompatibility with a selected host cell (3) N-terminal heterogeneity upon expression in a selected host cell, (4) glycosylation, (5) interaction with complement, (6) binding to an Fc receptor other than a salvage receptor, or (7) antibody-dependent cellular cytotoxicity (ADCC). Fc variants are described in further detail hereinafter.

As used herein, the term "fusion protein" refers to polypeptides comprising two or more regions from different or heterologous proteins covalently linked (i.e., "fused") by recombinant, chemical or other suitable method. If desired, the fusion molecule can be fused at one or several sites through a peptide or other linker segment or sequence. For example, one or more peptide linkers may be used to assist in construction of a fusion protein.

As used herein, the term "GC content" refers to the percentage of a nucleic acid sequence comprised of deoxyguanosine (G) and/or deoxycytidine (C) deoxyribonucleosides, or guanosine (G) and/or cytidine (C) ribonucleoside residues.

As used herein, the term "high dosage" is meant at least 5% (e.g., at least 10%, 20%, 50%, 100%, 200%, or even 300%) more than the highest standard recommended dosage of a particular compound for treatment of any human disease or condition.

As used herein, the term "immune response" refers to a process whereby immune cells are stimulated and/or recruited from the blood to lymphoid as well as non-lymphoid tissues via a multifactorial process that involves distinct adhesive and/or activation steps. Activation conditions cause the release of cytokines, growth factors, chemokines and other factors, upregulate expression of adhesion and other activation molecules on the immune cells, promote adhesion, morphological changes, and/or extravasation concurrent with chemotaxis through the tissues, increase cell proliferation and cytotoxic activity, stimulate antigen presentation and provide other phenotypic changes including generation of memory cell types. Immune response is also meant to refer to the activity of immune cells to suppress or regulate inflammatory or cytotoxic activity of other immune cells. Immune response refers to the activity of immune cells in vivo or in vitro.

The terms "identical" or percent "identity," in the context of two or more nucleic acids or polypeptide sequences, refer to two or more sequences or subsequences that are the same or have a specified percentage of amino acid residues or nucleotides that are the same (i.e., about 70% identity, preferably 75%, 80%, 85%, 90%, 91%, 92%, 93%, 94%, 95%, 96%, 97%, 98%, 99%, or higher identity over a specified region (e.g., of a IL12 or IL12R sequence), when compared and aligned for maximum correspondence over a comparison window or designated region) as measured using a BLAST or BLAST 2.0 sequence comparison algorithms with default parameters described below, or by manual alignment and visual inspection. Such sequences are then said to be "substantially identical." This definition also refers to, or can be applied to, the compliment of a test sequence. The definition also includes sequences that have deletions and/or additions, as well as those that have substitutions. As described below, the preferred algorithms can account for gaps and the like. Preferably, identity exists over a region that is at least about 25, 50, 75, 100, 150, 200 amino acids or nucleotides in length, and oftentimes over a region that is 225, 250, 300, 350, 400, 450, 500 amino acids or nucleotides in length or over the full-length of an amino acid or nucleic acid sequences.

For sequence comparison, typically one sequence acts as a reference sequence, to which test sequences are compared. When using a sequence comparison algorithm, test and reference sequences are entered into a computer, subsequence coordinates are designated, if necessary, and sequence algorithm program parameters are designated. Preferably, default program parameters can be used, or alternative parameters can be designated. The sequence comparison algorithm then calculates the percent sequence identities for the test sequences relative to the reference sequence, based on the program parameters.

A preferred example of algorithm that is suitable for determining percent sequence identity and sequence similarity are the BLAST algorithms, which are described in Altschul et al. 1977 *Nuc. Acids Res.* 25:3389-3402 and Altschul et al. 1990 *J. Mol. Biol.* 215:403-410, respectively. BLAST software is publicly available through the National Center for Biotechnology Information on the worldwide web at ncbi.nlm.nih.gov/. Both default parameters or other non-default parameters can be used. The BLASTN program (for nucleotide sequences) uses as defaults a wordlength (W) of 11, an expectation (E) of 10, M=5, N=−4 and a comparison of both strands. For amino acid sequences, the BLASTP program uses as defaults a wordlength of 3, and expectation (E) of 10, and the BLOSUM62 scoring matrix (see Henikoff & Henikoff, *Proc. Natl. Acad. Sci. USA* 89:10915 (1989)) alignments (B) of 50, expectation (E) of 10, M=5, N=−4, and a comparison of both strands.

As used herein, the term "inhibit" refers to any measurable reduction of biological activity. Thus, as used herein, "inhibit" or "inhibition" may be referred to as a percentage of a normal level of activity.

As used herein, the term "interleukin 12" or "IL12" refers to a polypeptide that has at least 90%, 91%, 92%, 93%, 94%, 95%, 96%, 97%, 98% or 99% sequence identity to a native mammalian IL12 amino acid sequence that is biologically active, meaning the mutated protein ("mutein") has functionality similar (75% or greater) to that of a native IL12 protein in at least one functional assay.

Exemplified functional assays of an IL12 polypeptide include inducing the production of interferon-gamma (IFN-γ), for example, by T cells or natural killer (NK) cells, and promoting the differentiation of T helper-1 (Th1) cells. A T helper cell differentiated into a Th1 cell can be identified by secretion of IFN-γ. IFN-γ secreted by IL-12 stimulated T cells or NK cells can be conveniently detected, for example, in serum or cell culture supernatant using ELISA. ELISA methods and techniques are well known in the art, and kits for detecting IFN-γ are commercially available (e.g., R&D Systems, Minneapolis, Minn.; Peprotech, Rocky Hill, N.J.; and Biosource Intl., Camarillo, Calif.) See also, Coligan, et al., Current Methods in Immunology, 1991-2006, John Wiley & Sons; Harlow and Lane, Using Antibodies: A Laboratory Manual, 1998, Cold Spring Harbor Laboratory Press; and The ELISA Guidebook, Crowther, ed., 2000, Humana Press.

As used herein, the terms an "isolated" molecule (such as a polypeptide or polynucleotide) is one that has been manipulated to exist in a higher concentration than in nature or has been removed from its native environment. For example, a subject antibody is isolated, purified, substantially isolated, or substantially purified when at least 10%, or 20%, or 40%, or 50%, or 70%, or 90% of non-subject-antibody materials with which it is associated in nature have been removed. For example, a polynucleotide or a polypeptide naturally present in a living animal is not "isolated," but the same polynucleotide or polypeptide separated from the coexisting materials of its natural state is "isolated." Further, recombinant DNA molecules contained in a vector are considered isolated for the purposes of the present invention. Isolated RNA molecules include in vivo or in vitro RNA replication products of DNA and RNA molecules. Isolated nucleic acid molecules further include synthetically produced molecules. Additionally, vector molecules contained in recombinant host cells are also isolated. Thus, not all "isolated" molecules need be "purified."

As used herein, the terms "linker" or "linking segment" refer to a molecule or group that connects two other molecules or groups. A peptide linker may allow the connected molecules or groups to acquire a functional configuration. The linker peptide preferably comprises at least two amino acids, at least three amino acids, at least five amino acids, at least ten amino acids, at least 15 amino acids, at least 20 amino acids, at least 30 amino acids, at least 40 amino acids, at least 50 amino acids, at least 60 amino acids, at least 70 amino acids, at least 80 amino acids, at least 90 amino acids or approximately 100 amino acids.

Components of a fusion protein, such as cytokines or other bioactive molecules and any peptide linkers, can be organized in nearly any fashion provided that the fusion protein has the function for which it was intended. In particular, each component of a fusion protein can be spaced from another component by at least one suitable peptide linker segment or sequence if desired. Additionally, the fusion protein may include tags, e.g., to facilitate modification, identification and/or purification of the fusion protein. More specific fusion proteins are in the examples described below.

As used herein, the term "low dosage" refers to at least 5% less (e.g., at least 10%, 20%, 50%, 80%, 90%, or even 95%) than the lowest standard recommended dosage of a particular compound formulated for a given route of administration for treatment of any human disease or condition. For example, a low dosage of an agent that is formulated for administration by inhalation will differ from a low dosage of the same agent formulated for oral administration.

As used herein, the term "medium" or "media" includes any culture medium, solution, solid, semi-solid, or rigid support that may support or contain any host cell, including bacterial host cells, yeast host cells, insect host cells, plant host cells, eukaryotic host cells, mammalian host cells, CHO cells, prokaryotic host cells, *E. coli*, or *Pseudomonas* host cells, and cell contents. Thus, the term may encompass medium in which the host cell has been grown, e.g., medium into which a polypeptide has been secreted, including medium either before or after a proliferation step. The term also may encompass buffers or reagents that contain host cell lysates, such as in the case where a polypeptide is produced intracellularly and the host cells are lysed or disrupted to release the polypeptide.

As used herein, the term "modulate" refers to the production, either directly or indirectly, of an increase or a decrease, a stimulation, inhibition, interference, or blockage in a measured activity when compared to a suitable control. A "modulator" of a polypeptide or polynucleotide refers to a substance that affects, for example, increases, decreases, stimulates, inhibits, interferes with, or blocks a measured activity of the polypeptide or polynucleotide, when compared to a suitable control. For example, a "modulator" may bind to and/or activate or inhibit the target with measurable affinity, or directly or indirectly affect the normal regulation of a receptor activity.

The term "operably linked" refers to a functional linkage between a first nucleic acid sequence and a second nucleic acid sequence, such that the first and second nucleic acid sequences are transcribed into a single nucleic acid sequence. Operably linked nucleic acid sequences need not be physically adjacent to each other. The term "operably linked" also refers to a functional linkage between a nucleic acid expression control sequence (such as a promoter, or array of transcription factor binding sites) and a transcribable nucleic acid sequence, wherein the expression control sequence directs transcription of the nucleic acid corresponding to the transcribable sequence.

As used herein, the term "pharmaceutically acceptable" excipient, carrier, or diluent refers to a pharmaceutically acceptable material, composition or vehicle, such as a liquid or solid filler, diluent, excipient, solvent or encapsulating material, involved in carrying or transporting the subject pharmaceutical agent from one organ, or portion of the body, to another organ, or portion of the body. Each carrier must be "acceptable" in the sense of being compatible with the other ingredients of the formulation and not injurious to the patient. Some examples of materials which can serve as pharmaceutically-acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; phosphate buffer solutions; and other non-toxic compatible substances employed in pharmaceutical formulations. Wetting agents, emulsifiers and lubricants, such as sodium lauryl sulfate, magnesium stearate, and polyethylene oxide-polypropylene oxide copolymer as well as coloring agents, release agents, coating agents, sweetening, flavoring and perfuming agents, preservatives and antioxidants can also be present in the compositions.

As used herein, the terms "polynucleotide," "nucleic acid molecule," "nucleotide," "oligonucleotide," and "nucleic acid" are used interchangeably herein to refer to polymeric forms of nucleotides, including ribonucleotides as well as deoxyribonucleotides, of any length. They can include both double-, single-stranded or triple helical sequences and include, but are not limited to, cDNA from viral, prokaryotic, and eukaryotic sources; mRNA; genomic DNA sequences from viral (e.g., DNA viruses and retroviruses) or prokaryotic sources; RNAi; cRNA; antisense molecules; recombinant polynucleotides; ribozymes; and synthetic DNA sequences. The term also captures sequences that include any of the known base analogs of DNA and RNA. Nucleotides can be referred to by their commonly accepted single-letter codes.

Polynucleotides are not limited to polynucleotides as they appear in nature, and also include polynucleotides where unnatural nucleotide analogues and inter-nucleotide bonds appear. A nucleic acid molecule may comprise modified nucleic acid molecules (e.g., modified bases, sugars, and/or internucleotide linkers). Non-limitative examples of this type of unnatural structures include polynucleotides wherein the sugar is different from ribose, polynucleotides wherein the phosphodiester bonds 3'-5' and 2'-5' appear, polynucleotides wherein inverted bonds (3'-3' and 5'-5') appear and branched structures. Also, the polynucleotides of the invention include unnatural inter-nucleotide bonds such as peptide nucleic acids (PNA), locked nucleic acids (LNA), C1-C4 alkylphosphonate bonds of the methylphosphonate, phosphoramidate, C1-C6 alkylphosphotriester, phosphorothioate and phosphorodithioate type. In any case, the polynucleotides of the invention maintain the capacity to hybridise with target nucleic acids in a similar way to natural polynucleotides.

Unless otherwise indicated or obvious from context, a particular nucleic acid sequence also implicitly encompasses conservatively modified variants thereof (e.g., degenerate codon substitutions) and complementary sequences, as well as the sequence explicitly indicated. Degenerate codon substitutions can be achieved by generating sequences in which the third position of one or more selected (or all) codons is substituted with mixed-base and/or deoxyinosine residues.

(Batzer et al. 1991 *Nucleic Acid Res.* 19:5081; Ohtsuka et al. 1985 *J Biol. Chem.* 260:2605-2608; Rossolini et al. 1994 *Mol. Cell. Probes* 8:91-98.)

As used herein, the terms "prevent", "preventing", or "prevention" refer to a method for precluding, delaying, averting, or stopping the onset, incidence, severity, or recurrence of a disease or condition. For example, a method is considered to be a prevention if there is a reduction or delay in onset, incidence, severity, or recurrence of a disease or condition or one or more symptoms thereof in a subject susceptible to the disease or condition as compared to a subject not receiving the method. The disclosed method is also considered to be a prevention if there is a reduction or delay in onset, incidence, severity, or recurrence of one or more symptoms of a disease or condition in a subject susceptible to the disease or condition after receiving the method as compared to the subject's progression prior to receiving treatment. The reduction or delay in onset, incidence, severity, or recurrence of osteoporosis can be about a 5, 10, 20, 30, 40, 50, 60, 70, 80, 90, 100%, or any amount of reduction in between.

Prevention and the like do not mean preventing a subject from ever getting the specific disease or disorder. Prevention may require the administration of multiple doses. Prevention can include the prevention of a recurrence of a disease in a subject for whom all disease symptoms were eliminated, or prevention of recurrence in a relapsing-remitting disease.

As used herein, the term "promoter" refers to a DNA regulatory region capable of binding RNA polymerase in a mammalian cell and initiating transcription of a downstream (3' direction) coding sequence operably linked thereto. A promoter sequence includes the minimum number of bases or elements necessary to initiate transcription of a gene of interest at levels detectable above background. Within the promoter sequence may be a transcription initiation site, as well as protein binding domains (consensus sequences) responsible for the binding of RNA polymerase. Eukaryotic promoters will often, but not always, contain "TATA" boxes and "CAT" boxes. Promoters include those that are naturally contiguous to a nucleic acid molecule and those that are not naturally contiguous to a nucleic acid molecule. Additionally, the term "promoter" includes inducible promoters, conditionally active promoters such as a cre-lox promoter, constitutive promoters, and tissue specific promoters.

As used herein, the terms "protein" and "polypeptide" are used interchangeably to refer to a polymer of amino acid residues, and are not limited to a minimum length. Thus, peptides, oligopeptides, dimers, multimers, and the like, are included within the definition. Both full-length proteins and fragments thereof are encompassed by the definition. The terms also include post-expression modifications of the polypeptide, for example, glycosylation, acetylation, phosphorylation, and the like. Furthermore, a polypeptide may refer to a protein which includes modifications, such as deletions, additions, and substitutions (generally conservative in nature), to the native sequence, as long as the protein maintains the desired activity. These modifications may be deliberate or may be accidental. Amino acids can be referred to herein by either their commonly known three letter symbols or by the one-letter symbols recommended by the IUPAC-IUB Biochemical Nomenclature Commission.

As used herein, the term "purified" refers to a protein that may be substantially or essentially free of components that normally accompany or interact with the protein as found in its naturally occurring environment, i.e. a native cell, or host cell in the case of a recombinantly produced protein. A protein that may be substantially free of cellular material includes preparations of protein having less than about 30%, less than about 20%, less than about 15%, less than about 10%, less than about 5%, less than about 4%, less than about 3%, less than about 2%, or less than about 1% (by dry weight) of contaminating protein(s). When a protein or variant thereof is recombinantly produced by the host cells, the protein may be present at about 30%, at about 20%, about 15%, about 10%, about 5%, about 4%, about 3%, about 2%, or about 1% or less of the dry weight of the cells. When a protein or variant thereof is recombinantly produced by the host cells, the protein may be present in the culture medium at about 5 g/L, about 4 g/L, about 3 g/L, about 2 g/L, about 1 g/L, about 750 mg/L, about 500 mg/L, about 250 mg/L, about 100 mg/L, about 50 mg/L, about 10 mg/L, or about 1 mg/L or less of the dry weight of the cells. Thus, a "substantially purified" protein may have a purity level of at least at least about 80%, specifically, a purity level of at least about 85%, and more specifically, a purity level of at least about 90%, a purity level of at least about 95%, a purity level of at least about 99% or greater as determined by appropriate methods such as SDS/PAGE analysis, RP-HPLC, SEC, and capillary electrophoresis.

Proteins and prodrugs of the present invention are, subsequent to their preparation, preferably isolated and/or purified to obtain a composition containing an amount by weight equal to or greater than 80% ("substantially pure"), which is then used or formulated as described herein. In certain embodiments, the compounds of the present invention are more than 95% pure.

As used herein, the term "receptor" refers to proteins, including glycoproteins or fragments thereof, capable of interacting with another molecule, called the ligand. The ligand may belong to any class of biochemical or chemical compounds. The ligand is usually an extracellular molecule which, upon binding to the receptor, usually initiates a cellular response, such as initiation of a signal transduction pathway. The receptor need not necessarily be a membrane-bound protein.

As used herein, the term "recombinant," with respect to a nucleic acid molecule, means a polynucleotide of genomic, cDNA, viral, semisynthetic, and/or synthetic origin which, by virtue of its origin or manipulation, is not associated with all or a portion of the polynucleotide with which it is associated in nature. The term "recombinant", as used with respect to a protein or polypeptide, means a polypeptide produced by expression of a recombinant polynucleotide. The term "recombinant" as used with respect to a host cell means a host cell into which a recombinant polynucleotide has been introduced.

As used herein, the term "recombinant virus" refers to a virus that is genetically modified by the hand of man. The phrase covers any virus known in the art.

As used herein, the term "sample" refers to a sample from a human, animal, or to a research sample, e.g., a cell, tissue, organ, fluid, gas, aerosol, slurry, colloid, or coagulated material. The "sample" may be tested in vivo, e.g., without removal from the human or animal, or it may be tested in vitro. The sample may be tested after processing, e.g., by histological methods. "Sample" also refers, e.g., to a cell comprising a fluid or tissue sample or a cell separated from a fluid or tissue sample. "Sample" may also refer to a cell, tissue, organ, or fluid that is freshly taken from a human or animal, or to a cell, tissue, organ, or fluid that is processed or stored.

As used herein, the term "soluble" refers to a fusion molecule, particularly a fusion protein, that is not readily sedimented under low G-force centrifugation (e.g., less than about 30,000 revolutions per minute in a standard centrifuge) from an aqueous buffer, e.g., cell media. A fusion molecule is soluble if it remains in aqueous solution at a temperature greater than about 5-37° C. and at or near neutral pH in the presence of low or no concentration of an anionic or non-ionic detergent. Under these conditions, a soluble protein will often have a low sedimentation value, e.g., less than about 10 to 50 svedberg units.

Aqueous solutions referenced herein typically have a buffering compound to establish pH, typically within a pH range of about 5-9, and an ionic strength range between about 2 mM and 500 mM. Sometimes a protease inhibitor or mild non-ionic detergent is added. Additionally, a carrier protein may be added if desired (e.g., bovine serum albumin). Exemplary aqueous buffers include standard phosphate buffered saline, tris-buffered saline, or other well-known buffers and cell media formulations.

As used herein, the terms "stimulate" or "stimulating" refer to increase, to amplify, to augment, to boost a physiological activity, e.g., an immune response. Stimulation can be a positive alteration. For example, an increase can be by 5%, 10%, 25%, 50%, 75%, or even 90-100%. Other exemplary increases include 2-fold, 5-fold, 10-fold, 20-fold, 40-fold, or even 100-fold.

As used herein, the terms "subject" and "patient" are used interchangeably herein to refer to a living animal (human or non-human). The subject may be a mammal. The terms "mammal" or "mammalian" refer to any animal within the taxonomic classification mammalia. A mammal may be a human or a non-human mammal, for example, dogs, cats, pigs, cows, sheep, goats, horses, rats, and mice. The term "subject" does not preclude individuals that are entirely normal with respect to a disease or condition, or normal in all respects.

As used herein, the terms "suppress" or "suppressing" refer to decrease, to attenuate, to diminish, to arrest, or to stabilize a physiological activity, e.g., an immune response. Suppression can be a negative alteration. For example, a decrease can be by 5%, 10%, 25%, 50%, 75%, or even 90-100%. Exemplary decreases include 2-fold, 5-fold, 10-fold, 20-fold, 40-fold, or even 100-fold.

As used herein, the term "therapeutically effective amount" refers to the dose of a therapeutic agent or agents sufficient to achieve the intended therapeutic effect with minimal or no undesirable side effects. A therapeutically effective amount can be readily determined by a skilled physician, e.g., by first administering a low dose of the pharmacological agent(s) and then incrementally increasing the dose until the desired therapeutic effect is achieved with minimal or no undesirable side effects.

As used herein, the term "transfected" means possessing introduced DNA or RNA, with or without the use of any accompanying facilitating agents such as lipofectamine. Methods for transfection that are known in the art include, for example, calcium phosphate transfection, DEAE dextran transfection, protoplast fusion, electroporation, and lipofection.

As used herein, the terms "treatment" or "treating" a disease or disorder refers to a method of reducing, delaying or ameliorating such a condition, or one or more symptoms of such disease or condition, before or after it has occurred. Treatment may be directed at one or more effects or symptoms of a disease and/or the underlying pathology. The treatment can be any reduction and can be, but is not limited to, the complete ablation of the disease or the symptoms of the disease. As compared with an equivalent untreated control, such reduction or degree of prevention is at least 5%, 10%, 20%, 40%, 50%, 60%, 80%, 90%, 95%, or 100% as measured by any standard technique.

As used herein, the term "tumor" refers to any malignant or neoplastic cell.

As used herein, the term "vector" refers to a nucleic acid molecule that is able to transmit genetic material to a host cell or organism. A vector may be composed of either DNA or RNA. A vector carries its own origin of replication, one or more unique recognition sites for restriction endonucleases which can be used for the insertion of foreign DNA, and usually selectable markers such as genes coding for antibiotic resistance, and often recognition sequences (e.g., promoter) for the expression of the inserted DNA. Common vectors include plasmid vectors and phage vectors.

Any compositions or methods disclosed herein can be combined with one or more of any of the other compositions and methods provided herein.

DETAILED DESCRIPTION OF THE INVENTION

The invention provides novel fusion proteins and therapeutic uses thereof. More particularly, the invention provides novel fusion proteins of IL12 and prodrugs thereof, compositions and methods of preparation thereof, which are useful in treating various diseases and disorders, e.g., hyperplasia, solid tumor or hematopoietic malignancy with reduced off-target toxicities and side effects during treatment.

In one aspect, the invention generally relates to a fusion protein. The fusion protein comprises: a first structural unit: one or two subunits of IL12 selected from P35 and P40 subunits, wherein the first structural unit is located at the N-terminus of the fusion protein; a second structural unit: an antibody Fc fragment, wherein the second structural unit is located at the C-terminus of the fusion protein; and a first linker segment covalently linking the first structural unit and the second structural unit or covalently linking the two subunits of the first structural unit.

In certain embodiments of the fusion protein, the P35 and P40 subunits are derived from a mammal selected from the group consisting of human, monkey, mouse, dog, rat, cow, pig and sheep.

In certain embodiments of the fusion protein, the P35 and P40 subunits are derived from human. In certain embodiments of the fusion protein, the P35 and P40 subunits are derived from monkey. In certain embodiments of the fusion protein, the P35 and P40 subunits are derived from mouse. In certain embodiments of the fusion protein, the P35 and P40 subunits are derived from dog. In certain embodiments of the fusion protein, the P35 and P40 subunits are derived from a mammal selected from rat. In certain embodiments of the fusion protein, the P35 and P40 subunits are derived from cow. In certain embodiments of the fusion protein, the P35 and P40 subunits are derived from pig. In certain embodiments of the fusion protein, the P35 and P40 subunits are derived from sheep.

Any suitable antibody Fc fragment may be employed.

In certain embodiments of the fusion protein, the antibody Fc fragment comprises a human Fc fragment. In certain embodiments, the antibody Fc fragment comprises the amino acid sequence set forth in SEQ ID No. 5.

In certain embodiments, the antibody Fc fragment comprises a human IgG1. In certain embodiments, the antibody Fc fragment comprises the amino acid sequence set forth in SEQ ID No. 6.

In certain embodiments, the human IgG1 is human Fc-knob or human Fc-hole.

In certain embodiments, the human IgG1 comprises the amino acid sequence set forth in SEQ ID No. 7.

In certain embodiments of the fusion protein, the mouse P35 subunit has the amino acid sequence set forth in SEQ ID No. 3.

In certain embodiments of the fusion protein, the human P35 subunit has the amino acid sequence set forth in SEQ ID No. 4.

In certain embodiments of the fusion protein, the mouse P40 subunit has the amino acid sequence set forth in SEQ ID No. 1.

In certain embodiments of the fusion protein, the human P40 subunit has the amino acid sequence set forth in SEQ ID No. 2.

In certain embodiments of the fusion protein, the first linker segment, L1, has the amino acid sequence set forth in SEQ ID No. 12.

In certain embodiments, the fusion protein further comprises a signal peptide, e.g., modified at the N-terminus of the first structural unit.

In certain embodiments, the signal peptide, SP1, modified at the N-terminus of the mouse P35 subunit, comprises the amino acid sequence set forth in SEQ ID No. 27.

In certain embodiments, the signal peptide, SP1, modified at the N-terminus of the human P35 subunit, comprises the amino acid sequence set forth in SEQ ID No. 28.

In certain embodiments, the signal peptide, SP2, modified at the N-terminus of the mouse P40 subunit, comprises the amino acid sequence set forth in SEQ ID No. 29.

In certain embodiments, the signal peptide, SP2, modified at the N-terminus of the human P40 subunit, comprises the amino acid sequence set forth in SEQ ID No. 30.

In certain embodiments, the fusion protein further comprises a portion of an interleukin 12 receptor (IL12R), linked covalently to the N-terminus of the first structural unit by a second linker segment (L2). In certain embodiments, the IL12R is selected from Rβ1 and Rβ2.

In certain embodiments, the mouse Rβ1 comprises the amino acid sequence set forth in SEQ ID No. 8 and the mouse Rβ2 comprises the amino acid sequence set forth in SEQ ID No. 10.

In certain embodiments, the human Rβ1 comprises the amino acid sequence set forth in SEQ ID No. 9 and the human Rβ2 comprises the amino acid sequence set forth in SEQ ID No. 11.

In certain embodiments of the fusion protein, the second linker segment, L2 is capable of being recognized and hydrolyzed by a proteolytic enzyme specifically expressed in a tumor microenvironment.

In certain embodiments, the proteolytic enzyme specifically expressed in the tumor microenvironment is a matrix metalloproteinase, e.g., matrix metalloproteinase 14 (MIP14).

In certain embodiments of the fusion protein, the second linker segment L2 comprises the amino acid sequence set forth in SEQ ID No. 13-26.

In certain embodiments of the fusion protein, the C-terminus of the IL12R is linked to the N-terminus of the first structural unit via the L2; and the C-terminus of the first structural unit and the N-terminus of the second structural unit are linked by the L1. When the first structural unit comprises two subunits, the C-terminus of the first subunit and the N-terminus of the second subunit are linked by linker segment L1.

In another aspect, the invention generally relates to a homodimeric or heterodimeric protein, which comprises a fusion protein disclosed herein.

In certain embodiments, the homodimeric or heterodimeric protein is a homodimer of the monomer comprising a mouse P40 subunit, an L1 linker, a mouse P35 subunit, an L1 linker, and a fusion protein of human IgG1, e.g., having the amino acid sequence set forth in SEQ ID No. 31.

In certain embodiments, the homodimeric or heterodimeric protein is a homodimer of the monomer comprising a human P40 subunit, an L1 linker, a human P35 subunit, an L1 linker, and a fusion protein of human IgG1, e.g., having the amino acid sequence set forth in SEQ ID No. 32.

In certain embodiments, the homodimeric or heterodimeric protein is a heterodimer of a first monomer: a fusion protein comprising a mouse P40 subunit, an L1 linker, and a human Fc-knob, and having the amino acid sequence set forth in SEQ ID No. 33; and a second monomer: a fusion protein comprising a mouse P35 subunit, an L1 linker, and a human Fc-hole, e.g., having the amino acid sequence structure set forth in SEQ ID No. 35.

In certain embodiments, the homodimeric or heterodimeric protein is a heterodimer of a first monomer: a fusion protein comprising a human P40 subunit, an L1 linker, and a human Fc-knob, and having the amino acid sequence set forth in SEQ ID No. 34; and a second monomer: a fusion protein comprising a human P35 subunit, an L1 linker, and a human Fc-hole, e.g., having the amino acid sequence structure set forth in SEQ ID No. 36.

In certain embodiments, the homodimeric or heterodimeric protein is a homodimer of the monomer: mouse IL12Rβ1, an L2 linker, a mouse P40 subunit, an L1 linker, a mouse P35 subunit, an L1 linker, and human IgG1, e.g., having the amino acid sequence set forth in SEQ ID No. 37.

In certain embodiments, the homodimeric or heterodimeric protein is a homodimer of the monomer: human IL12Rβ31, an L2 linker, a human P40 subunit, an L1 linker, a human P35 subunit, an L1 linker, and human IgG1, e.g., having the amino acid sequence set forth in SEQ ID No. 38.

In certain embodiments, the homodimeric or heterodimeric protein is a homodimer of the monomer: mouse IL12Rβ2, an L2 linker, a mouse P40 subunit, an L1 linker, a mouse P35 subunit, an L1 linker, and human IgG1, e.g., having the amino acid sequence set forth in SEQ ID No. 39.

In certain embodiments, the homodimeric or heterodimeric protein is a homodimer of the monomer: human IL12Rβ2, an L2 linker, a human P40 subunit, an L1 linker, a human P35 subunit, an L1 linker, and human IgG1, e.g., having the amino acid sequence set forth in SEQ ID No. 40.

In certain embodiments, the homodimeric or heterodimeric protein is a heterodimer of a first monomer: mouse IL12Rβ1, an L2 linker, a mouse P40 subunit, an L1 linker, a fusion protein of human Fc-knob, e.g., having the amino acid sequence set forth in SEQ ID No. 41; and a second monomer: a fusion protein of mouse IL12Rβ2, an L2 linker, a mouse P35 subunit, an L1 linker, and human Fc-hole of IL12, e.g., having the amino acid sequence set forth in SEQ ID No. 43.

In certain embodiments, the homodimeric or heterodimeric protein is a heterodimer of a first monomer: human IL12Rβ1, an L2 linker, a human P40 subunit, an L1 linker, a fusion protein of human Fc-knob, e.g., having the amino acid sequence set forth in SEQ ID No. 42; and a second monomer: a fusion protein of human IL12Rβ2, an L2 linker, a human P35 subunit, an L1 linker, and human Fc-hole of IL12, e.g., having the amino acid sequence set forth in SEQ ID No. 44.

In certain embodiments, the homodimeric or heterodimeric protein is a heterodimer of a first monomer: mouse IL12Rβ1, an L2 linker, a mouse P40 subunit, an L1 linker, a fusion protein of a human Fc-knob, e.g., having the amino acid sequence set forth in SEQ ID No. 45; and a second monomer: a fusion protein comprising a mouse P35 subunit comprising an SP1 signal peptide, an L1 linker, and a human Fc-hole, e.g., having the amino acid sequence set forth in SEQ ID No. 47.

In certain embodiments, the homodimeric or heterodimeric protein is a heterodimer of a first monomer: human IL12Rβ1, an L2 linker, a human P40 subunit, an L1 linker, a fusion protein of a human Fc-knob, e.g., having the amino acid sequence set forth in SEQ ID No. 46; and a second monomer: a fusion protein comprising a human P35 subunit comprising an SP1 signal peptide, an L1 linker, and a human Fc-hole, e.g., having the amino acid sequence set forth in SEQ ID No. 48.

In certain embodiments, the homodimeric or heterodimeric protein is a heterodimer of a first monomer: a fusion protein comprising a mouse P40 subunit, an L1 linker, and a human Fc-knob, e.g., having the amino acid sequence set forth in SEQ ID No. 49; and a second monomer: a fusion protein comprising mouse IL12Rβ2, an L2 linker, a mouse P35 subunit, an L1 linker, and human Fc-hole, e.g., having the amino acid sequence set forth in SEQ ID No. 51.

In certain embodiments, the homodimeric or heterodimeric protein is a heterodimer of a first monomer: a fusion protein comprising a human P40 subunit, an L1 linker, and a human Fc-knob, e.g., having the amino acid sequence set forth in SEQ ID No. 50; and a second monomer: a fusion protein comprising human IL12Rβ2, an L2 linker, a human P35 subunit, an L1 linker, and human Fc-hole, e.g., having the amino acid sequence set forth in SEQ ID No. 52.

In certain embodiments, the homodimeric or heterodimeric protein is hydrolyzed by a proteolytic enzyme specifically expressed in a tumor microenvironment.

In yet another aspect, the invention generally relates to a substantially purified protein, such as a fusion protein or a fragment, disclosed herein.

In yet another aspect, the invention generally relates to a polynucleotide encoding a protein, such as a fusion protein or a fragment thereof, disclosed herein.

In yet another aspect, the invention generally relates to an expression vector comprising a polynucleotide encoding a protein, such as a fusion protein or a fragment thereof, disclosed herein.

In yet another aspect, the invention generally relates to a pharmaceutical composition comprising a protein, such as a fusion protein or a fragment thereof, disclosed herein and a pharmaceutically acceptable excipient, carrier, or diluent.

In yet another aspect, the invention generally relates to a pharmaceutical composition comprising a polynucleotide encoding a protein, such as a fusion protein or a fragment thereof, disclosed herein and a pharmaceutically acceptable excipient, carrier, or diluent.

In yet another aspect, the invention generally relates to a method for treating a disease or condition. The method comprises administering to a patient in need thereof a therapeutically effective amount of a polynucleotide encoding a protein, such as a fusion protein or a fragment thereof, disclosed herein, wherein the disease or condition is selected from hyperplasia, solid tumor or hematopoietic malignancy.

In certain embodiments, the disease or condition being treated is hyperplasia.

In certain embodiments, the disease or condition being treated is a solid tumor.

In certain embodiments, the disease or condition being treated is a hematopoietic malignancy.

In certain embodiments, the subject being treated is further administered one or more of chemotherapy, radiotherapy, targeted therapy, immunotherapy or hormonal therapy.

In certain embodiments, the method further comprises administering a chemotherapeutic agent to the subject.

In certain embodiments, the method further comprises administering a radiotherapy to the subject.

In certain embodiments, the method further comprises administering a targeted therapy to the subject.

In certain embodiments, the method further comprises administering an immunotherapy to the subject.

In certain embodiments, the method further comprises administering hormonal therapy to the subject.

As used herein, the term "chemotherapeutic agent" refers to a chemical compound useful in the treatment of cancer. Examples of chemotherapeutic agents include Erlotinib (TARCEVA®, Genentech/OSI Pharm.), Bortezomib (VELCADE®, Millennium Pharm.), Fulvestrant (FASLODEX®, AstraZeneca), Sutent (SU11248, Pfizer), Letrozole (FEMARA®, Novartis), Imatinib mesylate (GLEEVEC®, Novartis), PTK787/ZK 222584 (Novartis), Oxaliplatin (Eloxatin®, Sanofi), 5-FU (5-fluorouracil), Leucovorin, Rapamycin (Sirolimus, RAPAMUNE®, Wyeth), Lapatinib (TYKERB®, GSK572016, Glaxo Smith Kline), Lonafarnib (SCH 66336), Sorafenib (BAY43-9006, Bayer Labs), and Gefitinib (IRESSA®, AstraZeneca), AG1478, AG1571 (SU 5271; Sugen), alkylating agents such as thiotepa and CYTOXAN® cyclosphosphamide; alkyl sulfonates such as busulfan, improsulfan and piposulfan; aziridines such as benzodopa, carboquone, meturedopa, and uredopa; ethylenimines and methylamelamines including altretamine, triethylenemelamine, triethylenephosphoramide, triethylenethiophosphoramide and trimethylomelamine; acetogenins (especially bullatacin and bullatacinone); a camptothecin (including the synthetic analog topotecan); bryostatin; callystatin; CC-1065 (including its adozelesin, carzelesin and bizelesin synthetic analogs); cryptophycins (particularly cryptophycin 1 and cryptophycin 8); dolastatin; duocarmycin (including the synthetic analogs, KW-2189 and CB1-TM1); eleutherobin; pancratistatin; a sarcodictyin; spongistatin; nitrogen mustards such as chlorambucil, chlornaphazine, chlorophosphamide, estramustine, ifosfamide, mechlorethamine, mechlorethamine oxide hydrochloride, melphalan, novembichin, phenesterine, prednimustine, trofosfamide, uracil mustard; nitrosureas such as carmustine, chlorozotocin, fotemustine, lomustine, nimustine, and ranimnustine; antibiotics such as the enediyne antibiotics (e.g., calicheamicin, especially calicheamicin gammaII and calicheamicin omegaII (Angew Chem. Intl. Ed. Engl. (1994) 33: 183-186); dynemicin, including dynemicin A; bisphosphonates, such as clodronate; an esperamicin; as well as neocarzinostatin chromophore and related chromoprotein enediyne antibiotic chromophores), aclacinomysins, actinomycin, authramycin, azaserine, bleomycins, cactinomycin, carabicin, caminomycin, carzinophilin, chromomycinis, dactinomycin, daunorubicin, detorubicin, 6-diazo-5-oxo-L-norleucine, ADRIAMYCIN® (doxorubicin), morpholino-doxorubicin, cyanomorpholino-doxorubicin, 2-pyrrolino-doxorubicin and deoxydoxorubicin), epirubicin, esonibicin, idarubicin, marcellomycin, mitomycins such as mitomycin C, mycophenolic acid, nogalamycin, olivomycins, peplomycin, porfiromycin, puromycin, quelamycin, rodorubicin, streptonigrin, streptozocin, tubercidin, ubenimex, zinostatin, zorubicin; anti-metabolites such as methotrexate and 5-fluorouracil (5-FU); folic acid analogs such as denopterin, methotrexate, pteropterin, trimetrexate; purine analogs such as fludarabine, 6-mercaptopurine, thiamniprine, thioguanine; pyrimidine analogs such as ancitabine, azacitidine, 6-azauridine, carmofur, cytarabine, dideoxyuridine, doxifluridine, enocitabine, floxuridine; androgens such as calusterone, dromostanolone propionate, epitiostanol, mepitiostane, testolactone; anti-adrenals such as aminoglutethimide, mitotane, trilostane; folic acid replenisher such as frolinic acid; aceglatone; aldophosphamide glycoside; aminolevulinic acid; eniluracil; amsacrine; bestrabucil; bisantrene; edatraxate; defofamine; demecolcine; diaziquone; elformithine; elliptinium acetate; an epothilone; etoglucid; gallium nitrate; hydroxyurea; lentinan; lonidainine; maytansinoids such as maytansine and ansamitocins; mitoguazone; mitoxantrone; mopidanmol; nitraerine; pentostatin; phenamet; pirarubicin; losoxantrone; podophyllinic acid; 2-ethylhydrazide; procarbazine; PSK® polysaccharide complex (JHS Natural Products, Eugene, Oreg.); razoxane; rhizoxin; sizofuran; spirogermanium; tenuazonic acid; triaziquone; 2,2',2"-trichlorotriethylamine; trichothecenes (especially T-2 toxin, verracurin A, roridin A and anguidine); urethan; vindesine; dacarbazine; mannomustine; mitobronitol; mitolactol; pipobroman; gacytosine; arabinoside ("Ara-C"); cyclophosphamide; thiotepa; taxoids, e.g., TAXOL® (paclitaxel; Bristol-Myers Squibb Oncology, Princeton, N.J.), ABRAXANE® (Cremophor-free), albumin-engineered nanoparticle formulations of paclitaxel (American Pharmaceutical Partners, Schaumberg, 111.), and TAXOTERE® (doxetaxel; Rhone-Poulenc Rorer, Antony, France); chloranmbucil; GEMZAR® (gemcitabine); 6-thioguanine; mercaptopurine; methotrexate; platinum analogs such as cisplatin and carboplatin; vinblastine; etoposide (VP-16); ifosfamide; mitoxantrone; vincristine; NAVELBINE® (vinorelbine); novantrone; teniposide; edatrexate; daunomycin; aminopterin; capecitabine (XELODA®); ibandronate; CPT-11; topoisomerase inhibitor RFS 2000; difluoromethylomithine (DMFO); retinoids such as retinoic acid; and pharmaceutically acceptable salts, acids and derivatives of any of the above.

Examples of the second (or further) agent or therapy may include, but are not limited to, immunotherapies (e.g. PD-1 inhibitors (pembrolizumab, nivolumab, cemiplimab), PD-L1 inhibitors (atezolizumab, avelumab, durvalumab), CTLA4 antagonists (ipilimumab), cell signal transduction inhibitors (e.g., imatinib, gefitinib, bortezomib, erlotinib, sorafenib, sunitinib, dasatinib, vorinostat, lapatinib, temsirolimus, nilotinib, everolimus, pazopanib, trastuzumab, bevacizumab, cetuximab, ranibizumab, pegaptanib, panitumumab and the like), mitosis inhibitors (e.g., paclitaxel, vincristine, vinblastine and the like), alkylating agents (e.g., cisplatin, cyclophosphamide, chromabucil, carmustine and the like), anti-metabolites (e.g., methotrexate, 5-FU and the like), intercalating anticancer agents, (e.g., actinomycin, anthracycline, bleomycin, mitomycin-C and the like), topoisomerase inhibitors (e.g., irinotecan, topotecan, teniposide and the like), immunotherapic agents (e.g., interleukin, interferon and the like) and antihormonal agents (e.g., tamoxifen, raloxifene and the like).

In yet another aspect, the invention generally relates to use of a protein, such as a fusion protein or a fragment thereof, disclosed herein for treating or reducing a disease or disorder (e.g., hyperplasia, solid tumor or hematopoietic malignancy).

In yet another aspect, the invention generally relates to use of a polynucleotide encoding a protein, such as a fusion protein or a fragment thereof, disclosed herein for treating or reducing a disease or disorder (e.g., hyperplasia, solid tumor or hematopoietic malignancy).

In yet another aspect, the invention generally relates to use of a protein, such as a fusion protein or a fragment thereof, disclosed herein and a pharmaceutically acceptable excipient, carrier, or diluent, in preparation of a medicament for treating or reducing a disease or disorder (e.g., hyperplasia, solid tumor or hematopoietic malignancy).

In yet another aspect, the invention generally relates to use of a polynucleotide encoding a protein, such as a fusion protein or a fragment thereof, disclosed herein and a pharmaceutically acceptable excipient, carrier, or diluent, in preparation of a medicament for treating or reducing a disease or disorder (e.g., hyperplasia, solid tumor or hematopoietic malignancy).

In certain embodiments, the medicament is an anticancer drug.

In certain embodiments, the disease or disorder is one or more selected from head and neck cancer, endometrial cancer, colorectal cancer, ovarian cancer, breast cancer, melanoma, lung cancer, renal cancer, liver cancer, anal cancer, sarcoma, lymphoma, leukemia, brain tumors, gastric cancer, testicular cancer, pancreatic cancer, and thyroid cancer.

In certain embodiments, the anticancer drug is effective for treating B-cell lymphoma or anti-colorectal cancer.

In yet another aspect, the invention generally relates to a cell line comprising a polynucleotide encoding a protein, such as a fusion protein or a fragment thereof, disclosed herein.

In yet another aspect, the invention generally relates to a method for making a protein, comprising culturing the cell line. In certain embodiments, the method further comprises purifying or isolating a produced protein, such as a fusion protein or a fragment thereof, disclosed herein.

In yet another aspect, the invention generally relates to a method for making a protein. The method comprises: providing an expression vector encoding a protein, such as a fusion protein or a fragment thereof, disclosed herein; introducing the expression vector into a host cell; culturing the host cell in media under conditions sufficient to express the protein; and purifying the protein from the host cell or media.

Any suitable expression vectors may be employed. An exemplary expression vector is pEE12.4 expression vector.

Any suitable host cell may be employed, for examples, 293F and CHO cells.

Introduction of the expression vector can be accomplished by any suitable transfection method and can be via a transient transfection or a stable cell line.

Any suitable purification method may be employed. An exemplary purification method is by affinity chromatography of ProteinA/G or size exclusion methods.

In yet another aspect, the invention generally relates to an isolated protein produced by a method disclosed herein.

In certain embodiments, the isolated protein is substantially pure.

As disclosed herein, linker sequences can be used to link two or more polypeptides of the biologically active polypeptide to generated a single-chain molecule with a desired functional activity.

Any suitable linkers may be adopted. Exemplary peptide linker sequences include those having from about 7 to 20 amino acids, e.g., from about 8 to 16 amino acids. The linker sequence is preferably flexible so as not hold the biologically active polypeptide or effector molecule in a single undesired conformation. The linker sequence can be used, e.g., to space the recognition site from the fused molecule. Specifically, the peptide linker sequence can be positioned so as to provide molecular flexibility. The linker preferably predominantly comprises amino acids with small side chains, such as glycine, alanine and serine, to provide for flexibility.

In general, preparation of the fusion protein complexes of the invention can be accomplished by procedures disclosed herein and by recognized recombinant DNA techniques involving, e.g., polymerase chain amplification reactions (PCR), preparation of plasmid DNA, cleavage of DNA with restriction enzymes, preparation of oligonucleotides, ligation of DNA, isolation of mRNA, introduction of the DNA into a suitable cell, transformation or transfection of a host, culturing of the host. Additionally, the fusion molecules can be isolated and purified using chaotropic agents and well known electrophoretic, centrifugation and chromatographic methods. (Sambrook, et al., *Molecular Cloning: A Laboratory Manual* (2nd ed. (1989); and Ausubel, et al., *Current Protocols in Molecular Biology*, John Wiley & Sons, New York (1989) for disclosure relating to these methods.)

The invention further provides nucleic acid sequences and DNA sequences that encode the present fusion proteins. The DNA sequence may be carried by a vector suited for extrachromosomal replication such as a phage, virus, plasmid, phagemid, cosmid, YAC, or episome. For example, a DNA vector that encodes a desired fusion protein can be used to facilitate preparative methods described herein and to obtain significant quantities of the fusion protein or components thereof. The DNA sequence can be inserted into an appropriate expression vector, i.e., a vector that contains the necessary elements for the transcription and translation of the inserted protein-coding sequence. A variety of host-vector systems may be utilized to express the protein-coding sequence. These may include mammalian cell systems infected with virus (e.g., vaccinia virus, adenovirus, etc.); insect cell systems infected with virus (e.g., baculovirus); microorganisms such as yeast containing yeast vectors, or bacteria transformed with bacteriophage DNA, plasmid DNA or cosmid DNA. Depending on the host-vector system utilized, any one of a number of suitable transcription and translation elements may be used. (Sambrook, et al., *Molecular Cloning: A Laboratory Manual* (2nd ed. (1989); and Ausubel, et al., *Current Protocols in Molecular Biology*, John Wiley & Sons, New York (1989) for disclosure relating to these methods.)

Fusion protein components encoded by the DNA vector can be provided in a cassette format. By the term "cassette" is meant that each component can be readily substituted for another component by standard recombinant methods. In particular, a DNA vector configured in a cassette format is particularly desirable when the encoded fusion complex is to be used against pathogens that may have or have capacity to develop serotypes.

To make the vector coding for a fusion protein complex, the sequence coding for the biologically active polypeptide is linked to a sequence coding for the effector peptide by use of suitable ligases. DNA coding for the presenting peptide can be obtained by isolating DNA from natural sources such as from a suitable cell line or by known synthetic methods, e.g. the phosphate triester method. (Oligonucleotide Synthesis, IRL Press, M. J. Gait, ed., 1984). Synthetic oligonucleotides also may be prepared using commercially available automated oligonucleotide synthesizers. Once isolated, the gene coding for the biologically active polypeptide can be amplified by PCR or other means known in the art.

Suitable PCR primers to amplify the biologically active polypeptide gene may add restriction sites to the PCR product. The PCR product preferably includes splice sites for the effector peptide and leader sequences necessary for proper expression and secretion of the biologically active polypeptide-effector fusion complex. The PCR product also preferably includes a sequence coding for the linker sequence, or a restriction enzyme site for ligation of such a sequence.

The fusion proteins described herein may be produced by standard recombinant DNA techniques. For example, once a DNA molecule encoding the biologically active polypeptide is isolated, sequence can be ligated to another DNA molecule encoding the effector polypeptide. The nucleotide sequence coding for a biologically active polypeptide may be directly joined to a DNA sequence coding for the effector peptide or, more typically, a DNA sequence coding for the linker sequence as discussed herein may be interposed between the sequence coding for the biologically active polypeptide and the sequence coding for the effector peptide and joined using suitable ligases. The resultant hybrid DNA molecule can be expressed in a suitable host cell to produce the fusion protein complex. The DNA molecules are ligated to each other in a 5' to 3' orientation such that, after ligation, the translational frame of the encoded polypeptides is not altered (i.e., the DNA molecules are ligated to each other in-frame). The resulting DNA molecules encode an in-frame fusion protein.

Other nucleotide sequences also can be included in the gene construct. For example, a promoter sequence, which controls expression of the sequence coding for the biologically active polypeptide fused to the effector peptide, or a leader sequence, which directs the fusion protein to the cell surface or the culture medium, can be included in the construct or present in the expression vector into which the construct is inserted.

In obtaining variant biologically active polypeptide, IL12, IL12R or Fc domain coding sequences, those of ordinary skill in the art will recognize that the polypeptides may be modified by certain amino acid substitutions, additions, deletions, and post-translational modifications, without loss or reduction of biological activity. In particular, it is well-known that conservative amino acid substitutions, that is, substitution of one amino acid for another amino acid of similar size, charge, polarity and conformation, are unlikely to significantly alter protein function. The 20 standard amino acids that are the constituents of proteins can be broadly categorized into four groups of conservative amino acids as follows: the nonpolar (hydrophobic) group includes alanine, isoleucine, leucine, methionine, phenylalanine, proline, tryptophan and valine; the polar (uncharged, neutral) group includes asparagine, cysteine, glutamine, glycine, serine, threonine and tyrosine; the positively charged (basic) group contains arginine, histidine and lysine; and the negatively charged (acidic) group contains aspartic acid and glutamic acid. Substitution in a protein of one amino acid for another within the same group is unlikely to have an adverse effect on the biological activity of the protein. In other instance, modifications to amino acid positions can be made to reduce or enhance the biological activity of the protein. Such changes can be introduced randomly or via site-specific mutations based on known or presumed structural or functional properties of targeted residue(s). Following expression of the variant protein, the changes in the biological activity due to the modification can be readily assessed using binding or functional assays.

Homology between nucleotide sequences can be determined by DNA hybridization analysis, wherein the stability of the double-stranded DNA hybrid is dependent on the extent of base pairing that occurs. Conditions of high temperature and/or low salt content reduce the stability of the hybrid, and can be varied to prevent annealing of sequences having less than a selected degree of homology. For instance, for sequences with about 55% G-C content, hybridization and wash conditions of 40-50 C, 6×SSC (sodium chloride/sodium citrate buffer) and 0.1% SDS (sodium dodecyl sulfate) indicate about 60-70% homology, hybridization and wash conditions of 50-65 C, 1×SSC and 0.1% SDS indicate about 82-97% homology, and hybridization and wash conditions of 52 C, 0.1×SSC and 0.1% SDS indicate about 99-100% homology. A wide range of computer programs for comparing nucleotide and amino acid sequences (and measuring the degree of homology) are also available. Readily available sequence comparison and multiple sequence alignment algorithms are, respectively, the Basic Local Alignment Search Tool (BLAST) and ClustalW programs.

A number of strategies can be employed to express protein fusion complexes of the invention. For example, the fusion protein construct described above can be incorporated into a suitable vector by known means such as by use of restriction enzymes to make cuts in the vector for insertion of the construct followed by ligation. The vector containing the gene construct is then introduced into a suitable host for expression of the fusion protein. (Sambrook et al., *Molecular Cloning: A Laboratory Manual* (2nd ed. (1989) for disclosure relating to these methods.)

Selection of suitable vectors can be made empirically based on factors relating to the cloning protocol. For example, the vector should be compatible with, and have the proper replicon for the host that is being employed. Further the vector must be able to accommodate the DNA sequence coding for the fusion protein complex that is to be expressed. Suitable host cells include eukaryotic and prokaryotic cells, preferably those cells that can be easily transformed and exhibit rapid growth in culture medium. Specifically, preferred hosts cells include prokaryotes such as *E. coli, Bacillus subtillus*, etc. and eukaryotes such as animal cells and yeast strains, e.g., *S. cerevisiae*. Mammalian cells are generally preferred, particularly J558, NSO, SP2-0 or CHO. Other suitable hosts include, e.g., insect cells such as Sf9. Conventional culturing conditions are employed. See Sambrook, supra. Stable transformed or transfected cell lines can then be selected. Cells expressing a fusion protein complex of the invention can be determined by known procedures. For example, expression of a fusion protein complex linked to an immunoglobulin can be determined by an ELISA specific for the linked immunoglobulin and/or by immunoblotting. Other methods for detecting expression of fusion proteins comprising biologically active polypeptides linked to IL12 or IL12R domains are disclosed in the Examples.

A host cell can be used for preparative purposes to propagate nucleic acid encoding a desired fusion protein or a component thereof. A host cell can include a prokaryotic or eukaryotic cell in which production of the fusion protein is specifically intended. Thus, host cells specifically include yeast, fly, worm, plant, frog, mammalian cells and organs that are capable of propagating nucleic acid encoding the fusion. Non-limiting examples of mammalian cell lines which can be used include CHO dhfr-cells (Urlaub and Chasm, 1980 *Proc. Natl. Acad. Sci. USA*, 77:4216), 293 cells (Graham et al. 1977 *J. Gen. Virol.*, 36:59 ( )) or myeloma cells like SP2 or NSO (Galfre and Milstein, 1981 *Meth. Enzymol.*, 73(B):3).

Host cells capable of propagating nucleic acid encoding a desired fusion protein complexes encompass non-mammalian eukaryotic cells as well, including insect (e.g., *Sp. frugiperda*), yeast (e.g., *S. cerevisiae, S. pombe, P. pastoris, K. lactis, H. polymorpha*; as generally reviewed by Fleer, R., 1992 *Current Opinion in Biotechnology*, 3(5):486496), fungal and plant cells. Also contemplated are certain prokaryotes such as *E. coli* and *Bacillus*.

Nucleic acid encoding a desired fusion protein can be introduced into a host cell by standard techniques for transfecting cells. The term "transfecting" or "transfection" is intended to encompass all conventional techniques for introducing nucleic acid into host cells, including calcium phosphate co-precipitation, DEAE-dextran-mediated transfection, lipofection, electroporation, microinjection, viral transduction and/or integration.

Various promoters (transcriptional initiation regulatory region) may be used according to the invention. The selection of the appropriate promoter is dependent upon the proposed expression host. Promoters from heterologous sources may be used as long as they are functional in the chosen host.

Promoter selection is also dependent upon the desired efficiency and level of peptide or protein production. Inducible promoters such as tac are often employed in order to dramatically increase the level of protein expression in *E. coli*. Overexpression of proteins may be harmful to the host cells. Consequently, host cell growth may be limited. The use of inducible promoter systems allows the host cells to be cultivated to acceptable densities prior to induction of gene expression, thereby facilitating higher product yields.

Various signal sequences may be used according to the invention. A signal sequence which is homologous to the biologically active polypeptide coding sequence may be used. Alternatively, a signal sequence which has been selected or designed for efficient secretion and processing in the expression host may also be used. A signal sequence may be joined directly through the sequence encoding the signal peptidase cleavage site to the protein coding sequence, or through a short nucleotide bridge.

The expression construct can be assembled by employing known recombinant DNA techniques. Restriction enzyme digestion and ligation are the basic steps employed to join two fragments of DNA. Polylinkers and adaptors may be employed to facilitate joining of selected fragments. The expression construct can typically be assembled in stages employing rounds of restriction, ligation, and transformation of *E. coli*. Numerous cloning vectors suitable for construction of the expression construct are known in the art (XZAP and pBLUESCRIPT SK-1, Stratagene, La Jolla, Calif., pET, Novagen Inc., Madison, Wis.).

The expression construct may be transformed into the host as the cloning vector construct, either linear or circular, or may be removed from the cloning vector and used as is or introduced onto a delivery vector. The delivery vector facilitates the introduction and maintenance of the expression construct in the selected host cell type. The expression construct is introduced into the host cells by any of a number of known gene transfer systems (e.g., natural competence, chemically mediated transformation, protoplast transformation, electroporation, biolistic transformation, transfection, or conjugation). The gene transfer system selected depends upon the host cells and vector systems used.

The present invention further provides a production process for isolating a fusion protein of interest. In the process, a host cell (e.g., a yeast, fungus, insect, bacterial or animal cell), into which has been introduced a nucleic acid encoding the protein of the interest operatively linked to a regulatory sequence, is grown at production scale in a culture medium to stimulate transcription of the nucleotides sequence encoding the fusion protein of interest. Subsequently, the fusion protein of interest is isolated from harvested host cells or from the culture medium. Standard protein purification techniques can be used to isolate the protein of interest from the medium or from the harvested cells. In particular, the purification techniques can be used to express and purify a desired fusion protein on a large-scale (i.e. in at least milligram quantities) from a variety of implementations including roller bottles, spinner flasks, tissue culture plates, bioreactor, or a fermentor.

An expressed protein fusion complex can be isolated and purified by known methods. Typically the culture medium is centrifuged or filtered and then the supernatant is purified by affinity or immunoaffinity chromatography, e.g. Protein-A or Protein-G affinity chromatography or an immunoaffinity protocol comprising use of monoclonal antibodies that bind the expressed fusion complex such as a linked TCR or immunoglobulin region thereof. The fusion proteins of the present invention can be separated and purified by appropriate combination of known techniques. These methods include, for example, methods utilizing solubility such as salt precipitation and solvent precipitation, methods utilizing the difference in molecular weight such as dialysis, ultra-filtration, gel-filtration, and SDS-polyacrylamide gel electrophoresis, methods utilizing a difference in electrical charge such as ion-exchange column chromatography, methods utilizing specific affinity such as affinity chromatography, methods utilizing a difference in hydrophobicity such as reverse-phase high performance liquid chromatography and methods utilizing a difference in isoelectric point, such as isoelectric focusing electrophoresis, metal affinity columns such as Ni-NTA. (Sambrook et al., *Molecular Cloning: A Laboratory Manual* (2nd ed. (1989); and Ausubel et al., *Current Protocols in Molecular Biology*, John Wiley & Sons, New York (1989) for disclosure relating to these methods.)

It is preferred that the fusion proteins of the present invention be substantially pure. That is, the fusion proteins have been isolated from cell substituents that naturally accompany it so that the fusion proteins are present preferably in at least 80% or 90% to 95% homogeneity (w/w). Fusion proteins having at least 98 to 99% homogeneity (w/w) are most preferred for many pharmaceutical, clinical and research applications. Once substantially purified the fusion protein should be substantially free of contaminants for therapeutic applications. Once purified partially or to substantial purity, the soluble fusion proteins can be used therapeutically, or in performing in vitro or in vivo assays as disclosed herein. Substantial purity can be determined by a variety of standard techniques such as chromatography and gel electrophoresis.

The invention also provides a pharmaceutical preparation comprising a therapeutically effective amount of a composition, a fusion protein, a polynucleotide, a gene construct, a vector or a host cell according to the invention and a pharmaceutically acceptable excipient or vehicle.

Preferred excipients for use in the present invention include sugars, starches, celluloses, gums and proteins. In a preferred embodiment, the pharmaceutical composition of the invention is formulated in a pharmaceutical form for administration as a solid (for example tablets, capsules, lozenges, granules, suppositories, crystalline or amorphous sterile solids that can be reconstituted to provide liquid forms, etc.), liquid (for example solutions, suspensions, emulsions, elixirs, lotions, unguents, etc.) or semi-solid (gels, ointments, creams and similar). The pharmaceutical compositions of the invention can be administered by any route, including, without limitation, oral, intravenous, intramuscular, intraarterial, intramedullary, intratecal, intraventricular, transdermic, subcutaneous, intraperitoneal, intranasal, enteric, topical, sublingual or rectal route. A revision of the different forms of administration of active principles, the excipients to be used and their manufacturing procedures can be found in Remington's Pharmaceutical Sciences (A. R. Gennaro, Ed.), $20^{th}$ edition, Williams & Wilkins PA, USA (2000) Examples of pharmaceutically acceptable vehicles are known in the state of the technique and include saline solutions buffered with phosphate, water, emulsions, such as oil/water emulsions, different types of humidifying agents, sterile solutions, etc. The compositions comprising said vehicles can be formulated by conventional procedures known in the state of the technique.

In the case of the pharmaceutical composition of the invention comprising nucleic acids (the polynucleotides of the invention, vectors or gene constructs), the invention contemplates specially prepared pharmaceutical compositions for administering said nucleic acids. The pharmaceutical compositions can comprise said nucleic acids in naked form, in other words, in the absence of compounds protecting the nucleic acids from degradation by the organism's nucleases, which entails the advantage of eliminating the toxicity associated to the reagents used for transfection. Suitable routes of administration for the naked compounds include intravascular, intratumoral, intracraneal, intraperitoneal, intrasplenic, intramuscular, subretinal, subcutaneous, mucous, topical and oral route (Templeton, 2002 DNA Cell Biol., 21:857-867). Alternatively, the nucleic acids can be administered forming part of liposomes, conjugated to cholesterol or conjugated to compounds capable of promoting translocation through cell membranes such as the Tat peptide derived from the TAT protein of HIV-1, the third helix of the homeodomain of the Antennapedia protein of *D. melanogaster*, the VP22 protein of the herpes simplex virus, oligomers of arginine and peptides such as those described in WO07069090 (Lindgren, et al. 2000 *Trends Pharmacol. Sci* 21:99-103; Schwarze, et al. 2000 *Trends Pharmacol. Sci.* 21:45-48; Lundberg, et al. 2003 Mol. Therapy 8:143-150; and Snyder, et al. 2004 *Pharm. Res.* 21:389-393). Alternatively, the polynucleotide can be administered forming part of a plasmidic vector or of a viral vector, preferably vectors based on an adenovirus, in adeno-associated viruses or in retroviruses, such as viruses based on the virus of murine leukaemia (MLV) or on lentiviruses (HIV, FIV, EIAV).

The compositions of the invention can be administered at doses of less than 10 mg per kilogram of body weight, preferably less than 5, 2, 1, 0.5, 0.1, 0.05, 0.01, 0.005, 0.001, 0.0005, 0.0001, 0.00005 or 0.00001 mg per each kg of body weight and less than 200 nmol of agent, in other words, approximately $4.4 \times 10^{16}$ copies per kg of body weight or less than 1500, 750, 300, 150, 75, 15, 7.5, 1.5, 0.75, 0.15 or 0.075 nmol per Kg of body weight. The unitary dose can be administered by injection, by inhalation or by topical administration. The bifunctional polynucleotides and compositions of the invention can be administered directly into the organ in which the target mRNA is expressed in which case doses will be administered of between 0.00001 mg and 3 mg per organ, or preferably between 0.0001 and 0.001 mg per organ, about 0.03 and 3.0 mg per organ, about 0.1 and 3.0 mg per organ or between 0.3 and 3.0 mg per organ.

The dose will depend on the severity and response to the condition to be treated and may vary between several days and several months or until the condition is seen to remit. The optimum dose can be determined by periodically measuring the agent's concentrations in the patient's organism. The optimum dose can be determined from the EC50 values obtained through previous in vitro or in vivo tests in animal models. The unitary dose can be administered once a day or less than once a day, preferably, less than once every 2, 4, 8 or 30 days. Alternatively, it is possible to administer an initial dose followed by one or several maintenance doses, generally in a lesser amount that the initial dose. The maintenance regime may involve treating the patient with doses ranging between 0.01 µg and 1.4 mg/kg of body weight per day, for example 1, 0.1, 0.01, 0.001, or 0.00001 mg per kg of body weight per day. Maintenance doses are administered, preferably, at most once every 5, 10 or 30 days. The treatment must continue for a time that will vary according to the type of alteration suffered by the patient, its severity and the patient's condition. Following treatment, the patient's evolution must be monitored in order to determine whether the dose ought to be increased in the case of the disease not responding to the treatment or whether the dose ought to be decreased in the case of observing an improvement in the disease or unwanted secondary effects.

The daily dose can be administered in a single dose or in two or more doses according to the particular circumstances. If a repeated administration or frequent administrations are required, it is advisable to implant an administration device, such as a pump, a semi-permanent catheter (intravenous, intraperitoneal, intracisternal or intracapsular) or a reservoir.

The compositions of the invention are administered according to methods known to an expert in the art, including, without limitation, intravenous, oral, nasal, parenteral, topical, transdermic, rectal and similar.

The following examples are meant to be illustrative of the practice of the invention and not limiting in any way.

EXAMPLES

The below Examples describe certain exemplary embodiments of compounds prepared according to the disclosed invention. It will be appreciated that the following general methods, and other methods known to one of ordinary skill in the art, can be applied to compounds and subclasses and species thereof, as disclosed herein.

Example 1. Design of Seven IL12-Fc Prodrugs

IL12 has two subunits, p35 and p40. The Fc segment of human IgG1, human Fc-knob and human Fc-hole were used to construct the corresponding prodrugs. The prodrug design links the two subunits of IL12 in serial or parallel. The specific forms are as follows:

FIG. 1 is a schematic showing the structure of Homodimer-IL12-Fc (Homo IL12), in which two subunits are linked in series, and the molecular weight of the dimer is 175 KD (MW=175 KD).

Figure 2:
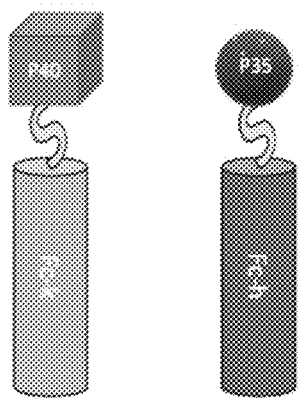
FIG. 2 shows a schematic diagram of the structure of IL12-Fc dimer prodrug: Heterodimer-IL12-Fc (Het IL12) in parallel form, Fc-k is a short for Fc-knob, and Fc-h is short for Fc-hole.
Figure 3:
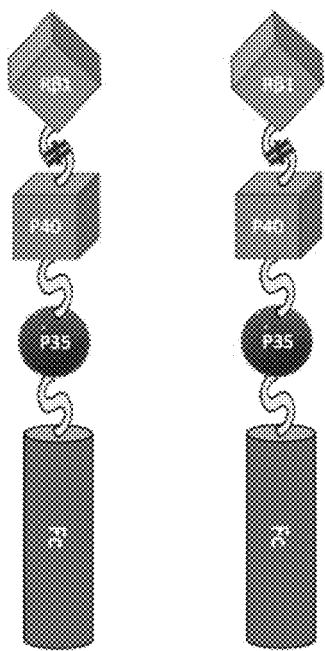
FIG. 3 shows a schematic diagram of the structure of Homodimer-IL12-Rβ1 dimer prodrug (Homo-R1).
Figure 4:
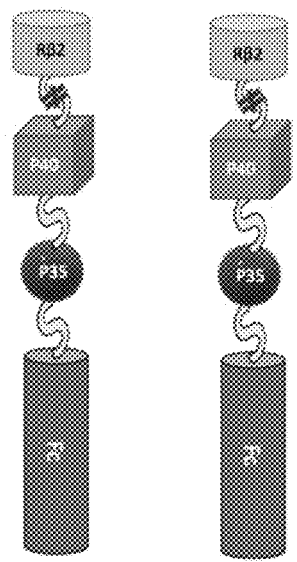
FIG. 4 shows a schematic diagram of the structure of Homodimer-IL12-Rβ2 dimer prodrug (Homo-R2).
Figure 7:
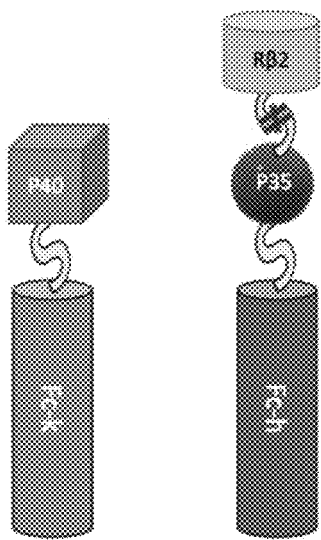
FIG. 7 shows a schematic diagram of the structure of Heterodimer-IL12-Rβ2 dimer prodrug (Het-R2), Fc-k is short for Fc-knob, and Fc-h is short for Fc-hole.
Figure 8:
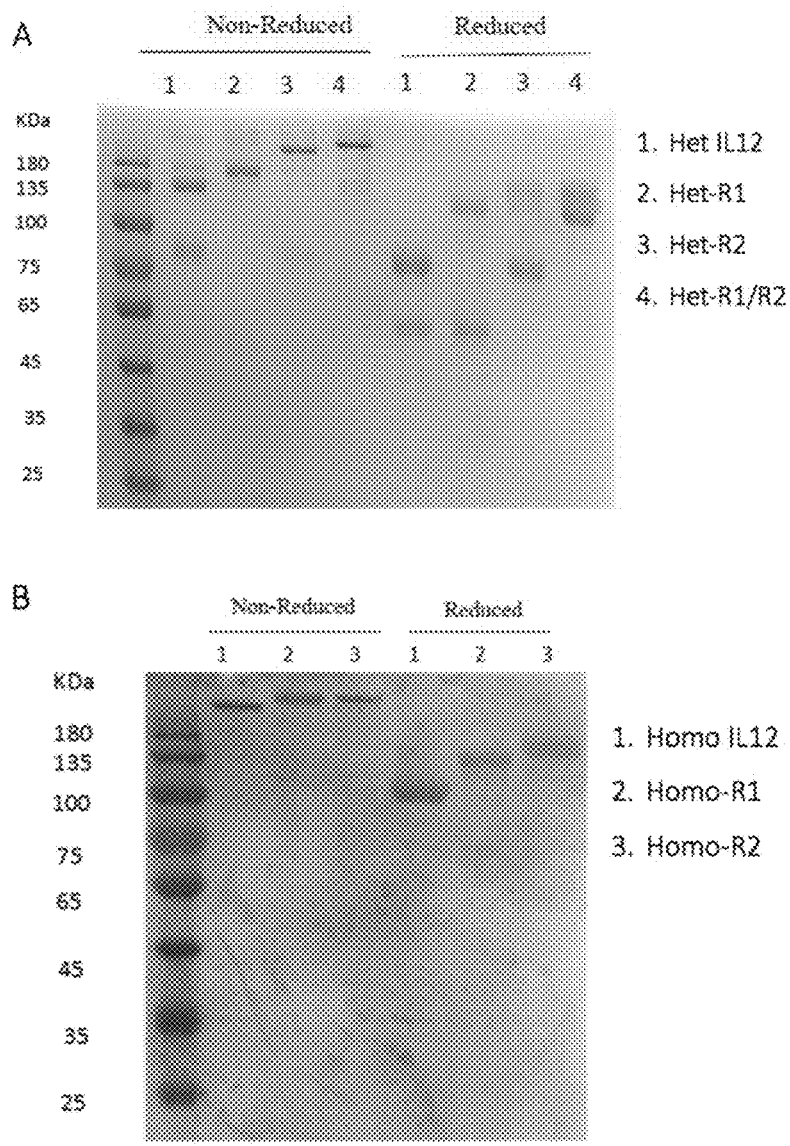
FIG. 8 shows exemplary data of SDS-PAGE electrophoresis results of the expression of the seven fusion proteins in FIGS. 1~7.

FIG. 2 is a schematic diagram showing the structure of Heterodimer-IL12-Fc (Het IL12), in which two subunits are linked in parallel. The molecular weight of the dimer is 115 KD (MW=115 KD), and a P35 signal peptide and a P40 signal peptide were added in the N-terminus of the P35 and P40 subunits, respectively.

The prodrug forms block IL12 from binding to either of its receptors or simultaneously block binding to both receptors, IL12Rβ1 and IL12Rβ2. A portion of the extracellular domain of IL12Rβ1, comprised of two Fibronectin type-III domains (I+II) at the N-terminus of IL12Rβ1 and referred to as RD 1, is fused to the N-terminus of P40. Rβ1 serves as a decoy competitively preventing endogenous IL12Rβ1 interaction with P40. P35 is blocked using the two Fibronectin type-III domains (I+II) at the N-terminus of IL12Rβ2, referred to as Rβ2, thereby preventing P35 interaction with endogenous IL12Rβ2.

The prodrug construct for Homodimer-IL12 is shown in FIG. 3.

FIG. 3 is a schematic diagram of the prodrug structure of Homodimer-IL12-Rβ1 (referred to as Homo-R1), dimer MW=232 KD.

FIG. 4 is a schematic diagram of the prodrug structure of Homodimer-IL12-Rβ2 (referred to as Homo-R2), dimer MW=250 KD.

FIG. 5 is a schematic diagram of the prodrug structure of Heterodimer-IL12-Rβ1/Rβ2 (referred to as Het-R1/R2), dimer MW=182 KD.

FIG. 6 is a schematic diagram of the prodrug structure of Heterodimer-IL12-Rβ1 (referred to as Het-R1), dimer MW=144 KD, and P35 signal peptide was added to the C-terminus of the fusion segment P35 of the P35-Fc-hole monomer in this dimer.

FIG. 7 is a schematic diagram of the prodrug structure of Heterodimer-IL12-Rβ2 (referred to as Het-R2), dimer MW=153 KD, and P40 signal peptide was added to the C-terminal of the fusion segment P40 of the P40-Fc-knob monomer in this dimer.

Example 2. Construction, Purification and Production of IL12 Prodrug

The seven proteins described in Example 1 were expressed and produced. First, the recombinant DNA for each fusion protein, constructed on the expression vector pEE12.4, were transfected into 293F or CHO cells. The host cells were cultured and the cell supernatant was collected. Then, the protein was purified from the supernatant by affinity chromatography column of Protein A/G.

For the expression of homodimer proteins, constructed expression vector plasmids were transferred to the 293 or CHO cell hosts. The plasmid expression products in the cell can spontaneously form a homodimer protein. For the expression of the heterodimer protein, it was necessary to transfect with two expression vector plasmids with the same molar ratio, and the monomer expressed in the cell can also spontaneously form the heterodimer.

The SDS-PAGE electrophoresis result is shown in FIG. 8.

Procedures employed for construction of vector, transfection of host cells and induction of expression are discussed below.

The expression plasmids of various fusion proteins were constructed on the vector of PEE12.4 and transfected into 293F or CHO cells. Proteins expressed in the culture supernatant of were purified by Protein A affinity chromatography column.

Expression vectors were constructed as follows:

(1) PEE12.4-HindIII-p40(signal)-NruI-p35(no signal)-BsiWI-hIgG1-EcoRI
(2) PEE12.4-HindIII-P35(signal)-BsiWI-Fch-EcoRI
(3) PEE12.4-HindIII-P40(signal)-NruI-Fck-EcoRI
(4) PEE12.4-HindIII-IL12Rb1-BsiWI-p40 (no signal)-NruI-p35 (no signal)-BsiWI-hIgG1-EcoRI (5) PEE12.4-HindIII-IL12Rb2-BsiWI-p40 (no signal)-NruI-p35 (no signal)-BsiWI-hIgG1-EcoRI (6) PEE12.4-HindIII-IL12Rb1-BsiWI-p40 (no signal)-NruI-Fck-EcoRI (7) PEE12.4-HindII-IL12Rb2-BstBI-p35 (no signal)-BsiWI-Fch-EcoRI HindIII, NruI, BsiWI, and EcoRI are enzyme cleavage sites.

The linking sequences between each fusion protein segment are:

(1) Homo IL12: Linker L1 between P40 and P35, Linker L1 between P35 and Fc.
(2) Het IL12: Linker L1 between P40 and Fc, Linker L1 between P35 and Fc.
(3) Linker L2 between Rβ1 and P40; the corresponding target sequence of the protease is SGRSENIRTA (SEQ ID NO: 53).
(4) Linker L2 between Rβ2 and P40; the target sequence of the corresponding protease is SGRSENIRTA (SEQ ID NO: 53).
(5) Linker L2 between Rβ2 and P35; the corresponding target sequence of the protease is SGRSENIRTA (SEQ ID NO: 53).

Transfection can be done stably or transiently, the transient transfection protocol was: (1) Cell resuscitation: Freestyle 293F cells were cryopreserved in CD OptiCHO™ media (containing 10% DMSO) at a concentration of 3×10$^7$ cells/mL. After taking out from liquid nitrogen, it was rapidly dissolved in a 37° C. water bath, and added to a 15 mL centrifuge tube containing 10 mL of OptiCHO™ media, centrifuged at 1,000 rpm for 5 min. The supernatant was discarded and the cell pellet was suspended and cultured in 30 ml OptiCHO™ media at 37° C., 8% $CO_2$, 135 rpm. After 4 days, the cells were expanded and cultured, and the concentration was not more than 3×10$^6$ cells/mL when expanded.

(2) Two days before transfection, 293F cells prepared for suspension culture were used for transient transfection (200 ml) at a seeding density of 0.6-0.8×10$^6$ cells/mL.
(3) Two days later, the transfected cell suspension was counted (cell density expected to be 2.5-3.5×10$^6$ cells/mL) and the cell suspension was centrifuged at 1,000 rpm for 5 min, and the supernatant was discarded.
(4) The cells were resuspended in 50 mL of fresh Freestyle 293 media, centrifuged again at 1,000 rpm for 5 min, and the supernatant was discarded.
(5) Resuspend 293F cells with 200 mL of Freestyle 293 media.
(6) 600 μg of the plasmid was diluted with 5 mL of Freestyle 293 media, and sterilized by filtration using a 0.22 μM filter.
(7) 1.8 mg of PEI was diluted with 5 mL of Freestyle 293 media medium and sterilized by filtration using a 0.22 μM filter. Immediately, 5 mL of the plasmid and 5 mL of PEI were mixed and allowed to stand at room temperature for 5 min.
(8) The plasmid/PEI mixture was added to the cell suspension, placed in an incubator at 37° C., 8% $CO_2$, 85 rpm, and supplemented with a growth factor of 50 μg/L LONG™ R3 IGF-1.
(9) After 4 hrs, 200 ml of EX-CELL™ 293 media medium and 2 mM Glutamine were added, and the speed was adjusted to 135 rpm to continue the culture.
(10) After 24 hrs, the cell proliferation inhibitor 3.8 mM VPA was added. Supernatant was collected between 4-8 days post-transfection (for optimal protein quality, confirm cell survival rate is greater than 70% at time of collection).

Fusion protein collection, purification and electrophoresis verification:

(1) Sample preparation: Suspension cell culture solution was transferred to a 500 mL centrifuge barrel and centrifuged at 8,000 rpm for 20 minutes. The supernatant was discarded and impurities were removed using a 0.45 μM filter. 0.05% NaN3 was added to prevent bacteria growth during the purification process.
(2) Column assembly: The appropriate amount of Protein A agarose was added to the column (20 mg of human Fc fusion protein per 1 mL of Protein A) and incubated at room temperature for about 10 minutes with 20% ethanol solution. The column outlet was opened to slowly discharge the ethanol solution by gravity.
(3) The column was washed and equilibrated with 10 column volumes of distilled water and Binding Buffer (20 mM sodium phosphate+0.15 M NaCl, pH 7.0), respectively.
(4) The sample was constantly pumped through the column at a flow rate of 10 column volumes per hr.
(5) Columns were washed with 10 times column volume of Binding Buffer and rinsed until the effluent has no protein detection.
(6) Elution Buffer (0.1 M Glycine, pH 2.7) was used for elution and eluate was collected in 1 mL increments. An appropriate amount of 1 M Tris, pH 9.0 was added to neutralize (the pH was adjusted to 6-8, and the isoelectric point of the purified protein should be 0.5 or more).
(7) The target protein solution was replaced with the desired buffer using a Zeba desalting spin column or a concentrated spin column (buffer pH is adjusted to avoid the isoelectric point of the protein). Using BSA as a standard, the protein concentration was determined by SDS-PAGE electrophoresis (2.5 μg of protein loading per sample) and NanoDrop2000.

After elution, the column was washed successively with 20 column volumes of distilled water, and then the column was washed with 10 column volumes of 20% ethanol. Finally, the ethanol solution was immersed in the gel medium and stored at 4° C.

Example 3. In Vivo Antitumor Activity of Fusion Proteins

Systemic Injection of IL12-Fc Completely Eliminates MC38 Tumors, and Het IL12 is More Potent than Homo IL12

To determine whether IL12-Fc was able to effectively clear tumors during systemic administration and to compare the therapeutic effects of both forms of IL12-Fc, the MC38 mouse model was used mice and cohorts were treated in different doses by systemic administration. The test results are shown in FIG. 9.

FIG. 9A: WT C57BL/6 mice (n=5/group) were subcutaneously inoculated with 5×10$^5$ MC38 cells on day 0. Tumor volume of tumor-bearing mice was recorded by intraperitoneal injection of PBS, 0.5 μg, 1 μg, 5 μg, 10 μg of Homo IL12 on days 13, 16, and 20.

FIG. 9B: WT C57BL/6 mice (n=5/group) were subcutaneously inoculated with 5×10$^5$ MC38 cells on day 0. Tumor volume of tumor-bearing mice was recorded by intraperitoneal injection of PBS, 0.5 μg, 1 μg, 5 μg, 10 μg of Het IL12 on days 13, 16, and 20.

These results indicate that IL12-Fc was effective in eliminating tumors and that Het IL12 is more potent than Homo IL12.

Systemic Use of IL12-Fc Causes Serious Side Effects and Het IL12 is More Toxic than Homo IL12

Since IL12 receptors are widely present in T, B, and NK cells, the use of IL12 is often accompanied by strong toxic side effects. Clinically, patients are mainly characterized by various blood diseases and liver toxicity. Various inflammatory cytokines in mouse serum were experimentally measured as a primary indicator of toxicity caused by IL12-Fc.

WT C57BL/6 mice (n=5/group) were subcutaneously inoculated with $5 \times 10^5$ MC38 cells on day 0; intraperitoneal injection of PBS on day 13, 16, and 20, 5 µg of Homo IL12 or Het IL12. 6 hrs after the administration on the 20th day, blood was collected from the ocular vein to detect the levels of inflammatory factors IL12p70, IFN-γ, TNF, MCP-1, IL-10 and IL-6 in the serum.

Figure 10:
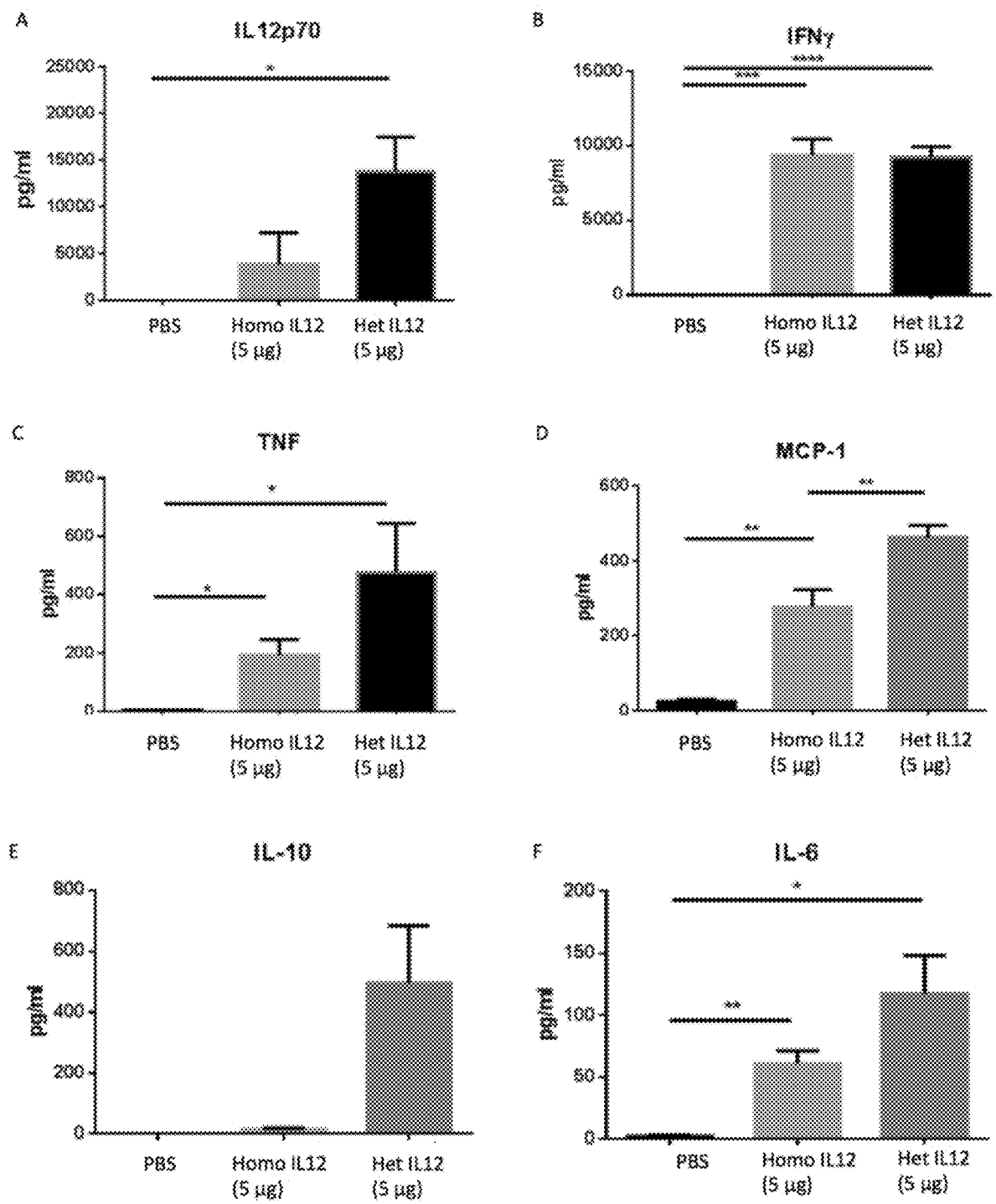
FIG. 10 shows exemplary data that Het IL12 has a higher cytotoxicity than Homo IL12.

As a result, as shown in FIG. 10, both Homo IL12 and Het IL12 caused strong cytotoxicity, and Het IL12 was more cytotoxic than Homo IL12.

Het IL12 Receptor Prodrug Eliminates MC38 Tumor Effectively

IL12 prodrugs were constructed by linking IL12 decoy receptors using a substrate sequence sensitive to certain proteolytic enzymes in order to castrate the decoy from IL12 in the tumor microenvironment. The proteolytic enzyme capable of cleaving the substrate is more highly expressed in certain tumor types compared to normal tissue, therefore the localization of active IL12 at the tumor site is increased while systemic toxicity of IL12 is decreased. In in vivo experiments, when the amount used was less than 5 µg/mouse, Het IL12 yielded a stronger antitumor effect on MC38 tumors than Homo IL12, and it was also more toxic. To test the prodrug concept as a means of reducing toxicity of IL12 therapy in vivo, Het IL12 (described in Example 1) was bound to a decoy IL12 receptor in several configurations (e.g. Het-R1, Het-R2, Het-R1/R2). Homo IL12 linked to a decoy IL12 receptor (e.g. Homo-R1, Homo-R2), was also tested.

FIG. 11A: WT C57BL/6 mice (n=5/group) were subcutaneously inoculated with 5×105 MC38 cells on day 0 and 5 µg of Het IL12, Het-R1, Het-R2 or Het-R1/R2 on day 10, 13, and 16, the control group was treated with PBS.

FIG. 11B: WT C57BL/6 mice (n=5/group) were subcutaneously inoculated with 5×105 MC38 cells on day 0. On days 10, 13, and 16, intraperitoneal injection of 2.5 µg of Het IL12, Het-R1, Het-R2, or Het-R1/R2, and the control group was treated with PBS.

The results showed that the three forms of prodrug of Het IL12 were effective in eliminating tumors. At a dose of 5 µg/mouse, the three forms of Het IL12 prodrugs have a better antitumor effect on MC38 than Homo IL12, and when the dose is reduced to 2.5 µg/mouse, Het IL12 prodrug (Het R1, Het R2 or Het-R1/R2) can still effectively control the tumor.

Het IL12 Prodrug Linked to IL12 Receptor has Fewer Side Effects when Administered Systemically Body weight changes of mice were recorded after systemic administration different drug/prodrug and the expression level of inflammatory cytokines in serum was also collected from the ocular vein of mice.

Figure 12:
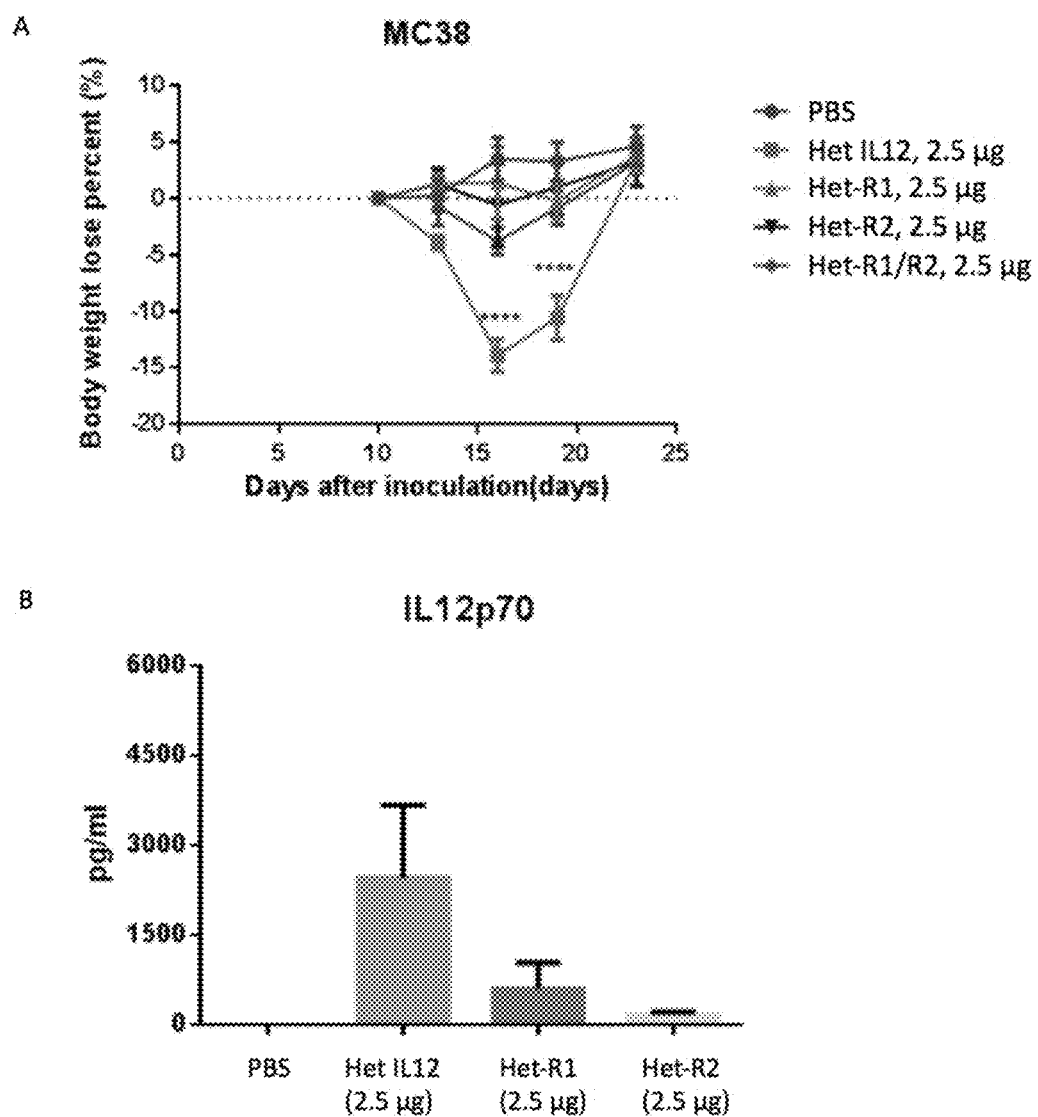
FIG. 12 shows exemplary data that Het IL12 prodrug linked to IL12 receptor has fewer side effects when administered systemically.
Figure 12:
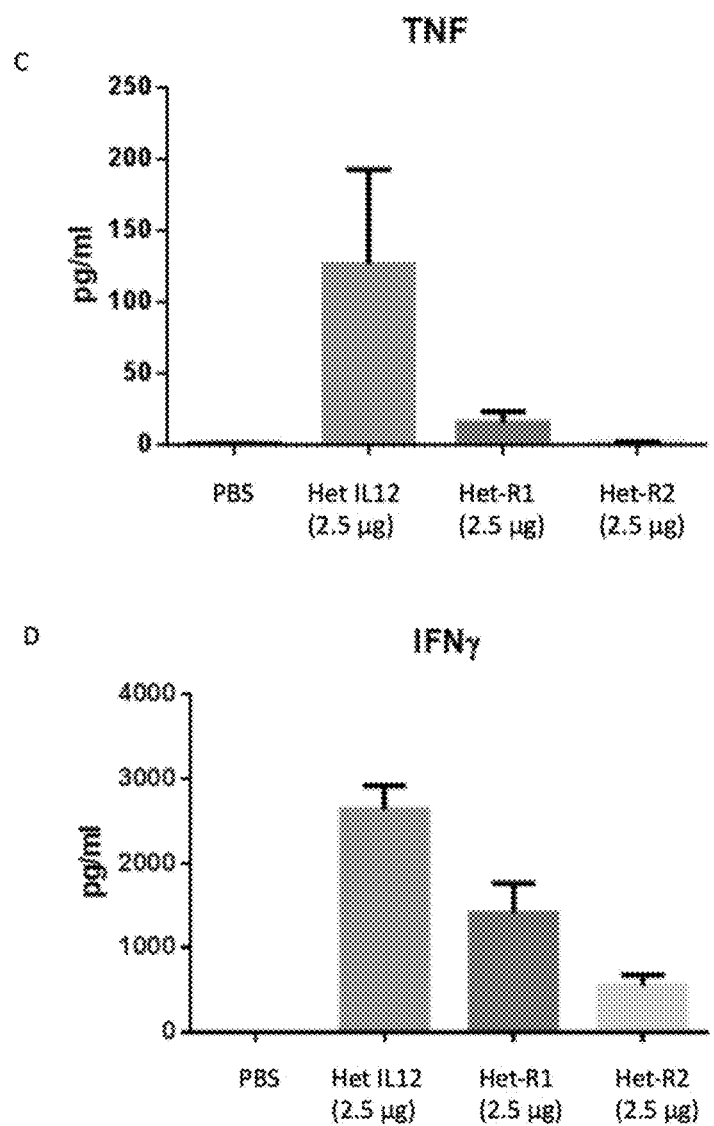
Figure 12:
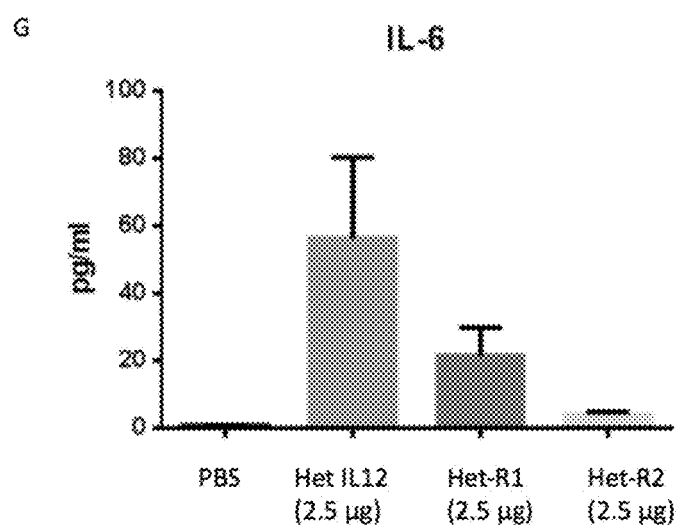

FIG. 12A: WT C57BL/6 mice (n=5/group) were subcutaneously inoculated with 5×105 MC38 cells on day 0, and 2.5 ug of Het IL12, Het-R1, Het-R2, Het-R1/R2 on day 10, 13, and 16, the control group was PBS. The weight of the mice was measured while being treated.

FIG. 12B-G: The blood was taken from the mouse eye vein while being treated. The serum levels of inflammatory cytokines IL12p70, TNF, IFN-γ, MCP-1, IL-10 and IL-6 were measured.

The results showed that Het IL12 linked to IL12 receptor prodrug (Het-R1, Het-R2) has fewer toxic side effects than Het IL12 unlinked to IL12 receptor at a dose of 2.5 µg/mouse, and Het-R2 was less toxic than other types of prodrug.

In summary, in the mouse MC38 model, the prodrug of IL12-Fc linked to the IL12 receptor maintains antitumor effectiveness and increases the safety of the IL12-Fc. Low dose (2.5 µg) of Het IL12 prodrug linked to IL12 receptor completely eliminated MC38 tumors with a tumor volume of 130-150 mm$^3$ and the tumor did not relapse. Compared to the same dose of IL12-Fc that was not linked to the IL12 receptor, the former (Het IL12-Fc prodrug linked to the IL12 receptor) produced less toxicity during systemic injection, which was reflected in the significantly reduced weight loss and lower inflammatory cytokine levels in the blood. Het-R2, in particular, was the safest construct.

Analogous human versions of various IL15 fusions proteins and prodrugs disclosed herein were also produced and tested in vitro. Human protein production followed the same cloning, transfection and purification protocol described previously.

Figure 13:
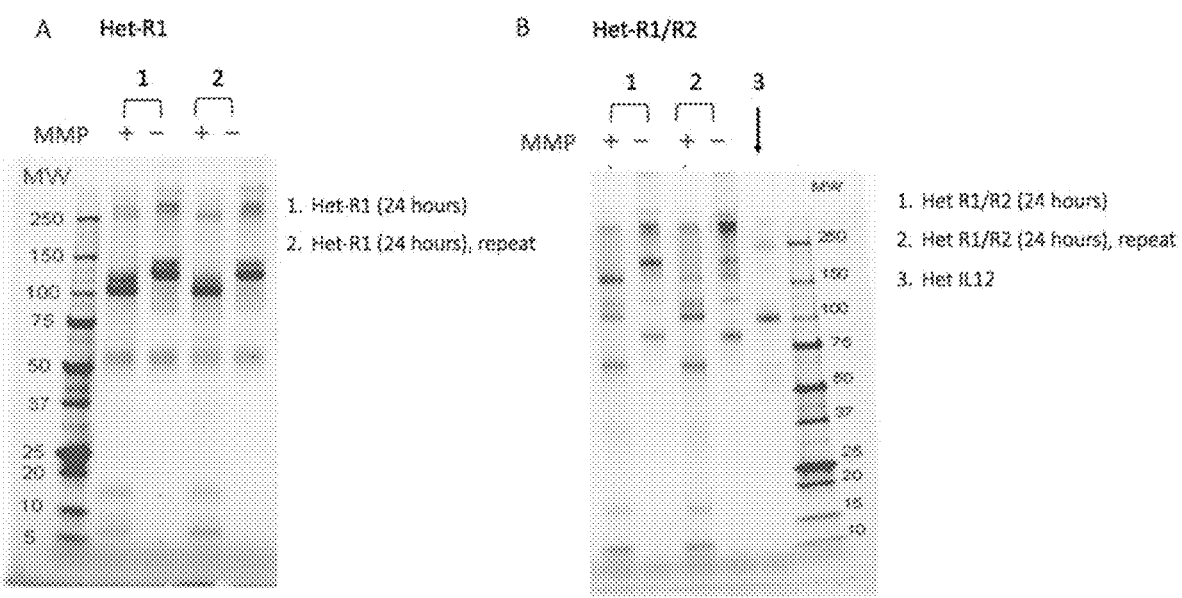
FIG. 13 shows exemplary data of SDS-PAGE electrophoresis results of the expression of human Het-R1 and Het-R1/R2 with or without digestion with MMP14.

The results of SDS-PAGE electrophoresis of purified human fusion proteins incubated with or without MMP14 at 37° C. for 24 hours are shown in FIG. 13.

Functionality of human Het-R1 and Het-R1/R2 was measured using the HEK-Blue™ IL12 reporter cell line assay (Invivogen). HEK-Blue™ IL-12 cells are designed to detect bioactive human IL-12 by expressing a STAT4-inducible SEAP reporter gene. Binding of IL-12 to the IL-12R on the surface of HEK-Blue™ IL-12 cells triggers a signaling cascade leading to the activation STAT-4 with the subsequent production of SEAP. HEK-Blue™ IL-12 cells activation was measured using QUANTI-Blue™ to detect SEAP in cell supernatant.

The following HEK-Blue™ IL-12 cells reporter cell line assay was used:
(1) HEK-Blue™ IL-12 cells were gently rinsed in PBS and suspended in fresh, pre-warmed test medium (DMEM, 4.5 g/l glucose, 2 mM L-glutamine, 10% (v/v) heat-inactivated PBS (30 mins at 56° C. at ~1×10$^6$ cells/ml.
(2) Samples were serially diluted in a flat-bottom 96-well plate and incubated in a $CO_2$ incubator with 50 µl of cell suspension (~50,000 cells) per well at 37° C. for 20-24 hours.
(3) Incubate 20 µL of induced HEK-Blue™ IL-12 cell supernatant per well of a flat-bottom 96-well plate with 100 µL of resuspended QUANTI-Blue™ Solution per well in a 37 C incubator for 15-min to 1 hour.
(4) Determine SEAP levels using a spectrophotometer at 650 nm.

Result: FIG. 14A shows IL12 activity of the Het-R1 prodrug after MMP14 digestion is comparable or greater than Het IL12. In contrast, Het-R1 without MMP14 digestion is less active, indicating that the prodrug blocking mechanism works as expected. FIG. 14B shows activity of Het-R1/R2 prodrug after MMP14 digestion is comparable to Het IL12 and recombinant IL12. In contrast, Het-R1/R2 without MMP14 digestion is less active, indicating that the prodrug blocking mechanism works as expected.

```
SEQ Listing
SEQ ID No. 1: mouse P40 subunit (no signal peptide)
MWELEKDVYV VEVDWTPDAP GETVNLTCDT PEEDDITWTS DQRHGVIGSG KTLTITVKEF

LDAGQYTCHK GGETLSHSHL LLHKKENGIW STEILKNFKN KTFLKCEAPN YSGRFTCSWL

VQRNMDLKFN IKSSSSSPDS RAVTCGMASL SAEKVTLDQR DYEKYSVSCQ EDVTCPTAEE

TLPIELALEA RQQNKYENYS TSFFIRDIIK PDPPKNLQMK PLKNSQVEVS WEYPDSWSTP

HSYFSLKFFV RIQRKKEKMK ETEEGCNQKG AFLVEKTSTE VQCKGGNVCV QAQDRYYNSS

CSKWACVPCR VRS

SEQ ID No. 2: human P40 subunit (no signal peptide)
WELKKDVYVVELDWYPDAPGEMVVLTCDTPEEDGITWTLDQSSEVLGSGKTLTIQVKEFGDAGQYTCH

KGGEVLSHSLLLLHKKEDGIWSTDILKDQKEPKNKTFLRCEAKNYSGRFTCWWLTTISTDLTFSVKSS

RGSSDPQGVTCGAATLSAERVRGDNKEYEYSVECQEDSACPAAEESLPIEVMVDAVHKLKYENYTSSF

FIRDIIKPDPPKNLQLKPLKNSRQVEVSWEYPDTWSTPHSYFSLTFCVQVQGKSREKKDRVFTDKTS

ATVICRKNASISVRAQDRYYSSSWSEWASVPCS

SEQ ID No. 3: mouse P35 subunit (no signal peptide)
RVIPVSGPAR CLSQSRNLLK TTDDMVKTAR EKLKHYSCTA EDIDHEDITR DQTSTLKTCL

PLELHKNESC LATRETSSTT RGSCLPPQKT SLMMTLCLGS IYEDLKMYQT EFQAINAALQ

NHNHQQIILD KGMLVAIDEL MQSLNHNGET LRQKPPVGEA DPYRVKMKLC ILLHAFSTRV

VTINRVMGYL SSA

SEQ ID No. 4: human P35 subunit (no signal peptide)
RNLPVATPDPGMFPCLHHSQNLLRAVSNMLQKARQTLEFYPCTSEEIDHEDITKDKTSTVEACLPLEL

TKNESCLNSRETSFITNGSCLASRKTSFMMALCLSSIYEDLKMYQVEFKTMNAKLLMDPKRQIFLDQN

MLAVIDELMQALNFNSETVPQKSSLEEPDFYKTKIKLCILLHAFRIRAVTIDRVMSYLNAS

SEQ ID No. 5: human Fc-hole
DKTHTCPPCP APELLGGPSV FLFPPKPKDT LMISRTPEVT CVVVDVSHED PEVKFNWYVD

GVEVHNAKTK PREEQYNSTY RVVSVLTVLH QDWLNGKEYK CKVSNKALPA PIEKTISKAK

GQPREPQVCT LPPSRDELTK NQVSLSCAVK GFYPSDIAVE WESNGQPENN YKTTPPVLDS

DGSFFLVSKL TVDKSRWQQG NVFSCSVMHE ALHNHYTQKS LSLSPGK

SEQ ID No. 6: human Fc-knob
DKTHTCPPCP APELLGGPSV FLFPPKPKDT LMISRTPEVT CVVVDVSHED PEVKFNWYVD

GVEVHNAKTK PREEQYNSTY RVVSVLTVLH QDWLNGKEYK CKVSNKALPA PIEKTISKAK

GQPREPQVYT LPPCRDELTK NQVSLWCLVK GFYPSDIAVE WESNGQPENN YKTTPPVLDS

DGSFFLYSKL TVDKSRWQQG NVFSCSVMHE ALHNHYTQKS LSLSPGK

SEQ ID No. 7: human Fc of IgG1
DKTHTCPPCP APELLGGPSV FLFPPKPKDQ LMISRTPEVT CVVVDVSHED PEVKFNWYVD

GVEVHNAKTK PREEQYNSTY RVVSVLTVLH QDWLNGKEYK CKVSNKALPA PIEKTISKAK

GQPREPQVYT LPPSRDELTK NQVSLTCLVK GFYPSDIAVE WESNGQPENN YKTTPPVLDS

DGSFLYSKLT VDKSRWQQGN VFSCSVLHEA LHNHYTQKSL SLSPGK

SEQ ID No. 8: mouse Rβ1
MDMMGLAGTS KHITFLLLCQ LGASGPGDGC CVEKTSFPEG ASGSPLGPRN LSCYRVSKTD

YECSWQYDGP EDNVSHVLWC CFVPPNHTHT GQERCRYFSS GPDRTVQFWE QDGIPVLSKV

NFWVESRLGN RTMKSQKISQ YLYNWTKTTP PLGHIKVSQS HRQLRMDWNV SEEAGAEVQF

RRRMPTTNWT LGDCGPQVNS GSGVLGDIRG SMSESCLCPS ENMAQEIQIR RRRLSSGAP

GGPWSDWSMP VCVPPEVLP
```

-continued

SEQ ID No. 9: human Rβ1
MEPLVTWVVPLLFLFLLSRQGAACRTSECCFQDPPYPDADSGSASGPRDLRCYRISSDRYECSWQYEG

PTAGVSHFLRCCLSSGRCCYFAAGSATRLQFSDQAGVSVLYTVTLWVESWARNQTEKSPEVTLQLYNS

VKYEPPLGDIKVSKLAGQLRMEWETPDNQVGAEVQFRHRTPSSPWKLGDCGPQDDDTESCLCPLEMNV

AQEFQLRRRRLGSQGSSWSKWSSPVCVPPEN

SEQ ID No. 10: mouse Rβ2
MAQTVRECSL ALLFLFMWLL IKANIDVCKL GTVTVQPAPV IPLGSAANIS CSLNPKQGCS

HYPSSNELIL LKFVNDVLVE NLHGKKVHDH TGHSSTFQVT NLSLGMTLFV CKLNCSNSQK

KPPVPVCGVE ISVGVAPEPP QNISCVQEGE NGTVACSWNS GKVTYLKTNY TLQLSGPNNL

TCQKQCFSDN RQNCNRLDLG INLSPDLAES RFIVRVTAIN DLGNSSSLPH TFTFLDIVIP

LPPWDIRINF LNASGSRGTL QWEDEGQVVL NQLRYQPLNS TSWNMVNATN AKGKYDLRDL

RPFTEYEFQI SSKLHLSGGS WSNWSESLRT RTPEEEP

SEQ ID No. 11: human Rβ2
MAHTFRGCSLAFMFIITWLLIKAKIDACKRGDVTVKPSHVILLGSTVNITCSLKPRQGCFHYSRRNKL

ILYKFDRRINFHHGHSLNSQVTGLPLGTTLFVCKLACINSDEIQICGAEIFVGVAPEQPQNLSCIQKG

EQGTVACTWERGRDTHLYTEYTLQLSGPKNLTWQKQCKDIYCDYLDFGINLTPESPESNFTAKVTAVN

SLGSSSSLPSTFTFLDIVRPLPPWDIRIKFQKASVSRCTLYWRDEGLVLLNRLRYRPSNSRLWNMVNV

TKAKGRHDLLDLKPFTEYEFQISSKLHLYKGSWSDWSESLRAQTPEEEP

SEQ ID No. 12: linker segment L1
GGGGSGGGGSGGGGS

SEQ ID No. 13: linker segment L2 (MMP14)
GGGGSSGARYRWLTAGGGGS

SEQ ID No. 14: linker segment L2
GGGGSSGRSENIRTAGGGGS

SEQ ID No. 15: linker segment L2 (MMP14)
GGGGSSGRAMHMYTAGGGGS

SEQ ID No. 16: linker segment L2 (MMP14)
GGGGSSGAAMHMYTAGGGGS

SEQ ID No. 17: linker segment L2 (MMP14)
GGGGSSGAIGFLRTAGGGGS

SEQ ID No. 18: linker segment L2 (MMP14)
GGGGSSGASENIRTAGGGGS

SEQ ID No. 19: linker segment L2 (MMP14)
GGGGSSGRPENIRTAGGGGS

SEQ ID No. 20: linker segment L2 (MMP14)
GGGGSSGAPENIRTAGGGGS

SEQ ID No. 21: linker segment L2 (MMP14)
GGGGSSGLISHSITAGGGGS

SEQ ID No. 22: linker segment L2 (MMP14)
GGGGSSGNLRSKLTAGGGGS

SEQ ID No. 23: linker segment L2 (MMP14)
GGGGSSGVFSIPLTAGGGGS

SEQ ID No. 24: linker segment L2 (MMP14)
GGGGSSGIKYHSLTAGGGGS

SEQ ID No. 25: linker segment L2 (MMP14)

SEQ ID No. 26: linker segment L2 (MMP14)
GGGGSSGRIGFLRTAGGGGS

SEQ ID No. 27: mouse P35 signal peptide SP1
MCQSRYLLFL ATLALLNHLS LA

SEQ ID No. 28: human P35 signal peptide SP1
MCPARSLLLVATLVLLDHLSLA

SEQ ID No. 29: mouse P40 signal peptide SP2
MCPQKLTISW FAIVLLVSPL MA

SEQ ID No. 30: human P40 signal peptide SP2
MCHQQLVISWFSLVFLASPLVAI

SEQ ID No. 31: mouse Homo IL-12
MCPQKLTISW FAIVLLVSPL MAMWELEKDV YVVEVDWTPD APGETVNLTC DTPEEDDITW

TSDQRHGVIG SGKTLTITVK EFLDAGQYTC HKGGETLSHS HLLLHKKENG IWSTEILKNF

KNKTFLKCEA PNYSGRFTCS WLVQRNMDLK FNIKSSSSSP DSRAVTCGMA SLSAEKVTLD

QRDYEKYSVS CQEDVTCPTA EETLPIELAL EARQQNKYEN YSTSFFIRDI IKPDPPKNLQ

MKPLKNSQVE VSWEYPDSWS TPHSYFSLKF FVRIQRKKEK MKETEEGCNQ KGAFLVEKTS

TEVQCKGGNV CVQAQDRYYN SSCSKWACVP CRVRSGGGGS GGGGSGGGGS RVIPVSGPAR

CLSQSRNLLK TTDDMVKTAR EKLKHYSCTA EDIDHEDITR DQTSTLKTCL PLELHKNESC

LATRETSSTT RGSCLPPQKT SLMMTLCLGS IYEDLKMYQT EFQAINAALQ NHNHQQIILD

KGMLVAIDEL MQSLNHNGET LRQKPPVGEA DPYRVKMKLC ILLHAFSTRV VTINRVMGYL

SSAGGGGSGG GGSGGGGSDK THTCPPCPAP ELLGGPSVFL FPPKPKDQLM ISRTPEVTCV

VVDVSHEDPE VKFNWYVDGV EVHNAKTKPR EEQYNSTYRV VSVLTVLHQD WLNGKEYKCK

VSNKALPAPI EKTISKAKGQ PREPQVYTLP PSRDELTKNQ VSLTCLVKGF YPSDIAVEWE

SNGQPENNYK TTPPVLDSDG SFLYSKLTVD KSRWQQGNVF SCSVLHEALH NHYTQKSLSL

SPGK

SEQ ID No. 32: human Homo IL12
MCHQQLVISWFSLVFLASPLVAIWELKKDVYVVELDWYPDAPGEMVVLTCDTPEEDGITWTLDQSSEV

LGSGKTLTIQVKEFGDAGQYTCHKGGEVLSHSLLLLHKKEDGIWSTDILKDQKEPKNKTFLRCEAKNY

SGRFTCWWLTTISTDLTFSVKSSRGSSDPQGVTCGAATLSAERVRGDNKEYEYSVECQEDSACPAAEE

SLPIEVMVDAVHKLKYENYTSSFFIRDIIKPDPPKNLQLKPLKNSRQVEVSWEYPDTWSTPHSYFSLT

FCVQVQGKSKREKKDRVFTDKTSATVICRKNASISVRAQDRYYSSSWSEWASVPCSGGGGSGGGGSGG

GGSRNLPVATPDPGMFPCLHHSQNLLRAVSNMLQKARQTLEFYPCTSEEIDHEDITKDKTSTVEACLP

LELTKNESCLNSRETSFITNGSCLASRKTSFMMALCLSSIYEDLKMYQVEFKTMNAKLLMDPKRQIFL

DQNMLAVIDELMQALNFNSETVPQKSSLEEPDFYKTKIKLCILLHAFRIRAVTIDRVMSYLNASGGGG

SGGGGSGGGGSDKTHTCPPCPAPELLGGPSVFLFPPKPKDQLMISRTPEVTCVVVDVSHEDPEVKFNW

YVDGVEVHNAKTKPREEQYNSTYRVVSVLTVLHQDWLNGKEYKCKVSNKALPAPIEKTISKAKGQPRE

PQVYTLPPSRDELTKNQVSLTCLVKGFYPSDIAVEWESNGQPENNYKTTPPVLDSDGSFLYSKLTVDK

SRWQQGNVFSCSVLHEALHNHYTQKSLSLSPGK

SEQ ID No. 33: mouse Het IL-12 subunit 1
MCPQKLTISW FAIVLLVSPL MAMWELEKDV YVVEVDWTPD APGETVNLTC DTPEEDDITW

TSDQRHGVIG SGKTLTITVK EFLDAGQYTC HKGGETLSHS HLLLHKKENG IWSTEILKNF

KNKTFLKCEA PNYSGRFTCS WLVQRNMDLK FNIKSSSSSP DSRAVTCGMA SLSAEKVTLD

QRDYEKYSVS CQEDVTCPTA EETLPIELAL EARQQNKYEN YSTSFFIRDI IKPDPPKNLQ

MKPLKNSQVE VSWEYPDSWS TPHSYFSLKF FVRIQRKKEK MKETEEGCNQ KGAFLVEKTS

TEVQCKGGNV CVQAQDRYYN SSCSKWACVP CRVRSGGGGS GGGGSGGGGS DKTHTCPPCP

APELLGGPSV FLFPPKPKDT LMISRTPEVT CVVVDVSHED PEVKFNWYVD GVEVHNAKTK

```
PREEQYNSTY RVVSVLTVLH QDWLNGKEYK CKVSNKALPA PIEKTISKAK GQPREPQVYT

LPPCRDELTK NQVSLWCLVK GFYPSDIAVE WESNGQPENN YKTTPPVLDS DGSFFLYSKL

TVDKSRWQQG NVFSCSVMHE ALHNHYTQKS LSLSPGK

SEQ ID No. 34: human Het IL12 subunit 1
MCHQQLVISWFSLVFLASPLVAIWELKKDVYVVELDWYPDAPGEMVVLTCDTPEEDGITWTLDQSSEV

LGSGKTLTIQVKEFGDAGQYTCHKGGEVLSHSLLLLHKKEDGIWSTDILKDQKEPKNKTFLRCEAKNY

SGRFTCWWLTTISTDLTFSVKSSRGSSDPQGVTCGAATLSAERVRGDNKEYEYSVECQEDSACPAAEE

SLPIEVMVDAVHKLKYENYTSSFFIRDIIKPDPPKNLQLKPLKNSRQVEVSWEYPDTWSTPHSYFSLT

FCVQVQGKSKREKKDRVFTDKTSATVICRKNASISVRAQDRYYSSSWSEWASVPCSGGGGSGGGGSGG

GGSDKTHTCPPCPAPELLGGPSVFLFPPKPKDTLMISRTPEVTCVVVDVSHEDPEVKFNWYVDGVEVH

NAKTKPREEQYNSTYRVVSVLTVLHQDWLNGKEYKCKVSNKALPAPIEKTISKAKGQPREPQVYTLPP

CRDELTKNQVSLWCLVKGFYPSDIAVEWESNGQPENNYKTTPPVLDSDGSFFLYSKLTVDKSRWQQGN

VFSCSVMHEALHNHYTQKSLSLSPGK

SEQ ID No. 35: mouse Het IL12 subunit 2
MCQSRYLLFL ATLALLNHLS LARVIPVSGP ARCLSQSRNL LKTTDDMVKT AREKLKHYSC

TAEDIDHEDI TRDQTSTLKT CLPLELHKNE SCLATRETSS TTRGSCLPPQ KTSLMMTLCL

GSIYEDLKMY QTEFQAINAA LQNHNHQQII LDKGMLVAID ELMQSLNHNG ETLRQKPPVG

EADPYRVKMK LCILLHAFST RVVTINRVMG YLSSAGGGGS GGGGSGGGGS DKTHTCPPCP

APELLGGPSV FLFPPKPKDT LMISRTPEVT CVVVDVSHED PEVKFNWYVD GVEVHNAKTK

PREEQYNSTY RVVSVLTVLH QDWLNGKEYK CKVSNKALPA PIEKTISKAK GQPREPQVCT

LPPSRDELTK NQVSLSCAVK GFYPSDIAVE WESNGQPENN YKTTPPVLDS DGSFFLVSKL

TVDKSRWQQG NVFSCSVMHE ALHNHYTQKS LSLSPGK

SEQ ID No. 36: human Het IL12 subunit 2
MCPARSLLLVATLVLLDHLSLARNLPVATPDPGMFPCLHHSQNLLRAVSNMLQKARQTLEFYPCTSEE

IDHEDITKDKTSTVEACLPLELTKNESCLNSRETSFITNGSCLASRKTSFMMALCLSSIYEDLKMYQV

EFKTMNAKLLMDPKRQIFLDQNMLAVIDELMQALNFNSETVPQKSSLEEPDFYKTKIKLCILLHAFRI

RAVTIDRVMSYLNASGGGGSGGGGSGGGGSDKTHTCPPCPAPELLGGPSVFLFPPKPKDTLMISRTPE

VTCVVVDVSHEDPEVKFNWYVDGVEVHNAKTKPREEQYNSTYRVVSVLTVLHQDWLNGKEYKCKVSNK

ALPAPIEKTISKAKGQPREPQVCTLPPSRDELTKNQVSLSCAVKGFYPSDIAVEWESNGQPENNYKTT

PPVLDSDGSFFLVSKLTVDKSRWQQGNVFSCSVMHEALHNHYTQKSLSLSPGK

SEQ ID No. 37: mouse Homo-R1
MDMMGLAGTS KHITFLLLCQ LGASGPGDGC CVEKTSFPEG ASGSPLGPRN LSCYRVSKTD

YECSWQYDGP EDNVSHVLWC CFVPPNHTHT GQERCRYFSS GPDRTVQFWE QDGIPVLSKV

NFWVESRLGN RTMKSQKISQ YLYNWTKTTP PLGHIKVSQS HRQLRMDWNV SEEAGAEVQF

RRRMPTTNWT LGDCGPQVNS GSGVLGDIRG SMSESCLCPS ENMAQEIQIR RRRRLSSGAP

GGPWSDWSMP VCVPPEVLPG GGGSSGRSEN IRTAGGGGSM WELEKDVYVV EVDWTPDAPG

ETVNLTCDTP EEDDITWTSD QRHGVIGSGK TLTITVKEFL DAGQYTCHKG GETLSHSHLL

LHKKENGIWS TEILKNFKNK TFLKCEAPNY SGRFTCSWLV QRNMDLKFNI KSSSSSPDSR

AVTCGMASLS AEKVTLDQRD YEKYSVSCQE DVTCPTAEET LPIELALEAR QQNKYENYST

SFFIRDIIKP DPPKNLQMKP LKNSQVEVSW EYPDSWSTPH SYFSLKFFVR IQRKKEKMKE

TEEGCNQKGA FLVEKTSTEV QCKGGNVCVQ AQDRYYNSSC SKWACVPCRV RSGGGGSGGG

GSGGGGSRVI PVSGPARCLS QSRNLLKTTD DMVKTAREKL KHYSCTAEDI DHEDITRDQT
```

```
STLKTCLPLE LHKNESCLAT RETSSTTRGS CLPPQKTSLM MTLCLGSIYE DLKMYQTEFQ

AINAALQNHN HQQIILDKGM LVAIDELMQS LNHNGETLRQ KPPVGEADPY RVKMKLCILL

HAFSTRVVTI NRVMGYLSSA GGGGSGGGGS GGGGSDKTHT CPPCPAPELL GGPSVFLFPP

KPKDQLMISR TPEVTCVVVD VSHEDPEVKF NWYVDGVEVH NAKTKPREEQ YNSTYRVVSV

LTVLHQDWLN GKEYKCKVSN KALPAPIEKT ISKAKGQPRE PQVYTLPPSR DELTKNQVSL

TCLVKGFYPS DIAVEWESNG QPENNYKTTP PVLDSDGSFL YSKLTVDKSR WQQGNVFSCS

VLHEALHNHY TQKSLSLSPG K
```

SEQ ID No. 38: human Homo-R1
```
MEPLVTWVVPLLFLFLLSRQGAACRTSECCFQDPPYPDADSGSASGPRDLRCYRISSDRYECSWQYEG

PTAGVSHFLRCCLSSGRCCYFAAGSATRLQFSDQAGVSVLYTVTLWVESWARNQTEKSPEVTLQLYNS

VKYEPPLGDIKVSKLAGQLRMEWETPDNQVGAEVQFRHRTPSSPWKLGDCGPQDDDTESCLCPLEMNV

AQEFQLRRRRLGSQGSSWSKWSSPVCVPPENGGGGSSGRSENIRTAGGGGSWELKKDVYVVELDWYPD

APGEMVVLTCDTPEEDGITWTLDQSSEVLGSGKTLTIQVKEFGDAGQYTCHKGGEVLSHSLLLLHKKE

DGIWSTDILKDQKEPKNKTFLRCEAKNYSGRFTCWWLTTISTDLTFSVKSSRGSSDPQGVTCGAATLS

AERVRGDNKEYEYSVECQEDSACPAAEESLPIEVMVDAVHKLKYENYTSSFFIRDIIKPDPPKNLQLK

PLKNSRQVEVSWEYPDTWSTPHSYFSLTFCVQVQGKSKREKKDRVFTDKTSATVICRKNASISVRAQD

RYYSSSWSEWASVPCSGGGGSGGGGSGGGGSRNLPVATPDPGMFPCLHHSQNLLRAVSNMLQKARQTL

EFYPCTSEEIDHEDITKDKTSTVEACLPLELTKNESCLNSRETSFITNGSCLASRKTSFMMALCLSSI

YEDLKMYQVEFKTMNAKLLMDPKRQIFLDQNMLAVIDELMQALNFNSETVPQKSSLEEPDFYKTKIKL

CILLHAFRIRAVTIDRVMSYLNASGGGGSGGGGSGGGGSDKTHTCPPCPAPELLGGPSVFLFPPKPKD

QLMISRTPEVTCVVVDVSHEDPEVKFNWYVDGVEVHNAKTKPREEQYNSTYRVVSVLTVLHQDWLNGK

EYKCKVSNKALPAPIEKTISKAKGQPREPQVYTLPPSRDELTKNQVSLTCLVKGFYPSDIAVEWESNG

QPENNYKTTPPVLDSDGSFLYSKLTVDKSRWQQGNVFSCSVLHEALHNHYTQKSLSLSPGK
```

SEQ ID No. 39: mouse Homo-R2
```
MAQTVRECSL ALLFLFMWLL IKANIDVCKL GTVTVQPAPV IPLGSAANIS CSLNPKQGCS

HYPSSNELIL LKFVNDVLVE NLHGKKVHDH TGHSSTFQVT NLSLGMTLFV CKLNCSNSQK

KPPVPVCGVE ISVGVAPEPP QNISCVQEGE NGTVACSWNS GKVTYLKTNY TLQLSGPNNL

TCQKQCFSDN RQNCNRLDLG INLSPDLAES RFIVRVTAIN DLGNSSSLPH TFTFLDIVIP

LPPWDIRINF LNASGSRGTL QWEDEGQVVL NQLRYQPLNS TSWNMVNATN AKGKYDLRDL

RPFTEYEFQI SSKLHLSGGS WSNWSESLRT RTPEEEPGGG GSSGRSENIR TAGGGGSMWE

LEKDVYVVEV DWTPDAPGET VNLTCDTPEE DDITWTSDQR HGVIGSGKTL TITVKEFLDA

GQYTCHKGGE TLSHSHLLLH KKENGIWSTE ILKNFKNKTF LKCEAPNYSG RFTCSWLVQR

NMDLKFNIKS SSSSPDSRAV TCGMASLSAE KVTLDQRDYE KYSVSCQEDV TCPTAEETLP

IELALEARQQ NKYENYSTSF FIRDIIKPDP PKNLQMKPLK NSQVEVSWEY PDSWSTPHSY

FSLKFFVRIQ RKKEKMKETE EGCNQKGAFL VEKTSTEVQC KGGNVCVQAQ DRYYNSSCSK

WACVPCRVRS GGGGSGGGGS GGGGSRVIPV SGPARCLSQS RNLLKTTDDM VKTAREKLKH

YSCTAEDIDH EDITRDQTST LKTCLPLELH KNESCLATRE TSSTTRGSCL PPQKTSLMMT

LCLGSIYEDL KMYQTEFQAI NAALQNHNHQ QIILDKGMLV AIDELMQSLN HNGETLRQKP

PVGEADPYRV KMKLCILLHA FSTRVVTINR VMGYLSSAGG GGSGGGGSGG GGSDKTHTCP

PCPAPELLGG PSVFLFPPKP KDQLMISRTP EVTCVVVDVS HEDPEVKFNW YVDGVEVHNA

KTKPREEQYN STYRVVSVLT VLHQDWLNGK EYKCKVSNKA LPAPIEKTIS KAKGQPREPQ
```

-continued

VYTLPPSRDE LTKNQVSLTC LVKGFYPSDI AVEWESNGQP ENNYKTTPPV LDSDGSFLYS

KLTVDKSRWQ QGNVFSCSVL HEALHNHYTQ KSLSLSPGK

SEQ ID No. 40: human Homo-R2
MAHTFRGCSLAFMFIITWLLIKAKIDACKRGDVTVKPSHVILLGSTVNITCSLKPRQGCFHYSRRNKL

ILYKFDRRINFHHGHSLNSQVTGLPLGTTLFVCKLACINSDEIQICGAEIFVGVAPEQPQNLSCIQKG

EQGTVACTWERGRDTHLYTEYTLQLSGPKNLTWQKQCKDIYCDYLDFGINLTPESPESNFTAKVTAVN

SLGSSSSLPSTFTFLDIVRPLPPWDIRIKFQKASVSRCTLYWRDEGLVLLNRLRYRPSNSRLWNMVNV

TKAKGRHDLLDLKPFTEYEFQISSKLHLYKGSWSDWSESLRAQTPEEEPGGGGSSGRSENIRTAGGGG

SWELKKDVYVVELDWYPDAPGEMVVLTCDTPEEDGITWTLDQSSEVLGSGKTLTIQVKEFGDAGQYTC

HKGGEVLSHSLLLLHKKEDGIWSTDILKDQKEPKNKTFLRCEAKNYSGRFTCWWLTTISTDLTFSVKS

SRGSSDPQGVTCGAATLSAERVRGDNKEYEYSVECQEDSACPAAEESLPIEVMVDAVHKLKYENYTSS

FFIRDIIKPDPPKNLQLKPLKNSRQVEVSWEYPDTWSTPHSYFSLTFCVQVQGKSKREKKDRVFTDKT

SATVICRKNASISVRAQDRYYSSSWSEWASVPCSGGGGSGGGGSGGGGSRNLPVATPDPGMFPCLHHS

QNLLRAVSNMLQKARQTLEFYPCTSEEIDHEDITKDKTSTVEACLPLELTKNESCLNSRETSFITNGS

CLASRKTSFMMALCLSSIYEDLKMYQVEFKTMNAKLLMDPKRQIFLDQNMLAVIDELMQALNFNSETV

PQKSSLEEPDFYKTKIKLCILLHAFRIRAVTIDRVMSYLNASGGGGSGGGGSGGGGSDKTHTCPPCPA

PELLGGPSVFLFPPKPKDQLMISRTPEVTCVVVDVSHEDPEVKFNWYVDGVEVHNAKTKPREEQYNST

YRVVSVLTVLHQDWLNGKEYKCKVSNKALPAPIEKTISKAKGQPREPQVYTLPPSRDELTKNQVSLTC

LVKGFYPSDIAVEWESNGQPENNYKTTPPVLDSDGSFLYSKLTVDKSRWQQGNVFSCSVLHEALHNHY

TQKSLSLSPGK

SEQ ID No. 41: mouse Het-R1/R2 subunit 1
MDMMGLAGTS KHITFLLLCQ LGASGPGDGC CVEKTSFPEG ASGSPLGPRN LSCYRVSKTD

YECSWQYDGP EDNVSHVLWC CFVPPNHTHT GQERCRYFSS GPDRTVQFWE QDGIPVLSKV

NFWVESRLGN RTMKSQKISQ YLYNWTKTTP PLGHIKVSQS HRQLRMDWNV SEEAGAEVQF

RRRMPTTNWT LGDCGPQVNS GSGVLGDIRG SMSESCLCPS ENMAQEIQIR RRRRLSSGAP

GGPWSDWSMP VCVPPEVLPG GGGSSGRSEN IRTAGGGGSM WELEKDVYVV EVDWTPDAPG

ETVNLTCDTP EEDDITWTSD QRHGVIGSGK TLTITVKEFL DAGQYTCHKG GETLSHSHLL

LHKKENGIWS TEILKNFKNK TFLKCEAPNY SGRFTCSWLV QRNMDLKFNI KSSSSSPDSR

AVTCGMASLS AEKVTLDQRD YEKYSVSCQE DVTCPTAEET LPIELALEAR QQNKYENYST

SFFIRDIIKP DPPKNLQMKP LKNSQVEVSW EYPDSWSTPH SYFSLKFFVR IQRKKEKMKE

TEEGCNQKGA FLVEKTSTEV QCKGGNVCVQ AQDRYYNSSC SKWACVPCRV RSGGGGSGGG

GSGGGGSDKT HTCPPCPAPE LLGGPSVFLF PPKPKDTLMI SRTPEVTCVV VDVSHEDPEV

KFNWYVDGVE VHNAKTKPRE EQYNSTYRVV SVLTVLHQDW LNGKEYKCKV SNKALPAPIE

KTISKAKGQP REPQVYTLPP CRDELTKNQV SLWCLVKGFY PSDIAVEWES NGQPENNYKT

TPPVLDSDGS FFLYSKLTVD KSRWQQGNVF SCSVMHEALH NHYTQKSLSL SPGK

SEQ ID No. 42: human Het-R1/R2 subunit 1
MEPLVTWVVPLLFLFLLSRQGAACRTSECCFQDPPYPDADSGSASGPRDLRCYRISSDRYECSWQYEG

PTAGVSHFLRCCLSSGRCCYFAAGSATRLQFSDQAGVSVLYTVTLWVESWARNQTEKSPEVTLQLYNS

VKYEPPLGDIKVSKLAGQLRMEWETPDNQVGAEVQFRHRTPSSPWKLGDCGPQDDDTESCLCPLEMNV

AQEFQLRRRRLGSQGSSWSKWSSPVCVPPENGGGGSSGRSENIRTAGGGGSWELKKDVYVVELDWYPD

APGEMVVLTCDTPEEDGITWTLDQSSEVLGSGKTLTIQVKEFGDAGQYTCHKGGEVLSHSLLLLHKKE

DGIWSTDILKDQKEPKNKTFLRCEAKNYSGRFTCWWLTTISTDLTFSVKSSRGSSDPQGVTCGAATLS

AERVRGDNKEYEYSVECQEDSACPAAEESLPIEVMVDAVHKLKYENYTSSFFIRDIIKPDPPKNLQLK

PLKNSRQVEVSWEYPDTWSTPHSYFSLTFCVQVQGKSKREKKDRVFTDKTSATVICRKNASISVRAQD

RYYSSSWSEWASVPCSGGGGSGGGGSGGGGSDKTHTCPPCPAPELLGGPSVFLFPPKPKDTLMISRTP

EVTCVVVDVSHEDPEVKFNWYVDGVEVHNAKTKPREEQYNSTYRVVSVLTVLHQDWLNGKEYKCKVSN

KALPAPIEKTISKAKGQPREPQVYTLPPCRDELTKNQVSLWCLVKGFYPSDIAVEWESNGQPENNYKT

TPPVLDSDGSFFLYSKLTVDKSRWQQGNVFSCSVMHEALHNHYTQKSLSLSPGK

SEQ ID No. 43: mouse Het-R1/R2 subunit 2
MAQTVRECSL ALLFLFMWLL IKANIDVCKL GTVTVQPAPV IPLGSAANIS CSLNPKQGCS

HYPSSNELIL LKFVNDVLVE NLHGKKVHDH TGHSSTFQVT NLSLGMTLFV CKLNCSNSQK

KPPVPVCGVE ISVGVAPEPP QNISCVQEGE NGTVACSWNS GKVTYLKTNY TLQLSGPNNL

TCQKQCFSDN RQNCNRLDLG INLSPDLAES RFIVRVTAIN DLGNSSSLPH TFTFLDIVIP

LPPWDIRINF LNASGSRGTL QWEDEGQVVL NQLRYQPLNS TSWNMVNATN AKGKYDLRDL

RPFTEYEFQI SSKLHLSGGS WSNWSESLRT RTPEEEPGGG GSSGRSENIR TAGGGGSRVI

PVSGPARCLS QSRNLLKTTD DMVKTAREKL KHYSCTAEDI DHEDITRDQT STLKTCLPLE

LHKNESCLAT RETSSTTRGS CLPPQKTSLM MTLCLGSIYE DLKMYQTEFQ AINAALQNHN

HQQIILDKGM LVAIDELMQS LNHNGETLRQ KPPVGEADPY RVKMKLCILL HAFSTRVVTI

NRVMGYLSSA GGGGSGGGGS GGGGSDKTHT CPPCPAPELL GGPSVFLFPP KPKDTLMISR

TPEVTCVVVD VSHEDPEVKF NWYVDGVEVH NAKTKPREEQ YNSTYRVVSV LTVLHQDWLN

GKEYKCKVSN KALPAPIEKT ISKAKGQPRE PQVCTLPPSR DELTKNQVSL SCAVKGFYPS

DIAVEWESNG QPENNYKTTP PVLDSDGSFF LVSKLTVDKS RWQQGNVFSC SVMHEALHNH

YTQKSLSLSP GK

SEQ ID No. 44: human Het-R1/R2 subunit 2
mahtfrgcslafmfiitwllikaKIDACKRGDVTVKPSHVILLGSTVNITCSLKPRQGCFHYSRRNKL

ILYKFDRRINFHHGHSLNSQVTGLPLGTTLFVCKLACINSDEIQICGAEIFVGVAPEQPQNLSCIQKG

EQGTVACTWERGRDTHLYTEYTLQLSGPKNLTWQKQCKDIYCDYLDEGINLTPESPESNETAKVTAVN

SLGSSSSLPSTFTELDIVRPLPPWDIRIKFQKASVSRCTLYWRDEGLVLLNRLRYRPSNSRLWNMVNV

TKAKGRHDLLDLKPFTEYEFQISSKLHLYKGSWSDWSESLRAQTPEEEPGGGGSSGRSENIRTAGGGG

SRNLPVATPDPGMFPCLHHSQNLLRAVSNMLQKARQTLEFYPCTSEEIDHEDITKDKTSTVEACLPLE

LTKNESCLNSRETSFITNGSCLASRKTSFMMALCLSSIYEDLKMYQVEFKTMNAKLLMDPKRQIFLDQ

NMLAVIDELMQALNENSETVPQKSSLEEPDFYKTKIKLCILLHAFRIRAVTIDRVMSYLNASGGGGSG

GGGSGGGGSDKTHTCPPCPAPELLGGPSVFLFPPKPKDTLMISRTPEVTCVVVDVSHEDPEVKFNWYV

DGVEVHNAKTKPREEQYNSTYRVVSVLTVLHQDWLNGKEYKCKVSNKALPAPIEKTISKAKGQPREPQ

VCTLPPSRDELTKNQVSLSCAVKGFYPSDIAVEWESNGQPENNYKTTPPVLDSDGSFFLVSKLTVDKS

RWQQGNVFSCSVMHEALHNHYTQKSLSLSPGK

SEQ ID No. 45: mouse Het-R1 subunit 1
MDMMGLAGTS KHITFLLLCQ LGASGPDGC CVEKTSFPEG ASGSPLGPRN LSCYRVSKTD

YECSWQYDGP EDNVSHVLWC CFVPPNHTHT GQERCRYFSS GPDRTVQFWE QDGIPVLSKV

NFWVESRLGN RTMKSQKISQ YLYNWTKTTP PLGHIKVSQS HRQLRMDWNV SEEAGAEVQF

RRRMPTTNWT LGDCGPQVNS GSGVLGDIRG SMSESCLCPS ENMAQEIQIR RRRRLSSGAP

GGPWSDWSMP VCVPPEVLPG GGGSSGRSEN IRTAGGGGSM WELEKDVYVV EVDWTPDAPG

ETVNLTCDTP EEDDITWTSD QRHGVIGSGK TLTITVKEFL DAGQYTCHKG GETLSHSHLL

LHKKENGIWS TEILKNFKNK TFLKCEAPNY SGRFTCSWLV QRNMDLKFNI KSSSSSPDSR

AVTCGMASLS AEKVTLDQRD YEKYSVSCQE DVTCPTAEET LPIELALEAR QQNKYENYST

SFFIRDIIKP DPPKNLQMKP LKNSQVEVSW EYPDSWSTPH SYFSLKFFVR IQRKKEKMKE

TEEGCNQKGA FLVEKTSTEV QCKGGNVCVQ AQDRYYNSSC SKWACVPCRV RSGGGGSGGG

GSGGGGSDKT HTCPPCPAPE LLGGPSVFLF PPKPKDTLMI SRTPEVTCVV VDVSHEDPEV

KFNWYVDGVE VHNAKTKPRE EQYNSTYRVV SVLTVLHQDW LNGKEYKCKV SNKALPAPIE

KTISKAKGQP REPQVYTLPP CRDELTKNQV SLWCLVKGFY PSDIAVEWES NGQPENNYKT

TPPVLDSDGS FFLYSKLTVD KSRWQQGNVF SCSVMHEALH NHYTQKSLSL SPGK

SEQ ID No. 46: human Het-R1 subunit 1
MEPLVTWVVPLLFLFLLSRQGAACRTSECCFQDPPYPDADSGSASGPRDLRCYRISSDRYECSWQYEG

PTAGVSHFLRCCLSSGRCCYFAAGSATRLQFSDQAGVSVLYTVTLWVESWARNQTEKSPEVTLQLYNS

VKYEPPLGDIKVSKLAGQLRMEWETPDNQVGAEVQFRHRTPSSPWKLGDCGPQDDDTESCLCPLEMNV

AQEFQLRRRLGSQGSSWSKWSSPVCVPPENGGGGSSGRSENIRTAGGGGSWELKKDVYVVELDWYPD

APGEMVVLTCDTPEEDGITWTLDQSSEVLGSGKTLTIQVKEFGDAGQYTCHKGGEVLSHSLLLLHKKE

DGIWSTDILKDQKEPKNKTFLRCEAKNYSGRFTCWWLTTISTDLTFSVKSSRGSSDPQGVTCGAATLS

AERVRGDNKEYEYSVECQEDSACPAAEESLPIEVMVDAVHKLKYENYTSSFFIRDIIKPDPPKNLQLK

PLKNSRQVEVSWEYPDTWSTPHSYFSLTFCVQVQGKSKREKKDRVFTDKTSATVICRKNASISVRAQD

RYYSSSWSEWASVPCSGGGGSGGGGSGGGGSDKTHTCPPCPAPELLGGPSVFLFPPKPKDTLMISRTP

EVTCVVVDVSHEDPEVKFNWYVDGVEVHNAKTKPREEQYNSTYRVVSVLTVLHQDWLNGKEYKCKVSN

KALPAPIEKTISKAKGQPREPQVYTLPPCRDELTKNQVSLWCLVKGFYPSDIAVEWESNGQPENNYKT

TPPVLDSDGSFFLYSKLTVDKSRWQQGNVFSCSVMHEALHNHYTQKSLSLSPGK

SEQ ID No. 47: mouse Het-R1 subunit 2
MCQSRYLLFL ATLALLNHLS LARVIPVSGP ARCLSQSRNL LKTTDDMVKT AREKLKHYSC

TAEDIDHEDI TRDQTSTLKT CLPLELHKNE SCLATRETSS TTRGSCLPPQ KTSLMMTLCL

GSIYEDLKMY QTEFQAINAA LQNHNHQQII LDKGMLVAID ELMQSLNHNG ETLRQKPPVG

EADPYRVKMK LCILLHAFST RVVTINRVMG YLSSAGGGGS GGGGSGGGGS DKTHTCPPCP

APELLGGPSV FLFPPKPKDT LMISRTPEVT CVVVDVSHED PEVKFNWYVD GVEVHNAKTK

PREEQYNSTY RVVSVLTVLH QDWLNGKEYK CKVSNKALPA PIEKTISKAK GQPREPQVCT

LPPSRDELTK NQVSLSCAVK GFYPSDIAVE WESNGQPENN YKTTPPVLDS DGSFFLVSKL

TVDKSRWQQG NVFSCSVMHE ALHNHYTQKS LSLSPGK

SEQ ID No. 48: human Het-R1 subunit 2
MCPARSLLLVATLVLLDHLSLARNLPVATPDPGMFPCLHHSQNLLRAVSNMLQKARQTLEFYPCTSEE

IDHEDITKDKTSTVEACLPLELTKNESCLNSRETSFITNGSCLASRKTSFMMALCLSSIYEDLKMYQV

EFKTMNAKLLMDPKRQIFLDQNMLAVIDELMQALNFNSETVPQKSSLEEPDFYKTKIKLCILLHAFRI

RAVTIDRVMSYLNASGGGGSGGGGSGGGGSDKTHTCPPCPAPELLGGPSVFLFPPKPKDTLMISRTPE

VTCVVVDVSHEDPEVKFNWYVDGVEVHNAKTKPREEQYNSTYRVVSVLTVLHQDWLNGKEYKCKVSNK

ALPAPIEKTISKAKGQPREPQVCTLPPSRDELTKNQVSLSCAVKGFYPSDIAVEWESNGQPENNYKTT

PPVLDSDGSFFLVSKLTVDKSRWQQGNVFSCSVMHEALHNHYTQKSLSLSPGK

SEQ ID No. 49: mouse Het-R2 subunit 1
MCPQKLTISW FAIVLLVSPL MAMWELEKDV YVVEVDWTPD APGETVNLTC DTPEEDDITW

TSDQRHGVIG SGKTLTITVK EFLDAGQYTC HKGGETLSHS HLLLHKKENG IWSTEILKNF

KNKTFLKCEA PNYSGRFTCS WLVQRNMDLK FNIKSSSSSP DSRAVTCGMA SLSAEKVTLD

QRDYEKYSVS CQEDVTCPTA EETLPIELAL EARQQNKYEN YSTSFFIRDI IKPDPPKNLQ

-continued

MKPLKNSQVE VSWEYPDSWS TPHSYFSLKF FVRIQRKKEK MKETEEGCNQ KGAFLVEKTS

TEVQCKGGNV CVQAQDRYYN SSCSKWACVP CRVRSGGGGS GGGGSGGGGS DKTHTCPPCP

APELLGGPSV FLFPPKPKDT LMISRTPEVT CVVVDVSHED PEVKFNWYVD GVEVHNAKTK

PREEQYNSTY RVVSVLTVLH QDWLNGKEYK CKVSNKALPA PIEKTISKAK GQPREPQVYT

LPPCRDELTK NQVSLWCLVK GFYPSDIAVE WESNGQPENN YKTTPPVLDS DGSFFLYSKL

TVDKSRWQQG NVFSCSVMHE ALHNHYTQKS LSLSPGK

SEQ ID No. 50: human Het-R2 subunit 1
MCHQQLVISWFSLVFLASPLVAIWELKKDVYVVELDWYPDAPGEMVVLTCDTPEEDGITWTLDQSSEV

LGSGKTLTIQVKEFGDAGQYTCHKGGEVLSHSLLLLHKKEDGIWSTDILKDQKEPKNKTFLRCEAKNY

SGRFTCWWLTTISTDLTFSVKSSRGSSDPQGVTCGAATLSAERVRGDNKEYEYSVECQEDSACPAAEE

SLPIEVMVDAVHKLKYENYTSSFFIRDIIKPDPPKNLQLKPLKNSRQVEVSWEYPDTWSTPHSYFSLT

FCVQVQGKSKREKKDRVFTDKTSATVICRKNASISVRAQDRYYSSSWSEWASVPCSGGGGSGGGGSGG

GGSDKTHTCPPCPAPELLGGPSVFLFPPKPKDTLMISRTPEVTCVVVDVSHEDPEVKFNWYVDGVEVH

NAKTKPREEQYNSTYRVVSVLTVLHQDWLNGKEYKCKVSNKALPAPIEKTISKAKGQPREPQVYTLPP

CRDELTKNQVSLWCLVKGFYPSDIAVEWESNGQPENNYKTTPPVLDSDGSFFLYSKLTVDKSRWQQGN

VFSCSVMHEALHNHYTQKSLSLSPGK

SEQ ID No. 51: mouse Het-R2 subunit 2
MAQTVRECSL ALLFLFMWLL IKANIDVCKL GTVTVQPAPV IPLGSAANIS CSLNPKQGCS

HYPSSNELIL LKFVNDVLVE NLHGKKVHDH TGHSSTFQVT NLSLGMTLFV CKLNCSNSQK

KPPVPVCGVE ISVGVAPEPP QNISCVQEGE NGTVACSWNS GKVTYLKTNY TLQLSGPNNL

TCQKQCFSDN RQNCNRLDLG INLSPDLAES RFIVRVTAIN DLGNSSSLPH TFTFLDIVIP

LPPWDIRINF LNASGSRGTL QWEDEGQVVL NQLRYQPLNS TSWNMVNATN AKGKYDLRDL

RPFTEYEFQI SSKLHLSGGS WSNWSESLRT RTPEEEPGGG GSSGRSENIR TAGGGGSRVI

PVSGPARCLS QSRNLLKTTD DMVKTAREKL KHYSCTAEDI DHEDITRDQT STLKTCLPLE

LHKNESCLAT RETSSTTRGS CLPPQKTSLM MTLCLGSIYE DLKMYQTEFQ AINAALQNHN

HQQIILDKGM LVAIDELMQS LNHNGETLRQ KPPVGEADPY RVKMKLCILL HAFSTRVVTI

NRVMGYLSSA GGGGSGGGGS GGGGSDKTHT CPPCPAPELL GGPSVFLFPP KPKDTLMISR

TPEVTCVVVD VSHEDPEVKF NWYVDGVEVH NAKTKPREEQ YNSTYRVVSV LTVLHQDWLN

GKEYKCKVSN KALPAPIEKT ISKAKGQPRE PQVCTLPPSR DELTKNQVSL SCAVKGFYPS

DIAVEWESNG QPENNYKTTP PVLDSDGSFF LVSKLTVDKS RWQQGNVFSC SVMHEALHNH

YTQKSLSLSP GK

SEQ ID No. 52: human Het-R2 subunit 2
MAHTFRGCSLAFMFIITWLLIKAKIDACKRGDVTVKPSHVILLGSTVNITCSLKPRQGCFHYSRRNKL

ILYKFDRRINFHHGHSLNSQVTGLPLGTTLFVCKLACINSDEIQICGAEIFVGVAPEQPQNLSCIQKG

EQGTVACTWERGRDTHLYTEYTLQLSGPKNLTWQKQCKDIYCDYLDFGINLTPESPESNFTAKVTAVN

SLGSSSSLPSTFTFLDIVRPLPPWDIRIKFQKASVSRCTLYWRDEGLVLLNRLRYRPSNSRLWNMVNV

TKAKGRHDLLDLKPFTEYEFQISSKLHLYKGSWSDWSESLRAQTPEEEPGGGGSSGRSENIRTAGGGG

SRNLPVATPDPGMFPCLHHSQNLLRAVSNMLQKARQTLEFYPCTSEEIDHEDITKDKTSTVEACLPLE

LTKNESCLNSRETSFITNGSCLASRKTSFMMALCLSSIYEDLKMYQVEFKTMNAKLLMDPKRQIFLDQ

NMLAVIDELMQALNFNSETVPQKSSLEEPDFYKTKIKLCILLHAFRIRAVTIDRVMSYLNASGGGGSG

GGGSGGGGSDKTHTCPPCPAPELLGGPSVFLFPPKPKDTLMISRTPEVTCVVVDVSHEDPEVKFNWYV

DGVEVHNAKTKPREEQYNSTYRVVSVLTVLHQDWLNGKEYKCKVSNKALPAPIEKTISKAKGQPREPQ

-continued

VCTLPPSRDELTKNQVSLSCAVKGFYPSDIAVEWESNGQPENNYKTTPPVLDSDGSFFLVSKLTVDKS

RWQQGNVFSCSVMHEALHNHYTQKSLSLSPGK

Applicant's disclosure is described herein in preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of Applicant's disclosure may be combined in any suitable manner in one or more embodiments. In the description, herein, numerous specific details are recited to provide a thorough understanding of embodiments of the invention. One skilled in the relevant art will recognize, however, that Applicant's composition and/or method may be practiced without one or more of the specific details, or with other methods, components, materials, and so forth. In other instances, well-known structures, materials, or operations are not shown or described in detail to avoid obscuring aspects of the disclosure.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples and the references to the scientific and patent literature included herein. The examples contain important additional information, exemplification and guidance that can be adapted to the practice of this invention in its various embodiments and equivalents thereof.

What is claimed is:

1. A homodimeric or heterodimeric protein, comprising:
a first structural unit: one or two subunits of interleukin 12 (IL12) selected from P35 and P40 subunits, having sequence identity to SEQ ID NOS: 1 to 4;
a second structural unit: an antibody Fc domain, wherein the second structural unit is located at the C-terminus of the fusion protein and having sequence identity to SEQ ID NOS: 5 to 7;
a first linker segment covalently linking the first structural unit and the second structural unit;
an interleukin 12 receptor (IL12R) linked to the N-terminus of the first structural unit and having an IL12 binding portion comprising IL12RB1 (Rβ1) and IL12Rβ2 (Rβ2) domains of SEQ ID NOS: 8 to 11; and
a second linker segment (L2) covalently linking the IL12R binding domain to the first structural unit, wherein
L2 is capable of being recognized and hydrolyzed by a proteolytic enzyme specifically expressed in a tumor microenvironment,
wherein the homodimeric or heterodimeric protein has an amino acid sequence of at least one of SEQ ID NO: 31, 32, 37, 38, 39, 41, 40, 42, 43, 44, 45, 46, 47, 48, 49, 50, 51, or 52.

2. The homodimeric or heterodimeric protein of claim 1, being a homodimer of the monomer comprising a P40 subunit, a linker segment L1, a P35 subunit, a linker segment L1, a fusion protein of human IgG1, and having the amino acid sequence set forth in SEQ ID NO: 31 or in SEQ ID NO: 32.

3. The homodimeric or heterodimeric protein of claim 1, being a homodimer of the monomer: IL12RB1, a linker segment L2, a P40 subunit, a linker segment L1, a P35 subunit, a linker segment L1, and human IgG1, and having the amino acid sequence set forth in SEQ ID NO: 37 or in SEQ ID NO: 38.

4. The homodimeric or heterodimeric protein of claim 1, being a homodimer of the monomer: IL12Rβ2, a linker segment L2, a P40 subunit, a linker segment L1, a P35 subunit, a linker segment L1, and human IgG1, and having the amino acid sequence set forth in SEQ ID NO: 39 or in SEQ ID NO: 40.

5. The homodimeric or heterodimeric protein of claim 1, being a heterodimer of a first monomer: Rβ1, a linker segment L2, a P40 subunit, a linker segment L1, a fusion protein of human Fc-knob, and having the amino acid sequence set forth in SEQ ID NO: 41; and a second monomer: a fusion protein of RB2, a linker segment L2, a P35 subunit, a linker segment L1, and human Fc-hole of IL12, and having the amino acid sequence set forth in SEQ ID NO: 43.

6. The homodimeric or heterodimeric protein of claim 1, being a heterodimer of a first monomer: Rβ1, a linker segment L2, a P40 subunit, a linker segment L1, a fusion protein of human Fc-knob, and having the amino acid sequence set forth in SEQ ID NO: 42; and
a second monomer: a fusion protein of Rβ2, a linker segment L2, a P35 subunit, a linker segment L1, and human Fc-hole of IL12, and having the amino acid sequence set forth in SEQ ID NO: 44.

7. The homodimeric or heterodimeric protein of claim 1, being a heterodimer of a first monomer: Rβ1, a linker segment L2, a P40 subunit, a linker segment L1, a fusion protein of a human Fc-knob, and having the amino acid sequence set forth in SEQ ID NO: 45; and
a second monomer: a fusion protein comprising a P35 subunit comprising signal peptide SP1, a linker segment L1, a human Fc-hole, and having the amino acid sequence set forth in SEQ ID NO: 47.

8. The homodimeric or heterodimeric protein of claim 1, being a heterodimer of a first monomer: RB1, a linker segment L2, a P40 subunit, a linker segment L1, a fusion protein of a human Fc-knob, and having the amino acid sequence set forth in SEQ ID NO: 46; and
a second monomer: a fusion protein comprising a P35 subunit comprising signal peptide SP1, a linker segment L1, a human Fc-hole, and having the amino acid sequence set forth in SEQ ID NO: 48.

9. The homodimeric or heterodimeric protein of claim 1, being a heterodimer of a first monomer: a fusion protein comprising a P40 subunit, a linker segment L1, and a human Fc-knob, and having the amino acid sequence set forth in SEQ ID NO: 49; and
a second monomer: a fusion protein comprising Rβ2, a linker segment L2, a P35 subunit, a linker segment L1, and human Fc-hole, and having the amino acid sequence set forth in SEQ ID NO: 51.

10. The homodimeric or heterodimeric protein of claim 1, being a heterodimer of a first monomer: a fusion protein comprising a P40 subunit, a linker segment L1, and a human Fc-knob, and having the amino acid sequence set forth in SEQ ID NO: 50; and
a second monomer: a fusion protein comprising Rβ2, a linker segment L2, a P35 subunit, a linker segment L1, and human Fc-hole, and having the amino acid sequence set forth in SEQ ID NO: 52.

11. A homodimeric or heterodimeric protein, comprising:
a first structural unit: one or two subunits of interleukin 12 (IL12) selected from P35 and P40 subunits having SEQ ID NOS: 1 to 4;
a second structural unit: an antibody Fc domain, wherein the second structural unit is located at the C-terminus of the fusion protein and having SEQ ID NOS: 5 to 7;
a first linker segment covalently linking the first structural unit and the second structural unit;
an interleukin 12 receptor (IL12R) binding domain, linked to the N-terminus of the first structural unit and having an IL12 binding portion comprising at least one of IL12RB1 (Rβ1) or IL12Rβ2 (Rβ2) domains of SEQ ID NOS: 8 to 11; and a second linker segment (L2) covalently linking the IL12R binding domain to the first structural unit, wherein L2 is capable of being recognized and hydrolyzed by a proteolytic enzyme specifically expressed in a tumor microenvironment being a homodimer or a heterodimer, wherein the homodimeric or heterodimeric protein has an amino acid sequence of at least one of SEQ ID NO: 37, 38, 39, 41, 40, 42, 43, 44, 45, 46, 47, 48, 49, 50, 51, or 52.

12. The homodimeric or heterodimeric protein of claim 11, being a homodimer of the monomer: IL12Rβ1, a linker segment L2, a P40 subunit, a linker segment L1, a P35 subunit, a linker segment L1, and human IgG1, and having the amino acid sequence set forth in SEQ ID NO: 37 or in SEQ ID NO: 38.

13. The homodimeric or heterodimeric protein of claim 11, being a homodimer of the monomer: IL12Rβ2, a linker segment L2, a P40 subunit, a linker segment L1, a P35 subunit, a linker segment L1, and human IgG1, and having the amino acid sequence set forth in SEQ ID NO: 39 or in SEQ ID NO: 40.

14. The homodimeric or heterodimeric protein of claim 11, being
a heterodimer of a first monomer: Rβ1, a linker segment L2, a P40 subunit, a linker segment L1, a fusion protein of human Fc-knob, and having the amino acid sequence set forth in SEQ ID NO: 41; and a second monomer: a fusion protein of Rβ2, a linker segment L2, a P35 subunit, a linker segment L1, and human Fc-hole of IL12, and having the amino acid sequence set forth in SEQ ID NO: 43.

15. The homodimeric or heterodimeric protein of claim 11, being a heterodimer of a first monomer: RB1, a linker segment L2, a P40 subunit, a linker segment L1, a fusion protein of human Fc-knob, and having the amino acid sequence set forth in SEQ ID NO: 42; and
a second monomer: a fusion protein of Rβ2, a linker segment L2, a P35 subunit, a linker segment L1, and human Fc-hole of IL12, and having the amino acid sequence set forth in SEQ ID NO: 44.

16. The homodimeric or heterodimeric protein of claim 11, being a heterodimer of a first monomer: RB1, a linker segment L2, a P40 subunit, a linker segment L1, a fusion protein of a human Fc-knob, and having the amino acid sequence set forth in SEQ ID NO: 45; and
a second monomer: a fusion protein comprising a P35 subunit comprising signal peptide SP1, a linker segment L1, a human Fc-hole, and having the amino acid sequence set forth in SEQ ID NO: 47.

17. The homodimeric or heterodimeric protein of claim 11, being a heterodimer of a first monomer: RB1, a linker segment L2, a P40 subunit, a linker segment L1, a fusion protein of a human Fc-knob, and having the amino acid sequence set forth in SEQ ID NO: 46; and
a second monomer: a fusion protein comprising a P35 subunit comprising signal peptide SP1, a linker segment L1, a human Fc-hole, and having the amino acid sequence set forth in SEQ ID NO: 48.

18. The homodimeric or heterodimeric protein of claim 11, being a heterodimer of a first monomer: a fusion protein comprising a P40 subunit, a linker segment L1, and a human Fc-knob, and having the amino acid sequence set forth in SEQ ID NO: 49; and
a second monomer: a fusion protein comprising Rβ2, a linker segment L2, a P35 subunit, a linker segment L1, and human Fc-hole, and having the amino acid sequence set forth in SEQ ID NO: 51.

19. The homodimeric or heterodimeric protein of claim 11, being a heterodimer of a first monomer: a fusion protein comprising a P40 subunit, a linker segment L1, and a human Fc-knob, and having the amino acid sequence set forth in SEQ ID NO: 50; and
a second monomer: a fusion protein comprising Rβ2, a linker segment L2, a P35 subunit, a linker segment L1, and human Fc-hole, and having the amino acid sequence set forth in SEQ ID NO: 52.

* * * * *

SEQUENCE LISTING

```
<160> NUMBER OF SEQ ID NOS: 53

<210> SEQ ID NO 1
<211> LENGTH: 313
<212> TYPE: PRT
<213> ORGANISM: Mus sp.

<400> SEQUENCE: 1

Met Trp Glu Leu Glu Lys Asp Val Tyr Val Val Glu Val Asp Trp Thr
1               5                   10                  15

Pro Asp Ala Pro Gly Glu Thr Val Asn Leu Thr Cys Asp Thr Pro Glu
            20                  25                  30

Glu Asp Asp Ile Thr Trp Thr Ser Asp Gln Arg His Gly Val Ile Gly
        35                  40                  45

Ser Gly Lys Thr Leu Thr Ile Thr Val Lys Glu Phe Leu Asp Ala Gly
    50                  55                  60

Gln Tyr Thr Cys His Lys Gly Gly Glu Thr Leu Ser His Ser His Leu
65                  70                  75                  80

Leu Leu His Lys Lys Glu Asn Gly Ile Trp Ser Thr Glu Ile Leu Lys
                85                  90                  95

Asn Phe Lys Asn Lys Thr Phe Leu Lys Cys Glu Ala Pro Asn Tyr Ser
            100                 105                 110

Gly Arg Phe Thr Cys Ser Trp Leu Val Gln Arg Asn Met Asp Leu Lys
```

```
                115                 120                 125
    Phe Asn Ile Lys Ser Ser Ser Pro Asp Ser Arg Ala Val Thr
    130                 135                 140

Cys Gly Met Ala Ser Leu Ser Ala Glu Lys Val Thr Leu Asp Gln Arg
    145                 150                 155                 160

Asp Tyr Glu Lys Tyr Ser Val Ser Cys Gln Glu Asp Val Thr Cys Pro
                        165                 170                 175

Thr Ala Glu Glu Thr Leu Pro Ile Glu Leu Ala Leu Glu Ala Arg Gln
                    180                 185                 190

Gln Asn Lys Tyr Glu Asn Tyr Ser Thr Ser Phe Phe Ile Arg Asp Ile
                195                 200                 205

Ile Lys Pro Asp Pro Lys Asn Leu Gln Met Lys Pro Leu Lys Asn
    210                 215                 220

Ser Gln Val Glu Val Ser Trp Glu Tyr Pro Asp Ser Trp Ser Thr Pro
    225                 230                 235                 240

His Ser Tyr Phe Ser Leu Lys Phe Phe Val Arg Ile Gln Arg Lys Lys
                    245                 250                 255

Glu Lys Met Lys Glu Thr Glu Glu Gly Cys Asn Gln Lys Gly Ala Phe
                260                 265                 270

Leu Val Glu Lys Thr Ser Thr Glu Val Gln Cys Lys Gly Gly Asn Val
                275                 280                 285

Cys Val Gln Ala Gln Asp Arg Tyr Tyr Asn Ser Ser Cys Ser Lys Trp
    290                 295                 300

Ala Cys Val Pro Cys Arg Val Arg Ser
    305                 310

<210> SEQ ID NO 2
<211> LENGTH: 305
<212> TYPE: PRT
<213> ORGANISM: Homo sapiens

<400> SEQUENCE: 2

Trp Glu Leu Lys Lys Asp Val Tyr Val Val Glu Leu Asp Trp Tyr Pro
1               5                   10                  15

Asp Ala Pro Gly Glu Met Val Val Leu Thr Cys Asp Thr Pro Glu Glu
                20                  25                  30

Asp Gly Ile Thr Trp Thr Leu Asp Gln Ser Ser Glu Val Leu Gly Ser
            35                  40                  45

Gly Lys Thr Leu Thr Ile Gln Val Lys Glu Phe Gly Asp Ala Gly Gln
        50                  55                  60

Tyr Thr Cys His Lys Gly Gly Glu Val Leu Ser His Ser Leu Leu Leu
65                  70                  75                  80

Leu His Lys Lys Glu Asp Gly Ile Trp Ser Thr Asp Ile Leu Lys Asp
                85                  90                  95

Gln Lys Glu Pro Lys Asn Lys Thr Phe Leu Arg Cys Glu Ala Lys Asn
            100                 105                 110

Tyr Ser Gly Arg Phe Thr Cys Trp Trp Leu Thr Thr Ile Ser Thr Asp
        115                 120                 125

Leu Thr Phe Ser Val Lys Ser Ser Arg Gly Ser Ser Asp Pro Gln Gly
    130                 135                 140

Val Thr Cys Gly Ala Ala Thr Leu Ser Ala Glu Arg Val Arg Gly Asp
145                 150                 155                 160

Asn Lys Glu Tyr Glu Tyr Ser Val Glu Cys Gln Glu Asp Ser Ala Cys
                165                 170                 175
```

```
Pro Ala Ala Glu Glu Ser Leu Pro Ile Glu Val Met Val Asp Ala Val
            180                 185                 190

His Lys Leu Lys Tyr Glu Asn Tyr Thr Ser Ser Phe Phe Ile Arg Asp
        195                 200                 205

Ile Ile Lys Pro Asp Pro Pro Lys Asn Leu Gln Leu Lys Pro Leu Lys
    210                 215                 220

Asn Ser Arg Gln Val Glu Val Ser Trp Glu Tyr Pro Asp Thr Trp Ser
225                 230                 235                 240

Thr Pro His Ser Tyr Phe Ser Leu Thr Phe Cys Val Gln Val Gln Gly
            245                 250                 255

Lys Ser Lys Arg Glu Lys Lys Asp Arg Val Phe Thr Asp Lys Thr Ser
        260                 265                 270

Ala Thr Val Ile Cys Arg Lys Asn Ala Ser Ile Ser Val Arg Ala Gln
    275                 280                 285

Asp Arg Tyr Tyr Ser Ser Ser Trp Ser Glu Trp Ala Ser Val Pro Cys
290                 295                 300

Ser
305

<210> SEQ ID NO 3
<211> LENGTH: 193
<212> TYPE: PRT
<213> ORGANISM: Mus sp.

<400> SEQUENCE: 3

Arg Val Ile Pro Val Ser Gly Pro Ala Arg Cys Leu Ser Gln Ser Arg
1               5                   10                  15

Asn Leu Leu Lys Thr Thr Asp Asp Met Val Lys Thr Ala Arg Glu Lys
            20                  25                  30

Leu Lys His Tyr Ser Cys Thr Ala Glu Asp Ile Asp His Glu Asp Ile
        35                  40                  45

Thr Arg Asp Gln Thr Ser Thr Leu Lys Thr Cys Leu Pro Leu Glu Leu
    50                  55                  60

His Lys Asn Glu Ser Cys Leu Ala Thr Arg Glu Thr Ser Ser Thr Thr
65                  70                  75                  80

Arg Gly Ser Cys Leu Pro Pro Gln Lys Thr Ser Leu Met Met Thr Leu
                85                  90                  95

Cys Leu Gly Ser Ile Tyr Glu Asp Leu Lys Met Tyr Gln Thr Glu Phe
            100                 105                 110

Gln Ala Ile Asn Ala Ala Leu Gln Asn His Asn His Gln Gln Ile Ile
        115                 120                 125

Leu Asp Lys Gly Met Leu Val Ala Ile Asp Glu Leu Met Gln Ser Leu
    130                 135                 140

Asn His Asn Gly Glu Thr Leu Arg Gln Lys Pro Pro Val Gly Glu Ala
145                 150                 155                 160

Asp Pro Tyr Arg Val Lys Met Lys Leu Cys Ile Leu Leu His Ala Phe
                165                 170                 175

Ser Thr Arg Val Val Thr Ile Asn Arg Val Met Gly Tyr Leu Ser Ser
            180                 185                 190

Ala

<210> SEQ ID NO 4
<211> LENGTH: 197
<212> TYPE: PRT
<213> ORGANISM: Homo sapiens
```

<400> SEQUENCE: 4

```
Arg Asn Leu Pro Val Ala Thr Pro Asp Pro Gly Met Phe Pro Cys Leu
1               5                   10                  15
His His Ser Gln Asn Leu Leu Arg Ala Val Ser Asn Met Leu Gln Lys
            20                  25                  30
Ala Arg Gln Thr Leu Glu Phe Tyr Pro Cys Thr Ser Glu Glu Ile Asp
        35                  40                  45
His Glu Asp Ile Thr Lys Asp Lys Thr Ser Val Glu Ala Cys Leu
50                  55                  60
Pro Leu Glu Leu Thr Lys Asn Glu Ser Cys Leu Asn Ser Arg Glu Thr
65                  70                  75                  80
Ser Phe Ile Thr Asn Gly Ser Cys Leu Ala Ser Arg Lys Thr Ser Phe
                85                  90                  95
Met Met Ala Leu Cys Leu Ser Ser Ile Tyr Glu Asp Leu Lys Met Tyr
            100                 105                 110
Gln Val Glu Phe Lys Thr Met Asn Ala Lys Leu Leu Met Asp Pro Lys
        115                 120                 125
Arg Gln Ile Phe Leu Asp Gln Asn Met Leu Ala Val Ile Asp Glu Leu
130                 135                 140
Met Gln Ala Leu Asn Phe Asn Ser Glu Thr Val Pro Gln Lys Ser Ser
145                 150                 155                 160
Leu Glu Glu Pro Asp Phe Tyr Lys Thr Lys Ile Lys Leu Cys Ile Leu
                165                 170                 175
Leu His Ala Phe Arg Ile Arg Ala Val Thr Ile Asp Arg Val Met Ser
            180                 185                 190
Tyr Leu Asn Ala Ser
        195
```

<210> SEQ ID NO 5
<211> LENGTH: 227
<212> TYPE: PRT
<213> ORGANISM: Homo sapiens

<400> SEQUENCE: 5

```
Asp Lys Thr His Thr Cys Pro Pro Cys Pro Ala Pro Glu Leu Leu Gly
1               5                   10                  15
Gly Pro Ser Val Phe Leu Phe Pro Pro Lys Pro Lys Asp Thr Leu Met
            20                  25                  30
Ile Ser Arg Thr Pro Glu Val Thr Cys Val Val Val Asp Val Ser His
        35                  40                  45
Glu Asp Pro Glu Val Lys Phe Asn Trp Tyr Val Asp Gly Val Glu Val
50                  55                  60
His Asn Ala Lys Thr Lys Pro Arg Glu Glu Gln Tyr Asn Ser Thr Tyr
65                  70                  75                  80
Arg Val Val Ser Val Leu Thr Val Leu His Gln Asp Trp Leu Asn Gly
                85                  90                  95
Lys Glu Tyr Lys Cys Lys Val Ser Asn Lys Ala Leu Pro Ala Pro Ile
            100                 105                 110
Glu Lys Thr Ile Ser Lys Ala Lys Gly Gln Pro Arg Glu Pro Gln Val
        115                 120                 125
Cys Thr Leu Pro Pro Ser Arg Asp Glu Leu Thr Lys Asn Gln Val Ser
130                 135                 140
Leu Ser Cys Ala Val Lys Gly Phe Tyr Pro Ser Asp Ile Ala Val Glu
145                 150                 155                 160
```

```
Trp Glu Ser Asn Gly Gln Pro Glu Asn Asn Tyr Lys Thr Thr Pro Pro
                165                 170                 175

Val Leu Asp Ser Asp Gly Ser Phe Phe Leu Val Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn His Tyr Thr Gln Lys Ser Leu Ser Leu Ser
    210                 215                 220

Pro Gly Lys
225

<210> SEQ ID NO 6
<211> LENGTH: 227
<212> TYPE: PRT
<213> ORGANISM: Homo sapiens

<400> SEQUENCE: 6

Asp Lys Thr His Thr Cys Pro Pro Cys Pro Ala Pro Glu Leu Leu Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Pro Ala Pro Ile
            100                 105                 110

Glu Lys Thr Ile Ser Lys Ala Lys Gly Gln Pro Arg Glu Pro Gln Val
        115                 120                 125

Tyr Thr Leu Pro Pro Cys Arg Asp Glu Leu Thr Lys Asn Gln Val Ser
130                 135                 140

Leu Trp Cys Leu Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Tyr Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn His Tyr Thr Gln Lys Ser Leu Ser Leu Ser
    210                 215                 220

Pro Gly Lys
225

<210> SEQ ID NO 7
<211> LENGTH: 226
<212> TYPE: PRT
<213> ORGANISM: Homo sapiens

<400> SEQUENCE: 7

Asp Lys Thr His Thr Cys Pro Pro Cys Pro Ala Pro Glu Leu Leu Gly
1               5                   10                  15
```

```
Gly Pro Ser Val Phe Leu Phe Pro Lys Pro Lys Asp Gln Leu Met
                20                  25                  30

Ile Ser Arg Thr Pro Glu Val Thr Cys Val Val Val Asp Val Ser His
            35                  40                  45

Glu Asp Pro Glu Val Lys Phe Asn Trp Tyr Val Asp Gly Val Glu Val
 50                  55                  60

His Asn Ala Lys Thr Lys Pro Arg Glu Glu Gln Tyr Asn Ser Thr Tyr
 65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Pro Ala Pro Ile
            100                 105                 110

Glu Lys Thr Ile Ser Lys Ala Lys Gly Gln Pro Arg Glu Pro Gln Val
        115                 120                 125

Tyr Thr Leu Pro Pro Ser Arg Asp Glu Leu Thr Lys Asn Gln Val Ser
130                 135                 140

Leu Thr Cys Leu Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Leu Tyr Ser Lys Leu Thr Val Asp
            180                 185                 190

Lys Ser Arg Trp Gln Gln Gly Asn Val Phe Ser Cys Ser Val Leu His
        195                 200                 205

Glu Ala Leu His Asn His Tyr Thr Gln Lys Ser Leu Ser Leu Ser Pro
210                 215                 220

Gly Lys
225

<210> SEQ ID NO 8
<211> LENGTH: 259
<212> TYPE: PRT
<213> ORGANISM: Mus sp.

<400> SEQUENCE: 8

Met Asp Met Met Gly Leu Ala Gly Thr Ser Lys His Ile Thr Phe Leu
1               5                   10                  15

Leu Leu Cys Gln Leu Gly Ala Ser Gly Pro Gly Asp Gly Cys Cys Val
            20                  25                  30

Glu Lys Thr Ser Phe Pro Glu Gly Ala Ser Gly Ser Pro Leu Gly Pro
        35                  40                  45

Arg Asn Leu Ser Cys Tyr Arg Val Ser Lys Thr Asp Tyr Glu Cys Ser
 50                  55                  60

Trp Gln Tyr Asp Gly Pro Glu Asp Asn Val Ser His Val Leu Trp Cys
 65                  70                  75                  80

Cys Phe Val Pro Pro Asn His Thr His Thr Gly Gln Glu Arg Cys Arg
                85                  90                  95

Tyr Phe Ser Ser Gly Pro Asp Arg Thr Val Gln Phe Trp Glu Gln Asp
            100                 105                 110

Gly Ile Pro Val Leu Ser Lys Val Asn Phe Trp Val Glu Ser Arg Leu
        115                 120                 125

Gly Asn Arg Thr Met Lys Ser Gln Lys Ile Ser Gln Tyr Leu Tyr Asn
130                 135                 140

Trp Thr Lys Thr Thr Pro Pro Leu Gly His Ile Lys Val Ser Gln Ser
145                 150                 155                 160
```

His Arg Gln Leu Arg Met Asp Trp Asn Val Ser Glu Ala Gly Ala
            165                 170                 175

Glu Val Gln Phe Arg Arg Met Pro Thr Thr Asn Trp Thr Leu Gly
            180                 185                 190

Asp Cys Gly Pro Gln Val Asn Ser Gly Ser Gly Val Leu Gly Asp Ile
            195                 200                 205

Arg Gly Ser Met Ser Glu Ser Cys Leu Cys Pro Ser Glu Asn Met Ala
210                 215                 220

Gln Glu Ile Gln Ile Arg Arg Arg Arg Leu Ser Ser Gly Ala Pro
225                 230                 235                 240

Gly Gly Pro Trp Ser Asp Trp Ser Met Pro Val Cys Val Pro Pro Glu
            245                 250                 255

Val Leu Pro

<210> SEQ ID NO 9
<211> LENGTH: 235
<212> TYPE: PRT
<213> ORGANISM: Homo sapiens

<400> SEQUENCE: 9

Met Glu Pro Leu Val Thr Trp Val Val Pro Leu Leu Phe Leu Phe Leu
1               5                   10                  15

Leu Ser Arg Gln Gly Ala Ala Cys Arg Thr Ser Glu Cys Cys Phe Gln
            20                  25                  30

Asp Pro Pro Tyr Pro Asp Ala Asp Ser Gly Ser Ala Ser Gly Pro Arg
            35                  40                  45

Asp Leu Arg Cys Tyr Arg Ile Ser Ser Asp Arg Tyr Glu Cys Ser Trp
50                  55                  60

Gln Tyr Glu Gly Pro Thr Ala Gly Val Ser His Phe Leu Arg Cys Cys
65                  70                  75                  80

Leu Ser Ser Gly Arg Cys Cys Tyr Phe Ala Ala Gly Ser Ala Thr Arg
            85                  90                  95

Leu Gln Phe Ser Asp Gln Ala Gly Val Ser Val Leu Tyr Thr Val Thr
            100                 105                 110

Leu Trp Val Glu Ser Trp Ala Arg Asn Gln Thr Glu Lys Ser Pro Glu
            115                 120                 125

Val Thr Leu Gln Leu Tyr Asn Ser Val Lys Tyr Glu Pro Pro Leu Gly
            130                 135                 140

Asp Ile Lys Val Ser Lys Leu Ala Gly Gln Leu Arg Met Glu Trp Glu
145                 150                 155                 160

Thr Pro Asp Asn Gln Val Gly Ala Glu Val Gln Phe Arg His Arg Thr
            165                 170                 175

Pro Ser Ser Pro Trp Lys Leu Gly Asp Cys Gly Pro Gln Asp Asp Asp
            180                 185                 190

Thr Glu Ser Cys Leu Cys Pro Leu Glu Met Asn Val Ala Gln Glu Phe
            195                 200                 205

Gln Leu Arg Arg Arg Leu Gly Ser Gln Gly Ser Ser Trp Ser Lys
            210                 215                 220

Trp Ser Ser Pro Val Cys Val Pro Pro Glu Asn
225                 230                 235

<210> SEQ ID NO 10
<211> LENGTH: 337
<212> TYPE: PRT
<213> ORGANISM: Mus sp.

<400> SEQUENCE: 10

```
Met Ala Gln Thr Val Arg Glu Cys Ser Leu Ala Leu Leu Phe Leu Phe
1               5                   10                  15
Met Trp Leu Leu Ile Lys Ala Asn Ile Asp Val Cys Lys Leu Gly Thr
            20                  25                  30
Val Thr Val Gln Pro Ala Pro Val Ile Pro Leu Gly Ser Ala Ala Asn
        35                  40                  45
Ile Ser Cys Ser Leu Asn Pro Lys Gln Gly Cys Ser His Tyr Pro Ser
    50                  55                  60
Ser Asn Glu Leu Ile Leu Leu Lys Phe Val Asn Asp Val Leu Val Glu
65                  70                  75                  80
Asn Leu His Gly Lys Lys Val His Asp His Thr Gly His Ser Ser Thr
                85                  90                  95
Phe Gln Val Thr Asn Leu Ser Leu Gly Met Thr Leu Phe Val Cys Lys
            100                 105                 110
Leu Asn Cys Ser Asn Ser Gln Lys Lys Pro Val Pro Val Cys Gly
        115                 120                 125
Val Glu Ile Ser Val Gly Val Ala Pro Glu Pro Pro Gln Asn Ile Ser
130                 135                 140
Cys Val Gln Glu Gly Glu Asn Gly Thr Val Ala Cys Ser Trp Asn Ser
145                 150                 155                 160
Gly Lys Val Thr Tyr Leu Lys Thr Asn Tyr Thr Leu Gln Leu Ser Gly
                165                 170                 175
Pro Asn Asn Leu Thr Cys Gln Lys Gln Cys Phe Ser Asp Asn Arg Gln
            180                 185                 190
Asn Cys Asn Arg Leu Asp Leu Gly Ile Asn Leu Ser Pro Asp Leu Ala
        195                 200                 205
Glu Ser Arg Phe Ile Val Arg Val Thr Ala Ile Asn Asp Leu Gly Asn
    210                 215                 220
Ser Ser Ser Leu Pro His Thr Phe Thr Phe Leu Asp Ile Val Ile Pro
225                 230                 235                 240
Leu Pro Pro Trp Asp Ile Arg Ile Asn Phe Leu Asn Ala Ser Gly Ser
                245                 250                 255
Arg Gly Thr Leu Gln Trp Glu Asp Glu Gly Gln Val Val Leu Asn Gln
            260                 265                 270
Leu Arg Tyr Gln Pro Leu Asn Ser Thr Ser Trp Asn Met Val Asn Ala
        275                 280                 285
Thr Asn Ala Lys Gly Lys Tyr Asp Leu Arg Asp Leu Arg Pro Phe Thr
    290                 295                 300
Glu Tyr Glu Phe Gln Ile Ser Ser Lys Leu His Leu Ser Gly Gly Ser
305                 310                 315                 320
Trp Ser Asn Trp Ser Glu Ser Leu Arg Thr Arg Thr Pro Glu Glu Glu
                325                 330                 335
Pro
```

<210> SEQ ID NO 11
<211> LENGTH: 321
<212> TYPE: PRT
<213> ORGANISM: Homo sapiens

<400> SEQUENCE: 11

```
Met Ala His Thr Phe Arg Gly Cys Ser Leu Ala Phe Met Phe Ile Ile
1               5                   10                  15
```

```
Thr Trp Leu Leu Ile Lys Ala Lys Ile Asp Ala Cys Lys Arg Gly Asp
         20                  25                  30

Val Thr Val Lys Pro Ser His Val Ile Leu Leu Gly Ser Thr Val Asn
             35                  40                  45

Ile Thr Cys Ser Leu Lys Pro Arg Gln Gly Cys Phe His Tyr Ser Arg
 50                  55                  60

Arg Asn Lys Leu Ile Leu Tyr Lys Phe Asp Arg Arg Ile Asn Phe His
 65                  70                  75                  80

His Gly His Ser Leu Asn Ser Gln Val Thr Gly Leu Pro Leu Gly Thr
                 85                  90                  95

Thr Leu Phe Val Cys Lys Leu Ala Cys Ile Asn Ser Asp Glu Ile Gln
                100                 105                 110

Ile Cys Gly Ala Glu Ile Phe Val Gly Val Ala Pro Glu Gln Pro Gln
            115                 120                 125

Asn Leu Ser Cys Ile Gln Lys Gly Glu Gln Gly Thr Val Ala Cys Thr
130                 135                 140

Trp Glu Arg Gly Arg Asp Thr His Leu Tyr Thr Glu Tyr Thr Leu Gln
145                 150                 155                 160

Leu Ser Gly Pro Lys Asn Leu Thr Trp Gln Lys Gln Cys Lys Asp Ile
                165                 170                 175

Tyr Cys Asp Tyr Leu Asp Phe Gly Ile Asn Leu Thr Pro Glu Ser Pro
            180                 185                 190

Glu Ser Asn Phe Thr Ala Lys Val Thr Ala Val Asn Ser Leu Gly Ser
        195                 200                 205

Ser Ser Ser Leu Pro Ser Thr Phe Thr Phe Leu Asp Ile Val Arg Pro
210                 215                 220

Leu Pro Pro Trp Asp Ile Arg Ile Lys Phe Gln Lys Ala Ser Val Ser
225                 230                 235                 240

Arg Cys Thr Leu Tyr Trp Arg Asp Glu Gly Leu Val Leu Leu Asn Arg
                245                 250                 255

Leu Arg Tyr Arg Pro Ser Asn Ser Arg Leu Trp Asn Met Val Asn Val
            260                 265                 270

Thr Lys Ala Lys Gly Arg His Asp Leu Leu Asp Leu Lys Pro Phe Thr
        275                 280                 285

Glu Tyr Glu Phe Gln Ile Ser Ser Lys Leu His Leu Tyr Lys Gly Ser
    290                 295                 300

Trp Ser Asp Trp Ser Glu Ser Leu Arg Ala Gln Thr Pro Glu Glu Glu
305                 310                 315                 320

Pro

<210> SEQ ID NO 12
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 12

Gly Gly Gly Gly Ser Gly Gly Gly Gly Ser Gly Gly Gly Gly Ser
1               5                   10                  15

<210> SEQ ID NO 13
<211> LENGTH: 20
<212> TYPE: PRT
<213> ORGANISM: Artificial Sequence
<220> FEATURE:
```

```
<223> OTHER INFORMATION: Description of Artificial Sequence: Synthetic
      peptide

<400> SEQUENCE: 13

Gly Gly Gly Gly Ser Ser Gly Ala Arg Tyr Arg Trp Leu Thr Ala Gly
1               5                   10                  15

Gly Gly Gly Ser
            20

<210> SEQ ID NO 14
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 14

Gly Gly Gly Gly Ser Ser Gly Arg Ser Glu Asn Ile Arg Thr Ala Gly
1               5                   10                  15

Gly Gly Gly Ser
            20

<210> SEQ ID NO 15
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 15

Gly Gly Gly Gly Ser Ser Gly Arg Ala Met His Met Tyr Thr Ala Gly
1               5                   10                  15

Gly Gly Gly Ser
            20

<210> SEQ ID NO 16
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 16

Gly Gly Gly Gly Ser Ser Gly Ala Ala Met His Met Tyr Thr Ala Gly
1               5                   10                  15

Gly Gly Gly Ser
            20

<210> SEQ ID NO 17
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 17

Gly Gly Gly Gly Ser Ser Gly Ala Ile Gly Phe Leu Arg Thr Ala Gly
1               5                   10                  15

Gly Gly Gly Ser
            20
```

<210> SEQ ID NO 18
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 18

Gly Gly Gly Gly Ser Ser Gly Ala Ser Glu Asn Ile Arg Thr Ala Gly
1               5                   10                  15

Gly Gly Gly Ser
            20

<210> SEQ ID NO 19
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 19

Gly Gly Gly Gly Ser Ser Gly Arg Pro Glu Asn Ile Arg Thr Ala Gly
1               5                   10                  15

Gly Gly Gly Ser
            20

<210> SEQ ID NO 20
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 20

Gly Gly Gly Gly Ser Ser Gly Ala Pro Glu Asn Ile Arg Thr Ala Gly
1               5                   10                  15

Gly Gly Gly Ser
            20

<210> SEQ ID NO 21
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 21

Gly Gly Gly Gly Ser Ser Gly Leu Ile Ser His Ser Ile Thr Ala Gly
1               5                   10                  15

Gly Gly Gly Ser
            20

<210> SEQ ID NO 22
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 22

```
Gly Gly Gly Gly Ser Ser Gly Asn Leu Arg Ser Lys Leu Thr Ala Gly
1               5                   10                  15

Gly Gly Gly Ser
            20
```

<210> SEQ ID NO 23
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 23

```
Gly Gly Gly Gly Ser Ser Gly Val Phe Ser Ile Pro Leu Thr Ala Gly
1               5                   10                  15

Gly Gly Gly Ser
            20
```

<210> SEQ ID NO 24
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 24

```
Gly Gly Gly Gly Ser Ser Gly Ile Lys Tyr His Ser Leu Thr Ala Gly
1               5                   10                  15

Gly Gly Gly Ser
            20
```

<210> SEQ ID NO 25

<400> SEQUENCE: 25

000

<210> SEQ ID NO 26
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 26

```
Gly Gly Gly Gly Ser Ser Gly Arg Ile Gly Phe Leu Arg Thr Ala Gly
1               5                   10                  15

Gly Gly Gly Ser
            20
```

<210> SEQ ID NO 27
<211> LENGTH: 22
<212> TYPE: PRT
<213> ORGANISM: Mus sp.

<400> SEQUENCE: 27

```
Met Cys Gln Ser Arg Tyr Leu Leu Phe Leu Ala Thr Leu Ala Leu Leu
1               5                   10                  15

Asn His Leu Ser Leu Ala
            20
```

```
<210> SEQ ID NO 28
<211> LENGTH: 22
<212> TYPE: PRT
<213> ORGANISM: Homo sapiens

<400> SEQUENCE: 28

Met Cys Pro Ala Arg Ser Leu Leu Val Ala Thr Leu Val Leu Leu
1               5                   10                  15

Asp His Leu Ser Leu Ala
            20

<210> SEQ ID NO 29
<211> LENGTH: 22
<212> TYPE: PRT
<213> ORGANISM: Mus sp.

<400> SEQUENCE: 29

Met Cys Pro Gln Lys Leu Thr Ile Ser Trp Phe Ala Ile Val Leu Leu
1               5                   10                  15

Val Ser Pro Leu Met Ala
            20

<210> SEQ ID NO 30
<211> LENGTH: 23
<212> TYPE: PRT
<213> ORGANISM: Homo sapiens

<400> SEQUENCE: 30

Met Cys His Gln Gln Leu Val Ile Ser Trp Phe Ser Leu Val Phe Leu
1               5                   10                  15

Ala Ser Pro Leu Val Ala Ile
            20

<210> SEQ ID NO 31
<211> LENGTH: 784
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 31

Met Cys Pro Gln Lys Leu Thr Ile Ser Trp Phe Ala Ile Val Leu Leu
1               5                   10                  15

Val Ser Pro Leu Met Ala Met Trp Glu Leu Glu Lys Asp Val Tyr Val
            20                  25                  30

Val Glu Val Asp Trp Thr Pro Asp Ala Pro Gly Glu Thr Val Asn Leu
        35                  40                  45

Thr Cys Asp Thr Pro Glu Glu Asp Asp Ile Thr Trp Thr Ser Asp Gln
    50                  55                  60

Arg His Gly Val Ile Gly Ser Gly Lys Thr Leu Thr Ile Thr Val Lys
65                  70                  75                  80

Glu Phe Leu Asp Ala Gly Gln Tyr Thr Cys His Lys Gly Gly Glu Thr
                85                  90                  95

Leu Ser His Ser His Leu Leu Leu His Lys Lys Glu Asn Gly Ile Trp
            100                 105                 110

Ser Thr Glu Ile Leu Lys Asn Phe Lys Asn Lys Thr Phe Leu Lys Cys
        115                 120                 125

Glu Ala Pro Asn Tyr Ser Gly Arg Phe Thr Cys Ser Trp Leu Val Gln
    130                 135                 140
```

```
Arg Asn Met Asp Leu Lys Phe Asn Ile Lys Ser Ser Ser Ser Ser Pro
145                 150                 155                 160

Asp Ser Arg Ala Val Thr Cys Gly Met Ala Ser Leu Ser Ala Glu Lys
                165                 170                 175

Val Thr Leu Asp Gln Arg Asp Tyr Glu Lys Tyr Ser Val Ser Cys Gln
            180                 185                 190

Glu Asp Val Thr Cys Pro Thr Ala Glu Glu Thr Leu Pro Ile Glu Leu
        195                 200                 205

Ala Leu Glu Ala Arg Gln Gln Asn Lys Tyr Glu Asn Tyr Ser Thr Ser
    210                 215                 220

Phe Phe Ile Arg Asp Ile Ile Lys Pro Asp Pro Lys Asn Leu Gln
225                 230                 235                 240

Met Lys Pro Leu Lys Asn Ser Gln Val Glu Val Ser Trp Glu Tyr Pro
                245                 250                 255

Asp Ser Trp Ser Thr Pro His Ser Tyr Phe Ser Leu Lys Phe Phe Val
            260                 265                 270

Arg Ile Gln Arg Lys Lys Glu Lys Met Lys Glu Thr Glu Glu Gly Cys
        275                 280                 285

Asn Gln Lys Gly Ala Phe Leu Val Glu Lys Thr Ser Thr Glu Val Gln
    290                 295                 300

Cys Lys Gly Gly Asn Val Cys Val Gln Ala Gln Asp Arg Tyr Tyr Asn
305                 310                 315                 320

Ser Ser Cys Ser Lys Trp Ala Cys Val Pro Cys Arg Val Arg Ser Gly
                325                 330                 335

Gly Gly Gly Ser Gly Gly Gly Ser Gly Gly Gly Ser Arg Val
            340                 345                 350

Ile Pro Val Ser Gly Pro Ala Arg Cys Leu Ser Gln Ser Arg Asn Leu
        355                 360                 365

Leu Lys Thr Thr Asp Asp Met Val Lys Thr Ala Arg Glu Lys Leu Lys
    370                 375                 380

His Tyr Ser Cys Thr Ala Glu Asp Ile Asp His Glu Asp Ile Thr Arg
385                 390                 395                 400

Asp Gln Thr Ser Thr Leu Lys Thr Cys Leu Pro Leu Glu Leu His Lys
                405                 410                 415

Asn Glu Ser Cys Leu Ala Thr Arg Glu Thr Ser Ser Thr Thr Arg Gly
            420                 425                 430

Ser Cys Leu Pro Pro Gln Lys Thr Ser Leu Met Met Thr Leu Cys Leu
        435                 440                 445

Gly Ser Ile Tyr Glu Asp Leu Lys Met Tyr Gln Thr Glu Phe Gln Ala
    450                 455                 460

Ile Asn Ala Ala Leu Gln Asn His Asn His Gln Gln Ile Ile Leu Asp
465                 470                 475                 480

Lys Gly Met Leu Val Ala Ile Asp Glu Leu Met Gln Ser Leu Asn His
                485                 490                 495

Asn Gly Glu Thr Leu Arg Gln Lys Pro Pro Val Gly Glu Ala Asp Pro
            500                 505                 510

Tyr Arg Val Lys Met Lys Leu Cys Ile Leu Leu His Ala Phe Ser Thr
        515                 520                 525

Arg Val Val Thr Ile Asn Arg Val Met Gly Tyr Leu Ser Ser Ala Gly
    530                 535                 540

Gly Gly Gly Ser Gly Gly Gly Ser Gly Gly Gly Ser Asp Lys
545                 550                 555                 560

Thr His Thr Cys Pro Pro Cys Pro Ala Pro Glu Leu Leu Gly Gly Pro
```

```
                565                 570                 575
Ser Val Phe Leu Phe Pro Pro Lys Pro Lys Asp Gln Leu Met Ile Ser
            580                 585                 590

Arg Thr Pro Glu Val Thr Cys Val Val Val Asp Val Ser His Glu Asp
            595                 600                 605

Pro Glu Val Lys Phe Asn Trp Tyr Val Asp Gly Val Glu Val His Asn
            610                 615                 620

Ala Lys Thr Lys Pro Arg Glu Glu Gln Tyr Asn Ser Thr Tyr Arg Val
625                 630                 635                 640

Val Ser Val Leu Thr Val Leu His Gln Asp Trp Leu Asn Gly Lys Glu
            645                 650                 655

Tyr Lys Cys Lys Val Ser Asn Lys Ala Leu Pro Ala Pro Ile Glu Lys
            660                 665                 670

Thr Ile Ser Lys Ala Lys Gly Gln Pro Arg Glu Pro Gln Val Tyr Thr
            675                 680                 685

Leu Pro Pro Ser Arg Asp Glu Leu Thr Lys Asn Gln Val Ser Leu Thr
            690                 695                 700

Cys Leu Val Lys Gly Phe Tyr Pro Ser Asp Ile Ala Val Glu Trp Glu
705                 710                 715                 720

Ser Asn Gly Gln Pro Glu Asn Asn Tyr Lys Thr Thr Pro Pro Val Leu
            725                 730                 735

Asp Ser Asp Gly Ser Phe Leu Tyr Ser Lys Leu Thr Val Asp Lys Ser
            740                 745                 750

Arg Trp Gln Gln Gly Asn Val Phe Ser Cys Ser Val Leu His Glu Ala
            755                 760                 765

Leu His Asn His Tyr Thr Gln Lys Ser Leu Ser Leu Ser Pro Gly Lys
            770                 775                 780

<210> SEQ ID NO 32
<211> LENGTH: 781
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 32

Met Cys His Gln Gln Leu Val Ile Ser Trp Phe Ser Leu Val Phe Leu
1               5                   10                  15

Ala Ser Pro Leu Val Ala Ile Trp Glu Leu Lys Lys Asp Val Tyr Val
            20                  25                  30

Val Glu Leu Asp Trp Tyr Pro Asp Ala Pro Gly Glu Met Val Val Leu
            35                  40                  45

Thr Cys Asp Thr Pro Glu Glu Asp Gly Ile Thr Trp Thr Leu Asp Gln
        50                  55                  60

Ser Ser Glu Val Leu Gly Ser Gly Lys Thr Leu Thr Ile Gln Val Lys
65                  70                  75                  80

Glu Phe Gly Asp Ala Gly Gln Tyr Thr Cys His Lys Gly Gly Glu Val
                85                  90                  95

Leu Ser His Ser Leu Leu Leu Leu His Lys Lys Glu Asp Gly Ile Trp
            100                 105                 110

Ser Thr Asp Ile Leu Lys Asp Gln Lys Glu Pro Lys Asn Lys Thr Phe
        115                 120                 125

Leu Arg Cys Glu Ala Lys Asn Tyr Ser Gly Arg Phe Thr Cys Trp Trp
    130                 135                 140
```

```
Leu Thr Thr Ile Ser Thr Asp Leu Thr Phe Ser Val Lys Ser Ser Arg
145                 150                 155                 160

Gly Ser Ser Asp Pro Gln Gly Val Thr Cys Gly Ala Ala Thr Leu Ser
                165                 170                 175

Ala Glu Arg Val Arg Gly Asp Asn Lys Glu Tyr Glu Tyr Ser Val Glu
            180                 185                 190

Cys Gln Glu Asp Ser Ala Cys Pro Ala Ala Glu Glu Ser Leu Pro Ile
            195                 200                 205

Glu Val Met Val Asp Ala Val His Lys Leu Lys Tyr Glu Asn Tyr Thr
            210                 215                 220

Ser Ser Phe Phe Ile Arg Asp Ile Ile Lys Pro Asp Pro Lys Asn
225                 230                 235                 240

Leu Gln Leu Lys Pro Leu Lys Asn Ser Arg Gln Val Glu Val Ser Trp
                245                 250                 255

Glu Tyr Pro Asp Thr Trp Ser Thr Pro His Ser Tyr Phe Ser Leu Thr
                260                 265                 270

Phe Cys Val Gln Val Gln Gly Lys Ser Lys Arg Glu Lys Lys Asp Arg
            275                 280                 285

Val Phe Thr Asp Lys Thr Ser Ala Thr Val Ile Cys Arg Lys Asn Ala
            290                 295                 300

Ser Ile Ser Val Arg Ala Gln Asp Arg Tyr Tyr Ser Ser Ser Trp Ser
305                 310                 315                 320

Glu Trp Ala Ser Val Pro Cys Ser Gly Gly Gly Ser Gly Gly
                325                 330                 335

Gly Ser Gly Gly Gly Ser Arg Asn Leu Pro Val Ala Thr Pro Asp
            340                 345                 350

Pro Gly Met Phe Pro Cys Leu His His Ser Gln Asn Leu Leu Arg Ala
            355                 360                 365

Val Ser Asn Met Leu Gln Lys Ala Arg Gln Thr Leu Glu Phe Tyr Pro
            370                 375                 380

Cys Thr Ser Glu Glu Ile Asp His Glu Asp Ile Thr Lys Asp Lys Thr
385                 390                 395                 400

Ser Thr Val Glu Ala Cys Leu Pro Leu Glu Leu Thr Lys Asn Glu Ser
                405                 410                 415

Cys Leu Asn Ser Arg Glu Thr Ser Phe Ile Thr Asn Gly Ser Cys Leu
            420                 425                 430

Ala Ser Arg Lys Thr Ser Phe Met Met Ala Leu Cys Leu Ser Ser Ile
            435                 440                 445

Tyr Glu Asp Leu Lys Met Tyr Gln Val Glu Phe Lys Thr Met Asn Ala
450                 455                 460

Lys Leu Leu Met Asp Pro Lys Arg Gln Ile Phe Leu Asp Gln Asn Met
465                 470                 475                 480

Leu Ala Val Ile Asp Glu Leu Met Gln Ala Leu Asn Phe Asn Ser Glu
                485                 490                 495

Thr Val Pro Gln Lys Ser Ser Leu Glu Glu Pro Asp Phe Tyr Lys Thr
                500                 505                 510

Lys Ile Lys Leu Cys Ile Leu Leu His Ala Phe Arg Ile Arg Ala Val
                515                 520                 525

Thr Ile Asp Arg Val Met Ser Tyr Leu Asn Ala Ser Gly Gly Gly
            530                 535                 540

Ser Gly Gly Gly Ser Gly Gly Gly Ser Asp Lys Thr His Thr
545                 550                 555                 560

Cys Pro Pro Cys Pro Ala Pro Glu Leu Leu Gly Gly Pro Ser Val Phe
```

Leu Phe Pro Pro Lys Pro Lys Asp Gln Leu Met Ile Ser Arg Thr Pro
              565                 570                 575
                    580                 585                 590

Glu Val Thr Cys Val Val Val Asp Val Ser His Glu Asp Pro Glu Val
                    595                 600                 605

Lys Phe Asn Trp Tyr Val Asp Gly Val Glu Val His Asn Ala Lys Thr
                    610                 615                 620

Lys Pro Arg Glu Glu Gln Tyr Asn Ser Thr Tyr Arg Val Val Ser Val
625                 630                 635                 640

Leu Thr Val Leu His Gln Asp Trp Leu Asn Gly Lys Glu Tyr Lys Cys
                    645                 650                 655

Lys Val Ser Asn Lys Ala Leu Pro Ala Pro Ile Glu Lys Thr Ile Ser
                    660                 665                 670

Lys Ala Lys Gly Gln Pro Arg Glu Pro Gln Val Tyr Thr Leu Pro Pro
                    675                 680                 685

Ser Arg Asp Glu Leu Thr Lys Asn Gln Val Ser Leu Thr Cys Leu Val
                    690                 695                 700

Lys Gly Phe Tyr Pro Ser Asp Ile Ala Val Glu Trp Glu Ser Asn Gly
705                 710                 715                 720

Gln Pro Glu Asn Asn Tyr Lys Thr Thr Pro Pro Val Leu Asp Ser Asp
                    725                 730                 735

Gly Ser Phe Leu Tyr Ser Lys Leu Thr Val Asp Lys Ser Arg Trp Gln
                    740                 745                 750

Gln Gly Asn Val Phe Ser Cys Ser Val Leu His Glu Ala Leu His Asn
                    755                 760                 765

His Tyr Thr Gln Lys Ser Leu Ser Leu Ser Pro Gly Lys
                    770                 775                 780

<210> SEQ ID NO 33
<211> LENGTH: 577
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 33

Met Cys Pro Gln Lys Leu Thr Ile Ser Trp Phe Ala Ile Val Leu Leu
1               5                   10                  15

Val Ser Pro Leu Met Ala Met Trp Glu Leu Glu Lys Asp Val Tyr Val
                20                  25                  30

Val Glu Val Asp Trp Thr Pro Asp Ala Pro Gly Glu Thr Val Asn Leu
            35                  40                  45

Thr Cys Asp Thr Pro Glu Glu Asp Asp Ile Thr Trp Thr Ser Asp Gln
        50                  55                  60

Arg His Gly Val Ile Gly Ser Gly Lys Thr Leu Thr Ile Thr Val Lys
65                  70                  75                  80

Glu Phe Leu Asp Ala Gly Gln Tyr Thr Cys His Lys Gly Gly Glu Thr
                85                  90                  95

Leu Ser His Ser His Leu Leu Leu His Lys Lys Glu Asn Gly Ile Trp
            100                 105                 110

Ser Thr Glu Ile Leu Lys Asn Phe Lys Asn Lys Thr Phe Leu Lys Cys
        115                 120                 125

Glu Ala Pro Asn Tyr Ser Gly Arg Phe Thr Cys Ser Trp Leu Val Gln
    130                 135                 140

```
Arg Asn Met Asp Leu Lys Phe Asn Ile Lys Ser Ser Ser Ser Ser Pro
145                 150                 155                 160

Asp Ser Arg Ala Val Thr Cys Gly Met Ala Ser Leu Ser Ala Glu Lys
            165                 170                 175

Val Thr Leu Asp Gln Arg Asp Tyr Glu Lys Tyr Ser Val Ser Cys Gln
        180                 185                 190

Glu Asp Val Thr Cys Pro Thr Ala Glu Glu Thr Leu Pro Ile Glu Leu
    195                 200                 205

Ala Leu Glu Ala Arg Gln Gln Asn Lys Tyr Glu Asn Tyr Ser Thr Ser
210                 215                 220

Phe Phe Ile Arg Asp Ile Ile Lys Pro Asp Pro Lys Asn Leu Gln
225                 230                 235                 240

Met Lys Pro Leu Lys Asn Ser Gln Val Glu Val Ser Trp Glu Tyr Pro
            245                 250                 255

Asp Ser Trp Ser Thr Pro His Ser Tyr Phe Ser Leu Lys Phe Phe Val
            260                 265                 270

Arg Ile Gln Arg Lys Lys Glu Lys Met Lys Glu Thr Glu Glu Gly Cys
        275                 280                 285

Asn Gln Lys Gly Ala Phe Leu Val Glu Lys Thr Ser Thr Glu Val Gln
290                 295                 300

Cys Lys Gly Gly Asn Val Cys Val Gln Ala Gln Asp Arg Tyr Tyr Asn
305                 310                 315                 320

Ser Ser Cys Ser Lys Trp Ala Cys Val Pro Cys Arg Val Arg Ser Gly
            325                 330                 335

Gly Gly Gly Ser Gly Gly Gly Gly Ser Gly Gly Gly Gly Ser Asp Lys
            340                 345                 350

Thr His Thr Cys Pro Pro Cys Pro Ala Pro Glu Leu Leu Gly Gly Pro
            355                 360                 365

Ser Val Phe Leu Phe Pro Pro Lys Pro Lys Asp Thr Leu Met Ile Ser
    370                 375                 380

Arg Thr Pro Glu Val Thr Cys Val Val Val Asp Val Ser His Glu Asp
385                 390                 395                 400

Pro Glu Val Lys Phe Asn Trp Tyr Val Asp Gly Val Glu Val His Asn
                405                 410                 415

Ala Lys Thr Lys Pro Arg Glu Glu Gln Tyr Asn Ser Thr Tyr Arg Val
        420                 425                 430

Val Ser Val Leu Thr Val Leu His Gln Asp Trp Leu Asn Gly Lys Glu
            435                 440                 445

Tyr Lys Cys Lys Val Ser Asn Lys Ala Leu Pro Ala Pro Ile Glu Lys
450                 455                 460

Thr Ile Ser Lys Ala Lys Gly Gln Pro Arg Glu Pro Gln Val Tyr Thr
465                 470                 475                 480

Leu Pro Pro Cys Arg Asp Glu Leu Thr Lys Asn Gln Val Ser Leu Trp
            485                 490                 495

Cys Leu Val Lys Gly Phe Tyr Pro Ser Asp Ile Ala Val Glu Trp Glu
            500                 505                 510

Ser Asn Gly Gln Pro Glu Asn Asn Tyr Lys Thr Thr Pro Pro Val Leu
            515                 520                 525

Asp Ser Asp Gly Ser Phe Phe Leu Tyr Ser Lys Leu Thr Val Asp Lys
            530                 535                 540

Ser Arg Trp Gln Gln Gly Asn Val Phe Ser Cys Ser Val Met His Glu
545                 550                 555                 560

Ala Leu His Asn His Tyr Thr Gln Lys Ser Leu Ser Leu Ser Pro Gly
```

Lys                 565             570             575

<210> SEQ ID NO 34
<211> LENGTH: 570
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 34

Met Cys His Gln Gln Leu Val Ile Ser Trp Phe Ser Leu Val Phe Leu
1               5                   10                  15

Ala Ser Pro Leu Val Ala Ile Trp Glu Leu Lys Lys Asp Val Tyr Val
            20                  25                  30

Val Glu Leu Asp Trp Tyr Pro Asp Ala Pro Gly Glu Met Val Val Leu
        35                  40                  45

Thr Cys Asp Thr Pro Glu Glu Asp Gly Ile Thr Trp Thr Leu Asp Gln
    50                  55                  60

Ser Ser Glu Val Leu Gly Ser Gly Lys Thr Leu Thr Ile Gln Val Lys
65                  70                  75                  80

Glu Phe Gly Asp Ala Gly Gln Tyr Thr Cys His Lys Gly Gly Glu Val
                85                  90                  95

Leu Ser His Ser Leu Leu Leu Leu His Lys Lys Glu Asp Gly Ile Trp
            100                 105                 110

Ser Thr Asp Ile Leu Lys Asp Gln Lys Glu Pro Lys Asn Lys Thr Phe
        115                 120                 125

Leu Arg Cys Glu Ala Lys Asn Tyr Ser Gly Arg Phe Thr Cys Trp Trp
    130                 135                 140

Leu Thr Thr Ile Ser Thr Asp Leu Thr Phe Ser Val Lys Ser Ser Arg
145                 150                 155                 160

Gly Ser Ser Asp Pro Gln Gly Val Thr Cys Gly Ala Ala Thr Leu Ser
                165                 170                 175

Ala Glu Arg Val Arg Gly Asp Asn Lys Glu Tyr Glu Tyr Ser Val Glu
            180                 185                 190

Cys Gln Glu Asp Ser Ala Cys Pro Ala Ala Glu Glu Ser Leu Pro Ile
        195                 200                 205

Glu Val Met Val Asp Ala Val His Lys Leu Lys Tyr Glu Asn Tyr Thr
    210                 215                 220

Ser Ser Phe Phe Ile Arg Asp Ile Ile Lys Pro Asp Pro Pro Lys Asn
225                 230                 235                 240

Leu Gln Leu Lys Pro Leu Lys Asn Ser Arg Gln Val Glu Val Ser Trp
                245                 250                 255

Glu Tyr Pro Asp Thr Trp Ser Thr Pro His Ser Tyr Phe Ser Leu Thr
            260                 265                 270

Phe Cys Val Gln Val Gln Gly Lys Ser Lys Arg Glu Lys Lys Asp Arg
        275                 280                 285

Val Phe Thr Asp Lys Thr Ser Ala Thr Val Ile Cys Arg Lys Asn Ala
    290                 295                 300

Ser Ile Ser Val Arg Ala Gln Asp Arg Tyr Tyr Ser Ser Ser Trp Ser
305                 310                 315                 320

Glu Trp Ala Ser Val Pro Cys Ser Gly Gly Gly Ser Gly Gly Gly
                325                 330                 335

Gly Ser Gly Gly Gly Gly Ser Asp Lys Thr His Thr Cys Pro Pro Cys

```
                340             345             350
Pro Ala Pro Glu Leu Leu Gly Gly Pro Ser Val Phe Leu Phe Pro Pro
            355                 360                 365
Lys Pro Lys Asp Thr Leu Met Ile Ser Arg Thr Pro Glu Val Thr Cys
        370                 375                 380
Val Val Val Asp Val Ser His Glu Asp Pro Glu Val Lys Phe Asn Trp
385                 390                 395                 400
Tyr Val Asp Gly Val Glu Val His Asn Ala Lys Thr Lys Pro Arg Glu
                405                 410                 415
Glu Gln Tyr Asn Ser Thr Tyr Arg Val Val Ser Val Leu Thr Val Leu
            420                 425                 430
His Gln Asp Trp Leu Asn Gly Lys Glu Tyr Lys Cys Lys Val Ser Asn
        435                 440                 445
Lys Ala Leu Pro Ala Pro Ile Glu Lys Thr Ile Ser Lys Ala Lys Gly
        450                 455                 460
Gln Pro Arg Glu Pro Gln Val Tyr Thr Leu Pro Pro Cys Arg Asp Glu
465                 470                 475                 480
Leu Thr Lys Asn Gln Val Ser Leu Trp Cys Leu Val Lys Gly Phe Tyr
                485                 490                 495
Pro Ser Asp Ile Ala Val Glu Trp Glu Ser Asn Gly Gln Pro Glu Asn
            500                 505                 510
Asn Tyr Lys Thr Thr Pro Pro Val Leu Asp Ser Asp Gly Ser Phe Phe
        515                 520                 525
Leu Tyr Ser Lys Leu Thr Val Asp Lys Ser Arg Trp Gln Gln Gly Asn
        530                 535                 540
Val Phe Ser Cys Ser Val Met His Glu Ala Leu His Asn His Tyr Thr
545                 550                 555                 560
Gln Lys Ser Leu Ser Leu Ser Pro Gly Lys
                565                 570

<210> SEQ ID NO 35
<211> LENGTH: 457
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 35

Met Cys Gln Ser Arg Tyr Leu Leu Phe Leu Ala Thr Leu Ala Leu Leu
1               5                   10                  15
Asn His Leu Ser Leu Ala Arg Val Ile Pro Val Ser Gly Pro Ala Arg
            20                  25                  30
Cys Leu Ser Gln Ser Arg Asn Leu Leu Lys Thr Thr Asp Asp Met Val
        35                  40                  45
Lys Thr Ala Arg Glu Lys Leu Lys His Tyr Ser Cys Thr Ala Glu Asp
    50                  55                  60
Ile Asp His Glu Asp Ile Thr Arg Asp Gln Thr Ser Thr Leu Lys Thr
65                  70                  75                  80
Cys Leu Pro Leu Glu Leu His Lys Asn Glu Ser Cys Leu Ala Thr Arg
                85                  90                  95
Glu Thr Ser Ser Thr Thr Arg Gly Ser Cys Leu Pro Pro Gln Lys Thr
            100                 105                 110
Ser Leu Met Met Thr Leu Cys Leu Gly Ser Ile Tyr Glu Asp Leu Lys
        115                 120                 125
```

Met Tyr Gln Thr Glu Phe Gln Ala Ile Asn Ala Ala Leu Gln Asn His
130                 135                 140

Asn His Gln Gln Ile Ile Leu Asp Lys Gly Met Leu Val Ala Ile Asp
145                 150                 155                 160

Glu Leu Met Gln Ser Leu Asn His Asn Gly Glu Thr Leu Arg Gln Lys
                165                 170                 175

Pro Pro Val Gly Glu Ala Asp Pro Tyr Arg Val Lys Met Lys Leu Cys
            180                 185                 190

Ile Leu Leu His Ala Phe Ser Thr Arg Val Val Thr Ile Asn Arg Val
        195                 200                 205

Met Gly Tyr Leu Ser Ser Ala Gly Gly Gly Ser Gly Gly Gly Gly
210                 215                 220

Ser Gly Gly Gly Gly Ser Asp Lys Thr His Thr Cys Pro Pro Cys Pro
225                 230                 235                 240

Ala Pro Glu Leu Leu Gly Gly Pro Ser Val Phe Leu Phe Pro Pro Lys
                245                 250                 255

Pro Lys Asp Thr Leu Met Ile Ser Arg Thr Pro Glu Val Thr Cys Val
            260                 265                 270

Val Val Asp Val Ser His Glu Asp Pro Glu Val Lys Phe Asn Trp Tyr
        275                 280                 285

Val Asp Gly Val Glu Val His Asn Ala Lys Thr Lys Pro Arg Glu Glu
290                 295                 300

Gln Tyr Asn Ser Thr Tyr Arg Val Val Ser Val Leu Thr Val Leu His
305                 310                 315                 320

Gln Asp Trp Leu Asn Gly Lys Glu Tyr Lys Cys Lys Val Ser Asn Lys
                325                 330                 335

Ala Leu Pro Ala Pro Ile Glu Lys Thr Ile Ser Lys Ala Lys Gly Gln
            340                 345                 350

Pro Arg Glu Pro Gln Val Cys Thr Leu Pro Pro Ser Arg Asp Glu Leu
        355                 360                 365

Thr Lys Asn Gln Val Ser Leu Ser Cys Ala Val Lys Gly Phe Tyr Pro
370                 375                 380

Ser Asp Ile Ala Val Glu Trp Glu Ser Asn Gly Gln Pro Glu Asn Asn
385                 390                 395                 400

Tyr Lys Thr Thr Pro Pro Val Leu Asp Ser Asp Gly Ser Phe Phe Leu
                405                 410                 415

Val Ser Lys Leu Thr Val Asp Lys Ser Arg Trp Gln Gln Gly Asn Val
            420                 425                 430

Phe Ser Cys Ser Val Met His Glu Ala Leu His Asn His Tyr Thr Gln
        435                 440                 445

Lys Ser Leu Ser Leu Ser Pro Gly Lys
450                 455

<210> SEQ ID NO 36
<211> LENGTH: 461
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 36

Met Cys Pro Ala Arg Ser Leu Leu Leu Val Ala Thr Leu Val Leu Leu
1               5                   10                  15

Asp His Leu Ser Leu Ala Arg Asn Leu Pro Val Ala Thr Pro Asp Pro
            20                  25                  30

```
Gly Met Phe Pro Cys Leu His His Ser Gln Asn Leu Leu Arg Ala Val
        35                  40                  45

Ser Asn Met Leu Gln Lys Ala Arg Gln Thr Leu Glu Phe Tyr Pro Cys
50                      55                  60

Thr Ser Glu Glu Ile Asp His Glu Asp Ile Thr Lys Asp Lys Thr Ser
65                  70                  75                  80

Thr Val Glu Ala Cys Leu Pro Leu Glu Leu Thr Lys Asn Glu Ser Cys
                85                  90                  95

Leu Asn Ser Arg Glu Thr Ser Phe Ile Thr Asn Gly Ser Cys Leu Ala
                100                 105                 110

Ser Arg Lys Thr Ser Phe Met Met Ala Leu Cys Leu Ser Ser Ile Tyr
            115                 120                 125

Glu Asp Leu Lys Met Tyr Gln Val Glu Phe Lys Thr Met Asn Ala Lys
        130                 135                 140

Leu Leu Met Asp Pro Lys Arg Gln Ile Phe Leu Asp Gln Asn Met Leu
145                 150                 155                 160

Ala Val Ile Asp Glu Leu Met Gln Ala Leu Asn Phe Asn Ser Glu Thr
                165                 170                 175

Val Pro Gln Lys Ser Ser Leu Glu Glu Pro Asp Phe Tyr Lys Thr Lys
                180                 185                 190

Ile Lys Leu Cys Ile Leu Leu His Ala Phe Arg Ile Arg Ala Val Thr
            195                 200                 205

Ile Asp Arg Val Met Ser Tyr Leu Asn Ala Ser Gly Gly Gly Gly Ser
        210                 215                 220

Gly Gly Gly Gly Ser Gly Gly Gly Ser Asp Lys Thr His Thr Cys
225                 230                 235                 240

Pro Pro Cys Pro Ala Pro Glu Leu Leu Gly Gly Pro Ser Val Phe Leu
                245                 250                 255

Phe Pro Pro Lys Pro Lys Asp Thr Leu Met Ile Ser Arg Thr Pro Glu
                260                 265                 270

Val Thr Cys Val Val Val Asp Val Ser His Glu Asp Pro Glu Val Lys
            275                 280                 285

Phe Asn Trp Tyr Val Asp Gly Val Glu Val His Asn Ala Lys Thr Lys
        290                 295                 300

Pro Arg Glu Glu Gln Tyr Asn Ser Thr Tyr Arg Val Val Ser Val Leu
305                 310                 315                 320

Thr Val Leu His Gln Asp Trp Leu Asn Gly Lys Glu Tyr Lys Cys Lys
                325                 330                 335

Val Ser Asn Lys Ala Leu Pro Ala Pro Ile Glu Lys Thr Ile Ser Lys
                340                 345                 350

Ala Lys Gly Gln Pro Arg Glu Pro Gln Val Cys Thr Leu Pro Pro Ser
            355                 360                 365

Arg Asp Glu Leu Thr Lys Asn Gln Val Ser Leu Ser Cys Ala Val Lys
        370                 375                 380

Gly Phe Tyr Pro Ser Asp Ile Ala Val Glu Trp Glu Ser Asn Gly Gln
385                 390                 395                 400

Pro Glu Asn Asn Tyr Lys Thr Thr Pro Pro Val Leu Asp Ser Asp Gly
                405                 410                 415

Ser Phe Phe Leu Val Ser Lys Leu Thr Val Asp Lys Ser Arg Trp Gln
                420                 425                 430

Gln Gly Asn Val Phe Ser Cys Ser Val Met His Glu Ala Leu His Asn
            435                 440                 445
```

His Tyr Thr Gln Lys Ser Ser Leu Ser Pro Gly Lys
    450                 455                 460

<210> SEQ ID NO 37
<211> LENGTH: 1041
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 37

Met Asp Met Met Gly Leu Ala Gly Thr Ser Lys His Ile Thr Phe Leu
1               5                   10                  15

Leu Leu Cys Gln Leu Gly Ala Ser Gly Pro Asp Gly Cys Cys Val
                20                  25                  30

Glu Lys Thr Ser Phe Pro Glu Gly Ala Ser Gly Ser Pro Leu Gly Pro
            35                  40                  45

Arg Asn Leu Ser Cys Tyr Arg Val Ser Lys Thr Asp Tyr Glu Cys Ser
        50                  55                  60

Trp Gln Tyr Asp Gly Pro Glu Asp Asn Val Ser His Val Leu Trp Cys
65                  70                  75                  80

Cys Phe Val Pro Pro Asn His Thr His Thr Gly Gln Glu Arg Cys Arg
                85                  90                  95

Tyr Phe Ser Ser Gly Pro Asp Arg Thr Val Gln Phe Trp Glu Gln Asp
            100                 105                 110

Gly Ile Pro Val Leu Ser Lys Val Asn Phe Trp Val Glu Ser Arg Leu
        115                 120                 125

Gly Asn Arg Thr Met Lys Ser Gln Lys Ile Ser Gln Tyr Leu Tyr Asn
    130                 135                 140

Trp Thr Lys Thr Thr Pro Pro Leu Gly His Ile Lys Val Ser Gln Ser
145                 150                 155                 160

His Arg Gln Leu Arg Met Asp Trp Asn Val Ser Glu Glu Ala Gly Ala
                165                 170                 175

Glu Val Gln Phe Arg Arg Arg Met Pro Thr Thr Asn Trp Thr Leu Gly
            180                 185                 190

Asp Cys Gly Pro Gln Val Asn Ser Gly Ser Gly Val Leu Gly Asp Ile
        195                 200                 205

Arg Gly Ser Met Ser Glu Ser Cys Leu Cys Pro Ser Glu Asn Met Ala
    210                 215                 220

Gln Glu Ile Gln Ile Arg Arg Arg Arg Leu Ser Ser Gly Ala Pro
225                 230                 235                 240

Gly Gly Pro Trp Ser Asp Trp Ser Met Pro Val Cys Val Pro Pro Glu
                245                 250                 255

Val Leu Pro Gly Gly Gly Ser Gly Arg Ser Glu Asn Ile Arg
            260                 265                 270

Thr Ala Gly Gly Gly Ser Met Trp Glu Leu Glu Lys Asp Val Tyr
        275                 280                 285

Val Val Glu Val Asp Trp Thr Pro Asp Ala Pro Gly Glu Thr Val Asn
    290                 295                 300

Leu Thr Cys Asp Thr Pro Glu Glu Asp Ile Thr Trp Thr Ser Asp
305                 310                 315                 320

Gln Arg His Gly Val Ile Gly Ser Gly Lys Thr Leu Thr Ile Thr Val
                325                 330                 335

Lys Glu Phe Leu Asp Ala Gly Gln Tyr Thr Cys His Lys Gly Gly Glu
            340                 345                 350

```
Thr Leu Ser His Ser His Leu Leu His Lys Lys Glu Asn Gly Ile
        355                 360                 365

Trp Ser Thr Glu Ile Leu Lys Asn Phe Lys Asn Lys Thr Phe Leu Lys
    370                 375                 380

Cys Glu Ala Pro Asn Tyr Ser Gly Arg Phe Thr Cys Ser Trp Leu Val
385                 390                 395                 400

Gln Arg Asn Met Asp Leu Lys Phe Asn Ile Lys Ser Ser Ser Ser Ser
                405                 410                 415

Pro Asp Ser Arg Ala Val Thr Cys Gly Met Ala Ser Leu Ser Ala Glu
                420                 425                 430

Lys Val Thr Leu Asp Gln Arg Asp Tyr Glu Lys Tyr Ser Val Ser Cys
        435                 440                 445

Gln Glu Asp Val Thr Cys Pro Thr Ala Glu Glu Thr Leu Pro Ile Glu
    450                 455                 460

Leu Ala Leu Glu Ala Arg Gln Gln Asn Lys Tyr Glu Asn Tyr Ser Thr
465                 470                 475                 480

Ser Phe Phe Ile Arg Asp Ile Ile Lys Pro Asp Pro Lys Asn Leu
                485                 490                 495

Gln Met Lys Pro Leu Lys Asn Ser Gln Val Glu Val Ser Trp Glu Tyr
            500                 505                 510

Pro Asp Ser Trp Ser Thr Pro His Ser Tyr Phe Ser Leu Lys Phe Phe
            515                 520                 525

Val Arg Ile Gln Arg Lys Lys Glu Lys Met Lys Glu Thr Glu Glu Gly
        530                 535                 540

Cys Asn Gln Lys Gly Ala Phe Leu Val Glu Lys Thr Ser Thr Glu Val
545                 550                 555                 560

Gln Cys Lys Gly Gly Asn Val Cys Val Gln Ala Gln Asp Arg Tyr Tyr
                565                 570                 575

Asn Ser Ser Cys Ser Lys Trp Ala Cys Val Pro Cys Arg Val Arg Ser
                580                 585                 590

Gly Gly Gly Gly Ser Gly Gly Gly Gly Ser Gly Gly Gly Gly Ser Arg
        595                 600                 605

Val Ile Pro Val Ser Gly Pro Ala Arg Cys Leu Ser Gln Ser Arg Asn
        610                 615                 620

Leu Leu Lys Thr Thr Asp Asp Met Val Lys Thr Ala Arg Glu Lys Leu
625                 630                 635                 640

Lys His Tyr Ser Cys Thr Ala Glu Asp Ile Asp His Glu Asp Ile Thr
                645                 650                 655

Arg Asp Gln Thr Ser Thr Leu Lys Thr Cys Leu Pro Leu Glu Leu His
                660                 665                 670

Lys Asn Glu Ser Cys Leu Ala Thr Arg Glu Thr Ser Ser Thr Thr Arg
                675                 680                 685

Gly Ser Cys Leu Pro Pro Gln Lys Thr Ser Leu Met Met Thr Leu Cys
    690                 695                 700

Leu Gly Ser Ile Tyr Glu Asp Leu Lys Met Tyr Gln Thr Glu Phe Gln
705                 710                 715                 720

Ala Ile Asn Ala Ala Leu Gln Asn His Asn His Gln Ile Ile Leu
                725                 730                 735

Asp Lys Gly Met Leu Val Ala Ile Asp Glu Leu Met Gln Ser Leu Asn
            740                 745                 750

His Asn Gly Glu Thr Leu Arg Gln Lys Pro Pro Val Gly Glu Ala Asp
        755                 760                 765
```

```
Pro Tyr Arg Val Lys Met Lys Leu Cys Ile Leu Leu His Ala Phe Ser
    770             775                 780

Thr Arg Val Val Thr Ile Asn Arg Val Met Gly Tyr Leu Ser Ser Ala
785             790                 795                 800

Gly Gly Gly Gly Ser Gly Gly Gly Ser Gly Gly Gly Gly Ser Asp
            805             810                 815

Lys Thr His Thr Cys Pro Pro Cys Pro Ala Pro Glu Leu Leu Gly Gly
            820             825                 830

Pro Ser Val Phe Leu Phe Pro Pro Lys Pro Lys Asp Gln Leu Met Ile
        835             840                 845

Ser Arg Thr Pro Glu Val Thr Cys Val Val Val Asp Val Ser His Glu
    850             855                 860

Asp Pro Glu Val Lys Phe Asn Trp Tyr Val Asp Gly Val Glu Val His
865             870                 875                 880

Asn Ala Lys Thr Lys Pro Arg Glu Glu Gln Tyr Asn Ser Thr Tyr Arg
            885                 890                 895

Val Val Ser Val Leu Thr Val Leu His Gln Asp Trp Leu Asn Gly Lys
        900             905                 910

Glu Tyr Lys Cys Lys Val Ser Asn Lys Ala Leu Pro Ala Pro Ile Glu
        915             920                 925

Lys Thr Ile Ser Lys Ala Lys Gly Gln Pro Arg Glu Pro Gln Val Tyr
    930             935                 940

Thr Leu Pro Pro Ser Arg Asp Glu Leu Thr Lys Asn Gln Val Ser Leu
945             950                 955                 960

Thr Cys Leu Val Lys Gly Phe Tyr Pro Ser Asp Ile Ala Val Glu Trp
            965                 970                 975

Glu Ser Asn Gly Gln Pro Glu Asn Asn Tyr Lys Thr Thr Pro Pro Val
        980             985                 990

Leu Asp Ser Asp Gly Ser Phe Leu Tyr Ser Lys Leu Thr Val Asp Lys
    995             1000                1005

Ser Arg Trp Gln Gln Gly Asn Val Phe Ser Cys Ser Val Leu His
    1010            1015                1020

Glu Ala Leu His Asn His Tyr Thr Gln Lys Ser Leu Ser Leu Ser
    1025            1030                1035

Pro Gly Lys
    1040

<210> SEQ ID NO 38
<211> LENGTH: 1013
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 38

Met Glu Pro Leu Val Thr Trp Val Val Pro Leu Leu Phe Leu Phe Leu
1               5                   10                  15

Leu Ser Arg Gln Gly Ala Ala Cys Arg Thr Ser Glu Cys Cys Phe Gln
            20                  25                  30

Asp Pro Pro Tyr Pro Asp Ala Asp Ser Gly Ser Ala Ser Gly Pro Arg
        35                  40                  45

Asp Leu Arg Cys Tyr Arg Ile Ser Ser Asp Arg Tyr Glu Cys Ser Trp
    50                  55                  60

Gln Tyr Glu Gly Pro Thr Ala Gly Val Ser His Phe Leu Arg Cys Cys
65                  70                  75                  80
```

```
Leu Ser Ser Gly Arg Cys Cys Tyr Phe Ala Ala Gly Ser Ala Thr Arg
                85                  90                  95

Leu Gln Phe Ser Asp Gln Ala Gly Val Ser Val Leu Tyr Thr Val Thr
            100                 105                 110

Leu Trp Val Glu Ser Trp Ala Arg Asn Gln Thr Glu Lys Ser Pro Glu
        115                 120                 125

Val Thr Leu Gln Leu Tyr Asn Ser Val Lys Tyr Glu Pro Pro Leu Gly
    130                 135                 140

Asp Ile Lys Val Ser Lys Leu Ala Gly Gln Leu Arg Met Glu Trp Glu
145                 150                 155                 160

Thr Pro Asp Asn Gln Val Gly Ala Glu Val Gln Phe Arg His Arg Thr
                165                 170                 175

Pro Ser Ser Pro Trp Lys Leu Gly Asp Cys Gly Pro Gln Asp Asp Asp
            180                 185                 190

Thr Glu Ser Cys Leu Cys Pro Leu Glu Met Asn Val Ala Gln Glu Phe
        195                 200                 205

Gln Leu Arg Arg Arg Leu Gly Ser Gln Gly Ser Ser Trp Ser Lys
    210                 215                 220

Trp Ser Ser Pro Val Cys Val Pro Pro Glu Asn Gly Gly Gly Ser
225                 230                 235                 240

Ser Gly Arg Ser Glu Asn Ile Arg Thr Ala Gly Gly Gly Ser Trp
                245                 250                 255

Glu Leu Lys Lys Asp Val Tyr Val Val Glu Leu Asp Trp Tyr Pro Asp
            260                 265                 270

Ala Pro Gly Glu Met Val Val Leu Thr Cys Asp Thr Pro Glu Glu Asp
        275                 280                 285

Gly Ile Thr Trp Thr Leu Asp Gln Ser Ser Glu Val Leu Gly Ser Gly
    290                 295                 300

Lys Thr Leu Thr Ile Gln Val Lys Glu Phe Gly Asp Ala Gly Gln Tyr
305                 310                 315                 320

Thr Cys His Lys Gly Gly Glu Val Leu Ser His Ser Leu Leu Leu Leu
                325                 330                 335

His Lys Lys Glu Asp Gly Ile Trp Ser Thr Asp Ile Leu Lys Asp Gln
            340                 345                 350

Lys Glu Pro Lys Asn Lys Thr Phe Leu Arg Cys Glu Ala Lys Asn Tyr
        355                 360                 365

Ser Gly Arg Phe Thr Cys Trp Trp Leu Thr Thr Ile Ser Thr Asp Leu
    370                 375                 380

Thr Phe Ser Val Lys Ser Ser Arg Gly Ser Ser Asp Pro Gln Gly Val
385                 390                 395                 400

Thr Cys Gly Ala Ala Thr Leu Ser Ala Glu Arg Val Arg Gly Asp Asn
                405                 410                 415

Lys Glu Tyr Glu Tyr Ser Val Glu Cys Gln Glu Asp Ser Ala Cys Pro
            420                 425                 430

Ala Ala Glu Glu Ser Leu Pro Ile Glu Val Met Val Asp Ala Val His
        435                 440                 445

Lys Leu Lys Tyr Glu Asn Tyr Thr Ser Ser Phe Phe Ile Arg Asp Ile
    450                 455                 460

Ile Lys Pro Asp Pro Pro Lys Asn Leu Gln Leu Lys Pro Leu Lys Asn
465                 470                 475                 480

Ser Arg Gln Val Glu Val Ser Trp Glu Tyr Pro Asp Thr Trp Ser Thr
                485                 490                 495
```

-continued

Pro His Ser Tyr Phe Ser Leu Thr Phe Cys Val Gln Val Gln Gly Lys
                500                 505                 510

Ser Lys Arg Glu Lys Lys Asp Arg Val Phe Thr Asp Lys Thr Ser Ala
        515                 520                 525

Thr Val Ile Cys Arg Lys Asn Ala Ser Ile Ser Val Arg Ala Gln Asp
    530                 535                 540

Arg Tyr Tyr Ser Ser Ser Trp Ser Glu Trp Ala Ser Val Pro Cys Ser
545                 550                 555                 560

Gly Gly Gly Gly Ser Gly Gly Gly Ser Gly Gly Gly Gly Ser Arg
                565                 570                 575

Asn Leu Pro Val Ala Thr Pro Asp Pro Gly Met Phe Pro Cys Leu His
        580                 585                 590

His Ser Gln Asn Leu Leu Arg Ala Val Ser Asn Met Leu Gln Lys Ala
            595                 600                 605

Arg Gln Thr Leu Glu Phe Tyr Pro Cys Thr Ser Glu Glu Ile Asp His
        610                 615                 620

Glu Asp Ile Thr Lys Asp Lys Thr Ser Thr Val Glu Ala Cys Leu Pro
625                 630                 635                 640

Leu Glu Leu Thr Lys Asn Glu Ser Cys Leu Asn Ser Arg Glu Thr Ser
                645                 650                 655

Phe Ile Thr Asn Gly Ser Cys Leu Ala Ser Arg Lys Thr Ser Phe Met
                660                 665                 670

Met Ala Leu Cys Leu Ser Ser Ile Tyr Glu Asp Leu Lys Met Tyr Gln
            675                 680                 685

Val Glu Phe Lys Thr Met Asn Ala Lys Leu Leu Met Asp Pro Lys Arg
        690                 695                 700

Gln Ile Phe Leu Asp Gln Asn Met Leu Ala Val Ile Asp Glu Leu Met
705                 710                 715                 720

Gln Ala Leu Asn Phe Asn Ser Glu Thr Val Pro Gln Lys Ser Ser Leu
                725                 730                 735

Glu Glu Pro Asp Phe Tyr Lys Thr Lys Ile Lys Leu Cys Ile Leu Leu
            740                 745                 750

His Ala Phe Arg Ile Arg Ala Val Thr Ile Asp Arg Val Met Ser Tyr
        755                 760                 765

Leu Asn Ala Ser Gly Gly Gly Ser Gly Gly Gly Gly Ser Gly Gly
        770                 775                 780

Gly Gly Ser Asp Lys Thr His Thr Cys Pro Pro Cys Pro Ala Pro Glu
785                 790                 795                 800

Leu Leu Gly Gly Pro Ser Val Phe Leu Phe Pro Pro Lys Pro Lys Asp
                805                 810                 815

Gln Leu Met Ile Ser Arg Thr Pro Glu Val Thr Cys Val Val Val Asp
            820                 825                 830

Val Ser His Glu Asp Pro Glu Val Lys Phe Asn Trp Tyr Val Asp Gly
        835                 840                 845

Val Glu Val His Asn Ala Lys Thr Lys Pro Arg Glu Glu Gln Tyr Asn
        850                 855                 860

Ser Thr Tyr Arg Val Val Ser Val Leu Thr Val Leu His Gln Asp Trp
865                 870                 875                 880

Leu Asn Gly Lys Glu Tyr Lys Cys Lys Val Ser Asn Lys Ala Leu Pro
                885                 890                 895

Ala Pro Ile Glu Lys Thr Ile Ser Lys Ala Lys Gly Gln Pro Arg Glu
            900                 905                 910

Pro Gln Val Tyr Thr Leu Pro Pro Ser Arg Asp Glu Leu Thr Lys Asn

```
            915                 920                 925
Gln Val Ser Leu Thr Cys Leu Val Lys Gly Phe Tyr Pro Ser Asp Ile
    930                 935                 940

Ala Val Glu Trp Glu Ser Asn Gly Gln Pro Glu Asn Asn Tyr Lys Thr
945                 950                 955                 960

Thr Pro Pro Val Leu Asp Ser Asp Gly Ser Phe Leu Tyr Ser Lys Leu
                965                 970                 975

Thr Val Asp Lys Ser Arg Trp Gln Gln Gly Asn Val Phe Ser Cys Ser
            980                 985                 990

Val Leu His Glu Ala Leu His Asn His Tyr Thr Gln Lys Ser Leu Ser
            995                1000                1005

Leu Ser Pro Gly Lys
        1010

<210> SEQ ID NO 39
<211> LENGTH: 1119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 39

Met Ala Gln Thr Val Arg Glu Cys Ser Leu Ala Leu Leu Phe Leu Phe
1               5                  10                  15

Met Trp Leu Leu Ile Lys Ala Asn Ile Asp Val Cys Lys Leu Gly Thr
            20                  25                  30

Val Thr Val Gln Pro Ala Pro Val Ile Pro Leu Gly Ser Ala Ala Asn
        35                  40                  45

Ile Ser Cys Ser Leu Asn Pro Lys Gln Gly Cys Ser His Tyr Pro Ser
    50                  55                  60

Ser Asn Glu Leu Ile Leu Leu Lys Phe Val Asn Asp Val Leu Val Glu
65                  70                  75                  80

Asn Leu His Gly Lys Lys Val His Asp His Thr Gly His Ser Ser Thr
            85                  90                  95

Phe Gln Val Thr Asn Leu Ser Leu Gly Met Thr Leu Phe Val Cys Lys
        100                 105                 110

Leu Asn Cys Ser Asn Ser Gln Lys Lys Pro Pro Val Pro Val Cys Gly
    115                 120                 125

Val Glu Ile Ser Val Gly Val Ala Pro Glu Pro Pro Gln Asn Ile Ser
130                 135                 140

Cys Val Gln Glu Gly Glu Asn Gly Thr Val Ala Cys Ser Trp Asn Ser
145                 150                 155                 160

Gly Lys Val Thr Tyr Leu Lys Thr Asn Tyr Thr Leu Gln Leu Ser Gly
            165                 170                 175

Pro Asn Asn Leu Thr Cys Gln Lys Gln Cys Phe Ser Asp Asn Arg Gln
        180                 185                 190

Asn Cys Asn Arg Leu Asp Leu Gly Ile Asn Leu Ser Pro Asp Leu Ala
    195                 200                 205

Glu Ser Arg Phe Ile Val Arg Val Thr Ala Ile Asn Asp Leu Gly Asn
210                 215                 220

Ser Ser Ser Leu Pro His Thr Phe Thr Phe Leu Asp Ile Val Ile Pro
225                 230                 235                 240

Leu Pro Pro Trp Asp Ile Arg Ile Asn Phe Leu Asn Ala Ser Gly Ser
            245                 250                 255
```

```
Arg Gly Thr Leu Gln Trp Glu Asp Glu Gly Gln Val Val Leu Asn Gln
            260                 265                 270

Leu Arg Tyr Gln Pro Leu Asn Ser Thr Ser Trp Asn Met Val Asn Ala
        275                 280                 285

Thr Asn Ala Lys Gly Lys Tyr Asp Leu Arg Asp Leu Arg Pro Phe Thr
    290                 295                 300

Glu Tyr Glu Phe Gln Ile Ser Ser Lys Leu His Leu Ser Gly Gly Ser
305                 310                 315                 320

Trp Ser Asn Trp Ser Glu Ser Leu Arg Thr Arg Thr Pro Glu Glu Glu
                325                 330                 335

Pro Gly Gly Gly Gly Ser Ser Gly Arg Ser Glu Asn Ile Arg Thr Ala
            340                 345                 350

Gly Gly Gly Gly Ser Met Trp Glu Leu Glu Lys Asp Val Tyr Val Val
            355                 360                 365

Glu Val Asp Trp Thr Pro Asp Ala Pro Gly Glu Thr Val Asn Leu Thr
        370                 375                 380

Cys Asp Thr Pro Glu Glu Asp Asp Ile Thr Trp Thr Ser Asp Gln Arg
385                 390                 395                 400

His Gly Val Ile Gly Ser Gly Lys Thr Leu Thr Ile Thr Val Lys Glu
            405                 410                 415

Phe Leu Asp Ala Gly Gln Tyr Thr Cys His Lys Gly Gly Glu Thr Leu
        420                 425                 430

Ser His Ser His Leu Leu Leu His Lys Lys Glu Asn Gly Ile Trp Ser
    435                 440                 445

Thr Glu Ile Leu Lys Asn Phe Lys Asn Lys Thr Phe Leu Lys Cys Glu
450                 455                 460

Ala Pro Asn Tyr Ser Gly Arg Phe Thr Cys Ser Trp Leu Val Gln Arg
465                 470                 475                 480

Asn Met Asp Leu Lys Phe Asn Ile Lys Ser Ser Ser Ser Ser Pro Asp
                485                 490                 495

Ser Arg Ala Val Thr Cys Gly Met Ala Ser Leu Ser Ala Glu Lys Val
            500                 505                 510

Thr Leu Asp Gln Arg Asp Tyr Glu Lys Tyr Ser Val Ser Cys Gln Glu
        515                 520                 525

Asp Val Thr Cys Pro Thr Ala Glu Glu Thr Leu Pro Ile Glu Leu Ala
    530                 535                 540

Leu Glu Ala Arg Gln Gln Asn Lys Tyr Glu Asn Tyr Ser Thr Ser Phe
545                 550                 555                 560

Phe Ile Arg Asp Ile Ile Lys Pro Asp Pro Pro Lys Asn Leu Gln Met
                565                 570                 575

Lys Pro Leu Lys Asn Ser Gln Val Glu Val Ser Trp Glu Tyr Pro Asp
            580                 585                 590

Ser Trp Ser Thr Pro His Ser Tyr Phe Ser Leu Lys Phe Phe Val Arg
        595                 600                 605

Ile Gln Arg Lys Lys Glu Lys Met Lys Glu Thr Glu Glu Gly Cys Asn
    610                 615                 620

Gln Lys Gly Ala Phe Leu Val Glu Lys Thr Ser Thr Glu Val Gln Cys
625                 630                 635                 640

Lys Gly Gly Asn Val Cys Val Gln Ala Gln Asp Arg Tyr Tyr Asn Ser
                645                 650                 655

Ser Cys Ser Lys Trp Ala Cys Val Pro Cys Arg Val Arg Ser Gly Gly
            660                 665                 670

Gly Gly Ser Gly Gly Gly Gly Ser Gly Gly Gly Gly Ser Arg Val Ile
```

```
            675                 680                 685
Pro Val Ser Gly Pro Ala Arg Cys Leu Ser Gln Ser Arg Asn Leu Leu
690                 695                 700

Lys Thr Thr Asp Asp Met Val Lys Thr Ala Arg Glu Lys Leu Lys His
705                 710                 715                 720

Tyr Ser Cys Thr Ala Glu Asp Ile Asp His Glu Asp Ile Thr Arg Asp
                    725                 730                 735

Gln Thr Ser Thr Leu Lys Thr Cys Leu Pro Leu Glu Leu His Lys Asn
                740                 745                 750

Glu Ser Cys Leu Ala Thr Arg Glu Thr Ser Ser Thr Thr Arg Gly Ser
            755                 760                 765

Cys Leu Pro Pro Gln Lys Thr Ser Leu Met Met Thr Leu Cys Leu Gly
770                 775                 780

Ser Ile Tyr Glu Asp Leu Lys Met Tyr Gln Thr Glu Phe Gln Ala Ile
785                 790                 795                 800

Asn Ala Ala Leu Gln Asn His Asn His Gln Gln Ile Ile Leu Asp Lys
                    805                 810                 815

Gly Met Leu Val Ala Ile Asp Glu Leu Met Gln Ser Leu Asn His Asn
                820                 825                 830

Gly Glu Thr Leu Arg Gln Lys Pro Val Gly Glu Ala Asp Pro Tyr
            835                 840                 845

Arg Val Lys Met Lys Leu Cys Ile Leu Leu His Ala Phe Ser Thr Arg
850                 855                 860

Val Val Thr Ile Asn Arg Val Met Gly Tyr Leu Ser Ser Ala Gly Gly
865                 870                 875                 880

Gly Gly Ser Gly Gly Gly Ser Gly Gly Gly Ser Asp Lys Thr
                    885                 890                 895

His Thr Cys Pro Pro Cys Pro Ala Pro Glu Leu Leu Gly Gly Pro Ser
                900                 905                 910

Val Phe Leu Phe Pro Pro Lys Pro Lys Asp Gln Leu Met Ile Ser Arg
            915                 920                 925

Thr Pro Glu Val Thr Cys Val Val Val Asp Val Ser His Glu Asp Pro
930                 935                 940

Glu Val Lys Phe Asn Trp Tyr Val Asp Gly Val Glu Val His Asn Ala
945                 950                 955                 960

Lys Thr Lys Pro Arg Glu Glu Gln Tyr Asn Ser Thr Tyr Arg Val Val
                965                 970                 975

Ser Val Leu Thr Val Leu His Gln Asp Trp Leu Asn Gly Lys Glu Tyr
                980                 985                 990

Lys Cys Lys Val Ser Asn Lys Ala Leu Pro Ala Pro Ile Glu Lys Thr
            995                 1000                1005

Ile Ser Lys Ala Lys Gly Gln Pro Arg Glu Pro Gln Val Tyr Thr
1010                1015                1020

Leu Pro Pro Ser Arg Asp Glu Leu Thr Lys Asn Gln Val Ser Leu
            1025                1030                1035

Thr Cys Leu Val Lys Gly Phe Tyr Pro Ser Asp Ile Ala Val Glu
            1040                1045                1050

Trp Glu Ser Asn Gly Gln Pro Glu Asn Asn Tyr Lys Thr Thr Pro
            1055                1060                1065

Pro Val Leu Asp Ser Asp Gly Ser Phe Leu Tyr Ser Lys Leu Thr
            1070                1075                1080

Val Asp Lys Ser Arg Trp Gln Gln Gly Asn Val Phe Ser Cys Ser
            1085                1090                1095
```

<210> SEQ ID NO 40
<211> LENGTH: 1099
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 40

```
Val Leu His Glu Ala Leu His Asn His Tyr Thr Gln Lys Ser Leu
    1100                1105                1110
Ser Leu Ser Pro Gly Lys
    1115

Met Ala His Thr Phe Arg Gly Cys Ser Leu Ala Phe Met Phe Ile Ile
1               5                   10                  15
Thr Trp Leu Leu Ile Lys Ala Lys Ile Asp Ala Cys Lys Arg Gly Asp
            20                  25                  30
Val Thr Val Lys Pro Ser His Val Ile Leu Gly Ser Thr Val Asn
        35                  40                  45
Ile Thr Cys Ser Leu Lys Pro Arg Gln Gly Cys Phe His Tyr Ser Arg
50                  55                  60
Arg Asn Lys Leu Ile Leu Tyr Lys Phe Asp Arg Arg Ile Asn Phe His
65                  70                  75                  80
His Gly His Ser Leu Asn Ser Gln Val Thr Gly Leu Pro Leu Gly Thr
                85                  90                  95
Thr Leu Phe Val Cys Lys Leu Ala Cys Ile Asn Ser Asp Glu Ile Gln
            100                 105                 110
Ile Cys Gly Ala Glu Ile Phe Val Gly Val Ala Pro Glu Gln Pro Gln
        115                 120                 125
Asn Leu Ser Cys Ile Gln Lys Gly Glu Gln Gly Thr Val Ala Cys Thr
130                 135                 140
Trp Glu Arg Gly Arg Asp Thr His Leu Tyr Thr Glu Tyr Thr Leu Gln
145                 150                 155                 160
Leu Ser Gly Pro Lys Asn Leu Thr Trp Gln Lys Gln Cys Lys Asp Ile
                165                 170                 175
Tyr Cys Asp Tyr Leu Asp Phe Gly Ile Asn Leu Thr Pro Glu Ser Pro
            180                 185                 190
Glu Ser Asn Phe Thr Ala Lys Val Thr Ala Val Asn Ser Leu Gly Ser
        195                 200                 205
Ser Ser Ser Leu Pro Ser Thr Phe Thr Phe Leu Asp Ile Val Arg Pro
210                 215                 220
Leu Pro Pro Trp Asp Ile Arg Ile Lys Phe Gln Lys Ala Ser Val Ser
225                 230                 235                 240
Arg Cys Thr Leu Tyr Trp Arg Asp Glu Gly Leu Val Leu Leu Asn Arg
                245                 250                 255
Leu Arg Tyr Arg Pro Ser Asn Ser Arg Leu Trp Asn Met Val Asn Val
            260                 265                 270
Thr Lys Ala Lys Gly Arg His Asp Leu Leu Asp Leu Lys Pro Phe Thr
        275                 280                 285
Glu Tyr Glu Phe Gln Ile Ser Ser Lys Leu His Leu Tyr Lys Gly Ser
        290                 295                 300
Trp Ser Asp Trp Ser Glu Ser Leu Arg Ala Gln Thr Pro Glu Glu Glu
305                 310                 315                 320
Pro Gly Gly Gly Gly Ser Ser Gly Arg Ser Glu Asn Ile Arg Thr Ala
```

-continued

```
                325                 330                 335
Gly Gly Gly Gly Ser Trp Glu Leu Lys Lys Asp Val Tyr Val Glu
            340                 345                 350
Leu Asp Trp Tyr Pro Asp Ala Pro Gly Glu Met Val Val Leu Thr Cys
            355                 360                 365
Asp Thr Pro Glu Glu Asp Gly Ile Thr Trp Thr Leu Asp Gln Ser Ser
370                 375                 380
Glu Val Leu Gly Ser Gly Lys Thr Leu Thr Ile Gln Val Lys Glu Phe
385                 390                 395                 400
Gly Asp Ala Gly Gln Tyr Thr Cys His Lys Gly Gly Glu Val Leu Ser
                405                 410                 415
His Ser Leu Leu Leu Leu His Lys Lys Glu Asp Gly Ile Trp Ser Thr
                420                 425                 430
Asp Ile Leu Lys Asp Gln Lys Glu Pro Lys Asn Lys Thr Phe Leu Arg
                435                 440                 445
Cys Glu Ala Lys Asn Tyr Ser Gly Arg Phe Thr Cys Trp Trp Leu Thr
450                 455                 460
Thr Ile Ser Thr Asp Leu Thr Phe Ser Val Lys Ser Ser Arg Gly Ser
465                 470                 475                 480
Ser Asp Pro Gln Gly Val Thr Cys Gly Ala Ala Thr Leu Ser Ala Glu
                485                 490                 495
Arg Val Arg Gly Asp Asn Lys Glu Tyr Glu Tyr Ser Val Glu Cys Gln
                500                 505                 510
Glu Asp Ser Ala Cys Pro Ala Ala Glu Glu Ser Leu Pro Ile Glu Val
            515                 520                 525
Met Val Asp Ala Val His Lys Leu Lys Tyr Glu Asn Tyr Thr Ser Ser
530                 535                 540
Phe Phe Ile Arg Asp Ile Ile Lys Pro Asp Pro Pro Lys Asn Leu Gln
545                 550                 555                 560
Leu Lys Pro Leu Lys Asn Ser Arg Gln Val Glu Val Ser Trp Glu Tyr
                565                 570                 575
Pro Asp Thr Trp Ser Thr Pro His Ser Tyr Phe Ser Leu Thr Phe Cys
            580                 585                 590
Val Gln Val Gln Gly Lys Ser Lys Arg Glu Lys Lys Asp Arg Val Phe
                595                 600                 605
Thr Asp Lys Thr Ser Ala Thr Val Ile Cys Arg Lys Asn Ala Ser Ile
610                 615                 620
Ser Val Arg Ala Gln Asp Arg Tyr Tyr Ser Ser Ser Trp Ser Glu Trp
625                 630                 635                 640
Ala Ser Val Pro Cys Ser Gly Gly Gly Ser Gly Gly Gly Gly Ser
                645                 650                 655
Gly Gly Gly Gly Ser Arg Asn Leu Pro Val Ala Thr Pro Asp Pro Gly
                660                 665                 670
Met Phe Pro Cys Leu His His Ser Gln Asn Leu Leu Arg Ala Val Ser
                675                 680                 685
Asn Met Leu Gln Lys Ala Arg Gln Thr Leu Glu Phe Tyr Pro Cys Thr
                690                 695                 700
Ser Glu Glu Ile Asp His Glu Asp Ile Thr Lys Asp Lys Thr Ser Thr
705                 710                 715                 720
Val Glu Ala Cys Leu Pro Leu Glu Leu Thr Lys Asn Glu Ser Cys Leu
                725                 730                 735
Asn Ser Arg Glu Thr Ser Phe Ile Thr Asn Gly Ser Cys Leu Ala Ser
                740                 745                 750
```

```
Arg Lys Thr Ser Phe Met Met Ala Leu Cys Leu Ser Ser Ile Tyr Glu
        755                 760                 765

Asp Leu Lys Met Tyr Gln Val Glu Phe Lys Thr Met Asn Ala Lys Leu
    770                 775                 780

Leu Met Asp Pro Lys Arg Gln Ile Phe Leu Asp Gln Asn Met Leu Ala
785                 790                 795                 800

Val Ile Asp Glu Leu Met Gln Ala Leu Asn Phe Asn Ser Glu Thr Val
                805                 810                 815

Pro Gln Lys Ser Ser Leu Glu Glu Pro Asp Phe Tyr Lys Thr Lys Ile
                820                 825                 830

Lys Leu Cys Ile Leu Leu His Ala Phe Arg Ile Arg Ala Val Thr Ile
                835                 840                 845

Asp Arg Val Met Ser Tyr Leu Asn Ala Ser Gly Gly Gly Gly Ser Gly
850                 855                 860

Gly Gly Gly Ser Gly Gly Gly Ser Asp Lys Thr His Thr Cys Pro
865                 870                 875                 880

Pro Cys Pro Ala Pro Glu Leu Leu Gly Gly Pro Ser Val Phe Leu Phe
                885                 890                 895

Pro Pro Lys Pro Lys Asp Gln Leu Met Ile Ser Arg Thr Pro Glu Val
                900                 905                 910

Thr Cys Val Val Val Asp Val Ser His Glu Asp Pro Glu Val Lys Phe
            915                 920                 925

Asn Trp Tyr Val Asp Gly Val Glu Val His Asn Ala Lys Thr Lys Pro
        930                 935                 940

Arg Glu Glu Gln Tyr Asn Ser Thr Tyr Arg Val Val Ser Val Leu Thr
945                 950                 955                 960

Val Leu His Gln Asp Trp Leu Asn Gly Lys Glu Tyr Lys Cys Lys Val
                965                 970                 975

Ser Asn Lys Ala Leu Pro Ala Pro Ile Glu Lys Thr Ile Ser Lys Ala
                980                 985                 990

Lys Gly Gln Pro Arg Glu Pro Gln Val Tyr Thr Leu Pro Pro Ser Arg
            995                 1000                1005

Asp Glu Leu Thr Lys Asn Gln Val Ser Leu Thr Cys Leu Val Lys
    1010                1015                1020

Gly Phe Tyr Pro Ser Asp Ile Ala Val Glu Trp Glu Ser Asn Gly
    1025                1030                1035

Gln Pro Glu Asn Asn Tyr Lys Thr Thr Pro Pro Val Leu Asp Ser
    1040                1045                1050

Asp Gly Ser Phe Leu Tyr Ser Lys Leu Thr Val Asp Lys Ser Arg
    1055                1060                1065

Trp Gln Gln Gly Asn Val Phe Ser Cys Ser Val Leu His Glu Ala
    1070                1075                1080

Leu His Asn His Tyr Thr Gln Lys Ser Leu Ser Leu Ser Pro Gly
    1085                1090                1095

Lys

<210> SEQ ID NO 41
<211> LENGTH: 834
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 41
```

```
Met Asp Met Met Gly Leu Ala Gly Thr Ser Lys His Ile Thr Phe Leu
1               5                   10                  15
Leu Leu Cys Gln Leu Gly Ala Ser Pro Gly Asp Gly Cys Cys Val
            20                  25                  30
Glu Lys Thr Ser Phe Pro Glu Gly Ala Ser Gly Ser Pro Leu Gly Pro
                35                  40                  45
Arg Asn Leu Ser Cys Tyr Arg Val Ser Lys Thr Asp Tyr Glu Cys Ser
        50                  55                  60
Trp Gln Tyr Asp Gly Pro Glu Asp Asn Val Ser His Val Leu Trp Cys
65                  70                  75                  80
Cys Phe Val Pro Pro Asn His Thr His Thr Gly Gln Glu Arg Cys Arg
                85                  90                  95
Tyr Phe Ser Ser Gly Pro Asp Arg Thr Val Gln Phe Trp Glu Gln Asp
                100                 105                 110
Gly Ile Pro Val Leu Ser Lys Val Asn Phe Trp Val Glu Ser Arg Leu
            115                 120                 125
Gly Asn Arg Thr Met Lys Ser Gln Lys Ile Ser Gln Tyr Leu Tyr Asn
            130                 135                 140
Trp Thr Lys Thr Thr Pro Pro Leu Gly His Ile Lys Val Ser Gln Ser
145                 150                 155                 160
His Arg Gln Leu Arg Met Asp Trp Asn Val Ser Glu Glu Ala Gly Ala
                165                 170                 175
Glu Val Gln Phe Arg Arg Arg Met Pro Thr Thr Asn Trp Thr Leu Gly
                180                 185                 190
Asp Cys Gly Pro Gln Val Asn Ser Gly Ser Gly Val Leu Gly Asp Ile
            195                 200                 205
Arg Gly Ser Met Ser Glu Ser Cys Leu Cys Pro Ser Glu Asn Met Ala
            210                 215                 220
Gln Glu Ile Gln Ile Arg Arg Arg Arg Leu Ser Ser Gly Ala Pro
225                 230                 235                 240
Gly Gly Pro Trp Ser Asp Trp Ser Met Pro Val Cys Val Pro Pro Glu
                245                 250                 255
Val Leu Pro Gly Gly Gly Gly Ser Ser Gly Arg Ser Glu Asn Ile Arg
            260                 265                 270
Thr Ala Gly Gly Gly Gly Ser Met Trp Glu Leu Glu Lys Asp Val Tyr
            275                 280                 285
Val Val Glu Val Asp Trp Thr Pro Asp Ala Pro Gly Glu Thr Val Asn
        290                 295                 300
Leu Thr Cys Asp Thr Pro Glu Glu Asp Asp Ile Thr Trp Thr Ser Asp
305                 310                 315                 320
Gln Arg His Gly Val Ile Gly Ser Gly Lys Thr Leu Thr Ile Thr Val
                325                 330                 335
Lys Glu Phe Leu Asp Ala Gly Gln Tyr Thr Cys His Lys Gly Gly Glu
                340                 345                 350
Thr Leu Ser His Ser His Leu Leu Leu His Lys Lys Glu Asn Gly Ile
            355                 360                 365
Trp Ser Thr Glu Ile Leu Lys Asn Phe Lys Asn Lys Thr Phe Leu Lys
370                 375                 380
Cys Glu Ala Pro Asn Tyr Ser Gly Arg Phe Thr Cys Ser Trp Leu Val
385                 390                 395                 400
Gln Arg Asn Met Asp Leu Lys Phe Asn Ile Lys Ser Ser Ser Ser
                405                 410                 415
```

```
Pro Asp Ser Arg Ala Val Thr Cys Gly Met Ala Ser Leu Ser Ala Glu
            420                 425                 430

Lys Val Thr Leu Asp Gln Arg Asp Tyr Glu Lys Tyr Ser Val Ser Cys
        435                 440                 445

Gln Glu Asp Val Thr Cys Pro Thr Ala Glu Glu Thr Leu Pro Ile Glu
    450                 455                 460

Leu Ala Leu Glu Ala Arg Gln Gln Asn Lys Tyr Glu Asn Tyr Ser Thr
465                 470                 475                 480

Ser Phe Phe Ile Arg Asp Ile Ile Lys Pro Asp Pro Lys Asn Leu
                485                 490                 495

Gln Met Lys Pro Leu Lys Asn Ser Gln Val Glu Val Ser Trp Glu Tyr
            500                 505                 510

Pro Asp Ser Trp Ser Thr Pro His Ser Tyr Phe Ser Leu Lys Phe Phe
        515                 520                 525

Val Arg Ile Gln Arg Lys Lys Glu Lys Met Lys Glu Thr Glu Glu Gly
    530                 535                 540

Cys Asn Gln Lys Gly Ala Phe Leu Val Glu Lys Thr Ser Thr Glu Val
545                 550                 555                 560

Gln Cys Lys Gly Gly Asn Val Cys Val Gln Ala Gln Asp Arg Tyr Tyr
                565                 570                 575

Asn Ser Ser Cys Ser Lys Trp Ala Cys Val Pro Cys Arg Val Arg Ser
            580                 585                 590

Gly Gly Gly Gly Ser Gly Gly Gly Ser Gly Gly Gly Gly Ser Asp
                595                 600                 605

Lys Thr His Thr Cys Pro Pro Cys Pro Ala Pro Glu Leu Leu Gly Gly
    610                 615                 620

Pro Ser Val Phe Leu Phe Pro Pro Lys Pro Lys Asp Thr Leu Met Ile
625                 630                 635                 640

Ser Arg Thr Pro Glu Val Thr Cys Val Val Val Asp Val Ser His Glu
                645                 650                 655

Asp Pro Glu Val Lys Phe Asn Trp Tyr Val Asp Gly Val Glu Val His
            660                 665                 670

Asn Ala Lys Thr Lys Pro Arg Glu Glu Gln Tyr Asn Ser Thr Tyr Arg
        675                 680                 685

Val Val Ser Val Leu Thr Val Leu His Gln Asp Trp Leu Asn Gly Lys
    690                 695                 700

Glu Tyr Lys Cys Lys Val Ser Asn Lys Ala Leu Pro Ala Pro Ile Glu
705                 710                 715                 720

Lys Thr Ile Ser Lys Ala Lys Gly Gln Pro Arg Glu Pro Gln Val Tyr
                725                 730                 735

Thr Leu Pro Pro Cys Arg Asp Glu Leu Thr Lys Asn Gln Val Ser Leu
            740                 745                 750

Trp Cys Leu Val Lys Gly Phe Tyr Pro Ser Asp Ile Ala Val Glu Trp
        755                 760                 765

Glu Ser Asn Gly Gln Pro Glu Asn Asn Tyr Lys Thr Thr Pro Pro Val
    770                 775                 780

Leu Asp Ser Asp Gly Ser Phe Phe Leu Tyr Ser Lys Leu Thr Val Asp
785                 790                 795                 800

Lys Ser Arg Trp Gln Gln Gly Asn Val Phe Ser Cys Ser Val Met His
                805                 810                 815

Glu Ala Leu His Asn His Tyr Thr Gln Lys Ser Leu Ser Leu Ser Pro
            820                 825                 830

Gly Lys
```

<210> SEQ ID NO 42
<211> LENGTH: 802
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 42

```
Met Glu Pro Leu Val Thr Trp Val Val Pro Leu Leu Phe Leu Phe Leu
1               5                   10                  15

Leu Ser Arg Gln Gly Ala Ala Cys Arg Thr Ser Glu Cys Cys Phe Gln
            20                  25                  30

Asp Pro Pro Tyr Pro Asp Ala Asp Ser Gly Ser Ala Ser Gly Pro Arg
        35                  40                  45

Asp Leu Arg Cys Tyr Arg Ile Ser Ser Asp Arg Tyr Glu Cys Ser Trp
    50                  55                  60

Gln Tyr Glu Gly Pro Thr Ala Gly Val Ser His Phe Leu Arg Cys Cys
65                  70                  75                  80

Leu Ser Ser Gly Arg Cys Cys Tyr Phe Ala Ala Gly Ser Ala Thr Arg
                85                  90                  95

Leu Gln Phe Ser Asp Gln Ala Gly Val Ser Val Leu Tyr Thr Val Thr
            100                 105                 110

Leu Trp Val Glu Ser Trp Ala Arg Asn Gln Thr Glu Lys Ser Pro Glu
        115                 120                 125

Val Thr Leu Gln Leu Tyr Asn Ser Val Lys Tyr Glu Pro Pro Leu Gly
    130                 135                 140

Asp Ile Lys Val Ser Lys Leu Ala Gly Gln Leu Arg Met Glu Trp Glu
145                 150                 155                 160

Thr Pro Asp Asn Gln Val Gly Ala Glu Val Gln Phe Arg His Arg Thr
                165                 170                 175

Pro Ser Ser Pro Trp Lys Leu Gly Asp Cys Gly Pro Gln Asp Asp Asp
            180                 185                 190

Thr Glu Ser Cys Leu Cys Pro Leu Glu Met Asn Val Ala Gln Glu Phe
        195                 200                 205

Gln Leu Arg Arg Arg Leu Gly Ser Gln Gly Ser Ser Trp Ser Lys
    210                 215                 220

Trp Ser Ser Pro Val Cys Val Pro Pro Glu Asn Gly Gly Gly Ser
225                 230                 235                 240

Ser Gly Arg Ser Glu Asn Ile Arg Thr Ala Gly Gly Gly Ser Trp
                245                 250                 255

Glu Leu Lys Lys Asp Val Tyr Val Val Glu Leu Asp Trp Tyr Pro Asp
            260                 265                 270

Ala Pro Gly Glu Met Val Val Leu Thr Cys Asp Thr Pro Glu Glu Asp
        275                 280                 285

Gly Ile Thr Trp Thr Leu Asp Gln Ser Ser Glu Val Leu Gly Ser Gly
    290                 295                 300

Lys Thr Leu Thr Ile Gln Val Lys Glu Phe Gly Asp Ala Gly Gln Tyr
305                 310                 315                 320

Thr Cys His Lys Gly Gly Glu Val Leu Ser His Ser Leu Leu Leu Leu
                325                 330                 335

His Lys Lys Glu Asp Gly Ile Trp Ser Thr Asp Ile Leu Lys Asp Gln
            340                 345                 350

Lys Glu Pro Lys Asn Lys Thr Phe Leu Arg Cys Glu Ala Lys Asn Tyr
```

-continued

```
            355                 360                 365
Ser Gly Arg Phe Thr Cys Trp Trp Leu Thr Thr Ile Ser Thr Asp Leu
370                 375                 380

Thr Phe Ser Val Lys Ser Ser Arg Gly Ser Ser Asp Pro Gln Gly Val
385                 390                 395                 400

Thr Cys Gly Ala Ala Thr Leu Ser Ala Glu Arg Val Arg Gly Asp Asn
                    405                 410                 415

Lys Glu Tyr Glu Tyr Ser Val Glu Cys Gln Glu Asp Ser Ala Cys Pro
                420                 425                 430

Ala Ala Glu Glu Ser Leu Pro Ile Glu Val Met Val Asp Ala Val His
            435                 440                 445

Lys Leu Lys Tyr Glu Asn Tyr Thr Ser Ser Phe Phe Ile Arg Asp Ile
        450                 455                 460

Ile Lys Pro Asp Pro Pro Lys Asn Leu Gln Leu Lys Pro Leu Lys Asn
465                 470                 475                 480

Ser Arg Gln Val Glu Val Ser Trp Glu Tyr Pro Asp Thr Trp Ser Thr
                485                 490                 495

Pro His Ser Tyr Phe Ser Leu Thr Phe Cys Val Gln Val Gln Gly Lys
                500                 505                 510

Ser Lys Arg Glu Lys Lys Asp Arg Val Phe Thr Asp Lys Thr Ser Ala
            515                 520                 525

Thr Val Ile Cys Arg Lys Asn Ala Ser Ile Ser Val Arg Ala Gln Asp
        530                 535                 540

Arg Tyr Tyr Ser Ser Ser Trp Ser Glu Trp Ala Ser Val Pro Cys Ser
545                 550                 555                 560

Gly Gly Gly Gly Ser Gly Gly Gly Ser Gly Gly Gly Gly Ser Asp
                    565                 570                 575

Lys Thr His Thr Cys Pro Pro Cys Pro Ala Pro Glu Leu Leu Gly Gly
                580                 585                 590

Pro Ser Val Phe Leu Phe Pro Pro Lys Pro Lys Asp Thr Leu Met Ile
            595                 600                 605

Ser Arg Thr Pro Glu Val Thr Cys Val Val Val Asp Val Ser His Glu
        610                 615                 620

Asp Pro Glu Val Lys Phe Asn Trp Tyr Val Asp Gly Val Glu Val His
625                 630                 635                 640

Asn Ala Lys Thr Lys Pro Arg Glu Glu Gln Tyr Asn Ser Thr Tyr Arg
                645                 650                 655

Val Val Ser Val Leu Thr Val Leu His Gln Asp Trp Leu Asn Gly Lys
                660                 665                 670

Glu Tyr Lys Cys Lys Val Ser Asn Lys Ala Leu Pro Ala Pro Ile Glu
            675                 680                 685

Lys Thr Ile Ser Lys Ala Lys Gly Gln Pro Arg Glu Pro Gln Val Tyr
        690                 695                 700

Thr Leu Pro Pro Cys Arg Asp Glu Leu Thr Lys Asn Gln Val Ser Leu
705                 710                 715                 720

Trp Cys Leu Val Lys Gly Phe Tyr Pro Ser Asp Ile Ala Val Glu Trp
                725                 730                 735

Glu Ser Asn Gly Gln Pro Glu Asn Asn Tyr Lys Thr Thr Pro Pro Val
                740                 745                 750

Leu Asp Ser Asp Gly Ser Phe Phe Leu Tyr Ser Lys Leu Thr Val Asp
            755                 760                 765

Lys Ser Arg Trp Gln Gln Gly Asn Val Phe Ser Cys Ser Val Met His
        770                 775                 780
```

```
Glu Ala Leu His Asn His Tyr Thr Gln Lys Ser Leu Ser Leu Ser Pro
785                 790                 795                 800

Gly Lys

<210> SEQ ID NO 43
<211> LENGTH: 792
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 43

Met Ala Gln Thr Val Arg Glu Cys Ser Leu Ala Leu Leu Phe Leu Phe
1               5                   10                  15

Met Trp Leu Leu Ile Lys Ala Asn Ile Asp Val Cys Lys Leu Gly Thr
            20                  25                  30

Val Thr Val Gln Pro Ala Pro Val Ile Pro Leu Gly Ser Ala Ala Asn
        35                  40                  45

Ile Ser Cys Ser Leu Asn Pro Lys Gln Gly Cys Ser His Tyr Pro Ser
    50                  55                  60

Ser Asn Glu Leu Ile Leu Leu Lys Phe Val Asn Asp Val Leu Val Glu
65                  70                  75                  80

Asn Leu His Gly Lys Lys Val His Asp His Thr Gly His Ser Ser Thr
                85                  90                  95

Phe Gln Val Thr Asn Leu Ser Leu Gly Met Thr Leu Phe Val Cys Lys
            100                 105                 110

Leu Asn Cys Ser Asn Ser Gln Lys Lys Pro Pro Val Pro Val Cys Gly
        115                 120                 125

Val Glu Ile Ser Val Gly Val Ala Pro Glu Pro Gln Asn Ile Ser
    130                 135                 140

Cys Val Gln Glu Gly Glu Asn Gly Thr Val Ala Cys Ser Trp Asn Ser
145                 150                 155                 160

Gly Lys Val Thr Tyr Leu Lys Thr Asn Tyr Thr Leu Gln Leu Ser Gly
                165                 170                 175

Pro Asn Asn Leu Thr Cys Gln Lys Gln Cys Phe Ser Asp Asn Arg Gln
            180                 185                 190

Asn Cys Asn Arg Leu Asp Leu Gly Ile Asn Leu Ser Pro Asp Leu Ala
        195                 200                 205

Glu Ser Arg Phe Ile Val Arg Val Thr Ala Ile Asn Asp Leu Gly Asn
    210                 215                 220

Ser Ser Ser Leu Pro His Thr Phe Thr Phe Leu Asp Ile Val Ile Pro
225                 230                 235                 240

Leu Pro Pro Trp Asp Ile Arg Ile Asn Phe Leu Asn Ala Ser Gly Ser
                245                 250                 255

Arg Gly Thr Leu Gln Trp Glu Asp Glu Gly Gln Val Val Leu Asn Gln
            260                 265                 270

Leu Arg Tyr Gln Pro Leu Asn Ser Thr Ser Trp Asn Met Val Asn Ala
        275                 280                 285

Thr Asn Ala Lys Gly Lys Tyr Asp Leu Arg Asp Leu Arg Pro Phe Thr
    290                 295                 300

Glu Tyr Glu Phe Gln Ile Ser Ser Lys Leu His Leu Ser Gly Gly Ser
305                 310                 315                 320

Trp Ser Asn Trp Ser Glu Ser Leu Arg Thr Arg Thr Pro Glu Glu Glu
                325                 330                 335
```

```
Pro Gly Gly Gly Ser Ser Gly Arg Ser Glu Asn Ile Arg Thr Ala
        340                 345                 350
Gly Gly Gly Gly Ser Arg Val Ile Pro Val Ser Gly Pro Ala Arg Cys
            355                 360                 365
Leu Ser Gln Ser Arg Asn Leu Leu Lys Thr Thr Asp Asp Met Val Lys
    370                 375                 380
Thr Ala Arg Glu Lys Leu Lys His Tyr Ser Cys Thr Ala Glu Asp Ile
385                 390                 395                 400
Asp His Glu Asp Ile Thr Arg Asp Gln Thr Ser Thr Leu Lys Thr Cys
                405                 410                 415
Leu Pro Leu Glu Leu His Lys Asn Glu Ser Cys Leu Ala Thr Arg Glu
            420                 425                 430
Thr Ser Ser Thr Thr Arg Gly Ser Cys Leu Pro Pro Gln Lys Thr Ser
    435                 440                 445
Leu Met Met Thr Leu Cys Leu Gly Ser Ile Tyr Glu Asp Leu Lys Met
    450                 455                 460
Tyr Gln Thr Glu Phe Gln Ala Ile Asn Ala Ala Leu Gln Asn His Asn
465                 470                 475                 480
His Gln Gln Ile Ile Leu Asp Lys Gly Met Leu Val Ala Ile Asp Glu
                485                 490                 495
Leu Met Gln Ser Leu Asn His Asn Gly Glu Thr Leu Arg Gln Lys Pro
            500                 505                 510
Pro Val Gly Glu Ala Asp Pro Tyr Arg Val Lys Met Lys Leu Cys Ile
            515                 520                 525
Leu Leu His Ala Phe Ser Thr Arg Val Val Thr Ile Asn Arg Val Met
    530                 535                 540
Gly Tyr Leu Ser Ser Ala Gly Gly Gly Ser Gly Gly Gly Gly Ser
545                 550                 555                 560
Gly Gly Gly Gly Ser Asp Lys Thr His Thr Cys Pro Pro Cys Pro Ala
                565                 570                 575
Pro Glu Leu Leu Gly Gly Pro Ser Val Phe Leu Phe Pro Pro Lys Pro
            580                 585                 590
Lys Asp Thr Leu Met Ile Ser Arg Thr Pro Glu Val Thr Cys Val Val
            595                 600                 605
Val Asp Val Ser His Glu Asp Pro Glu Val Lys Phe Asn Trp Tyr Val
            610                 615                 620
Asp Gly Val Glu Val His Asn Ala Lys Thr Lys Pro Arg Glu Glu Gln
625                 630                 635                 640
Tyr Asn Ser Thr Tyr Arg Val Val Ser Val Leu Thr Val Leu His Gln
                645                 650                 655
Asp Trp Leu Asn Gly Lys Glu Tyr Lys Cys Lys Val Ser Asn Lys Ala
            660                 665                 670
Leu Pro Ala Pro Ile Glu Lys Thr Ile Ser Lys Ala Lys Gly Gln Pro
            675                 680                 685
Arg Glu Pro Gln Val Cys Thr Leu Pro Pro Ser Arg Asp Glu Leu Thr
            690                 695                 700
Lys Asn Gln Val Ser Leu Ser Cys Ala Val Lys Gly Phe Tyr Pro Ser
705                 710                 715                 720
Asp Ile Ala Val Glu Trp Glu Ser Asn Gly Gln Pro Glu Asn Asn Tyr
                725                 730                 735
Lys Thr Thr Pro Pro Val Leu Asp Ser Asp Gly Ser Phe Phe Leu Val
            740                 745                 750
```

```
Ser Lys Leu Thr Val Asp Lys Ser Arg Trp Gln Gln Gly Asn Val Phe
        755                 760                 765

Ser Cys Ser Val Met His Glu Ala Leu His Asn His Tyr Thr Gln Lys
        770                 775                 780

Ser Leu Ser Leu Ser Pro Gly Lys
785                 790

<210> SEQ ID NO 44
<211> LENGTH: 780
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 44

Met Ala His Thr Phe Arg Gly Cys Ser Leu Ala Phe Met Phe Ile Ile
1               5                   10                  15

Thr Trp Leu Leu Ile Lys Ala Lys Ile Asp Ala Cys Lys Arg Gly Asp
            20                  25                  30

Val Thr Val Lys Pro Ser His Val Ile Leu Leu Gly Ser Thr Val Asn
        35                  40                  45

Ile Thr Cys Ser Leu Lys Pro Arg Gln Gly Cys Phe His Tyr Ser Arg
    50                  55                  60

Arg Asn Lys Leu Ile Leu Tyr Lys Phe Asp Arg Arg Ile Asn Phe His
65                  70                  75                  80

His Gly His Ser Leu Asn Ser Gln Val Thr Gly Leu Pro Leu Gly Thr
                85                  90                  95

Thr Leu Phe Val Cys Lys Leu Ala Cys Ile Asn Ser Asp Glu Ile Gln
            100                 105                 110

Ile Cys Gly Ala Glu Ile Phe Val Gly Val Ala Pro Glu Gln Pro Gln
        115                 120                 125

Asn Leu Ser Cys Ile Gln Lys Gly Glu Gln Gly Thr Val Ala Cys Thr
    130                 135                 140

Trp Glu Arg Gly Arg Asp Thr His Leu Tyr Thr Glu Tyr Thr Leu Gln
145                 150                 155                 160

Leu Ser Gly Pro Lys Asn Leu Thr Trp Gln Lys Cys Lys Asp Ile
                165                 170                 175

Tyr Cys Asp Tyr Leu Asp Phe Gly Ile Asn Leu Thr Pro Glu Ser Pro
            180                 185                 190

Glu Ser Asn Phe Thr Ala Lys Val Thr Ala Val Asn Ser Leu Gly Ser
        195                 200                 205

Ser Ser Ser Leu Pro Ser Thr Phe Thr Phe Leu Asp Ile Val Arg Pro
    210                 215                 220

Leu Pro Pro Trp Asp Ile Arg Ile Lys Phe Gln Lys Ala Ser Val Ser
225                 230                 235                 240

Arg Cys Thr Leu Tyr Trp Arg Asp Glu Gly Leu Val Leu Leu Asn Arg
                245                 250                 255

Leu Arg Tyr Arg Pro Ser Asn Ser Arg Leu Trp Asn Met Val Asn Val
            260                 265                 270

Thr Lys Ala Lys Gly Arg His Asp Leu Leu Asp Leu Lys Pro Phe Thr
        275                 280                 285

Glu Tyr Glu Phe Gln Ile Ser Ser Lys Leu His Leu Tyr Lys Gly Ser
    290                 295                 300

Trp Ser Asp Trp Ser Glu Ser Leu Arg Ala Gln Thr Pro Glu Glu Glu
305                 310                 315                 320
```

```
Pro Gly Gly Gly Gly Ser Ser Gly Arg Ser Glu Asn Ile Arg Thr Ala
                325                 330                 335

Gly Gly Gly Gly Ser Arg Asn Leu Pro Val Ala Thr Pro Asp Pro Gly
            340                 345                 350

Met Phe Pro Cys Leu His His Ser Gln Asn Leu Leu Arg Ala Val Ser
        355                 360                 365

Asn Met Leu Gln Lys Ala Arg Gln Thr Leu Glu Phe Tyr Pro Cys Thr
    370                 375                 380

Ser Glu Glu Ile Asp His Glu Asp Ile Thr Lys Asp Lys Thr Ser Thr
385                 390                 395                 400

Val Glu Ala Cys Leu Pro Leu Glu Leu Thr Lys Asn Glu Ser Cys Leu
                405                 410                 415

Asn Ser Arg Glu Thr Ser Phe Ile Thr Asn Gly Ser Cys Leu Ala Ser
            420                 425                 430

Arg Lys Thr Ser Phe Met Met Ala Leu Cys Leu Ser Ser Ile Tyr Glu
        435                 440                 445

Asp Leu Lys Met Tyr Gln Val Glu Phe Lys Thr Met Asn Ala Lys Leu
    450                 455                 460

Leu Met Asp Pro Lys Arg Gln Ile Phe Leu Asp Gln Asn Met Leu Ala
465                 470                 475                 480

Val Ile Asp Glu Leu Met Gln Ala Leu Asn Phe Asn Ser Glu Thr Val
                485                 490                 495

Pro Gln Lys Ser Ser Leu Glu Glu Pro Asp Phe Tyr Lys Thr Lys Ile
            500                 505                 510

Lys Leu Cys Ile Leu Leu His Ala Phe Arg Ile Arg Ala Val Thr Ile
        515                 520                 525

Asp Arg Val Met Ser Tyr Leu Asn Ala Ser Gly Gly Gly Gly Ser Gly
    530                 535                 540

Gly Gly Gly Ser Gly Gly Gly Ser Asp Lys Thr His Thr Cys Pro
545                 550                 555                 560

Pro Cys Pro Ala Pro Glu Leu Leu Gly Gly Pro Ser Val Phe Leu Phe
                565                 570                 575

Pro Pro Lys Pro Lys Asp Thr Leu Met Ile Ser Arg Thr Pro Glu Val
            580                 585                 590

Thr Cys Val Val Val Asp Val Ser His Glu Asp Pro Glu Val Lys Phe
        595                 600                 605

Asn Trp Tyr Val Asp Gly Val Glu Val His Asn Ala Lys Thr Lys Pro
    610                 615                 620

Arg Glu Glu Gln Tyr Asn Ser Thr Tyr Arg Val Val Ser Val Leu Thr
625                 630                 635                 640

Val Leu His Gln Asp Trp Leu Asn Gly Lys Glu Tyr Lys Cys Lys Val
                645                 650                 655

Ser Asn Lys Ala Leu Pro Ala Pro Ile Glu Lys Thr Ile Ser Lys Ala
            660                 665                 670

Lys Gly Gln Pro Arg Glu Pro Gln Val Cys Thr Leu Pro Pro Ser Arg
        675                 680                 685

Asp Glu Leu Thr Lys Asn Gln Val Ser Leu Ser Cys Ala Val Lys Gly
    690                 695                 700

Phe Tyr Pro Ser Asp Ile Ala Val Glu Trp Glu Ser Asn Gly Gln Pro
705                 710                 715                 720

Glu Asn Asn Tyr Lys Thr Thr Pro Pro Val Leu Asp Ser Asp Gly Ser
                725                 730                 735
```

```
Phe Phe Leu Val Ser Lys Leu Thr Val Asp Lys Ser Arg Trp Gln Gln
            740                 745                 750

Gly Asn Val Phe Ser Cys Ser Val Met His Glu Ala Leu His Asn His
        755                 760                 765

Tyr Thr Gln Lys Ser Leu Ser Leu Ser Pro Gly Lys
        770                 775                 780

<210> SEQ ID NO 45
<211> LENGTH: 834
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 45

Met Asp Met Met Gly Leu Ala Gly Thr Ser Lys His Ile Thr Phe Leu
1               5                   10                  15

Leu Leu Cys Gln Leu Gly Ala Ser Gly Pro Gly Asp Gly Cys Cys Val
            20                  25                  30

Glu Lys Thr Ser Phe Pro Glu Gly Ala Ser Gly Ser Pro Leu Gly Pro
        35                  40                  45

Arg Asn Leu Ser Cys Tyr Arg Val Ser Lys Thr Asp Tyr Glu Cys Ser
    50                  55                  60

Trp Gln Tyr Asp Gly Pro Glu Asp Asn Val Ser His Val Leu Trp Cys
65                  70                  75                  80

Cys Phe Val Pro Pro Asn His Thr His Thr Gly Gln Glu Arg Cys Arg
                85                  90                  95

Tyr Phe Ser Ser Gly Pro Asp Arg Thr Val Gln Phe Trp Glu Gln Asp
            100                 105                 110

Gly Ile Pro Val Leu Ser Lys Val Asn Phe Trp Val Glu Ser Arg Leu
        115                 120                 125

Gly Asn Arg Thr Met Lys Ser Gln Lys Ile Ser Gln Tyr Leu Tyr Asn
    130                 135                 140

Trp Thr Lys Thr Thr Pro Pro Leu Gly His Ile Lys Val Ser Gln Ser
145                 150                 155                 160

His Arg Gln Leu Arg Met Asp Trp Asn Val Ser Glu Glu Ala Gly Ala
                165                 170                 175

Glu Val Gln Phe Arg Arg Arg Met Pro Thr Thr Asn Trp Thr Leu Gly
            180                 185                 190

Asp Cys Gly Pro Gln Val Asn Ser Gly Ser Gly Val Leu Gly Asp Ile
        195                 200                 205

Arg Gly Ser Met Ser Glu Ser Cys Leu Cys Pro Ser Glu Asn Met Ala
    210                 215                 220

Gln Glu Ile Gln Ile Arg Arg Arg Arg Leu Ser Ser Gly Ala Pro
225                 230                 235                 240

Gly Gly Pro Trp Ser Asp Trp Ser Met Pro Val Cys Val Pro Pro Glu
                245                 250                 255

Val Leu Pro Gly Gly Gly Gly Ser Ser Gly Arg Ser Glu Asn Ile Arg
            260                 265                 270

Thr Ala Gly Gly Gly Gly Ser Met Trp Glu Leu Glu Lys Asp Val Tyr
        275                 280                 285

Val Val Glu Val Asp Trp Thr Pro Asp Ala Pro Gly Glu Thr Val Asn
    290                 295                 300

Leu Thr Cys Asp Thr Pro Glu Glu Asp Asp Ile Thr Trp Thr Ser Asp
305                 310                 315                 320
```

```
Gln Arg His Gly Val Ile Gly Ser Gly Lys Thr Leu Thr Ile Thr Val
                325                 330                 335

Lys Glu Phe Leu Asp Ala Gly Gln Tyr Thr Cys His Lys Gly Gly Glu
            340                 345                 350

Thr Leu Ser His Ser His Leu Leu His Lys Lys Glu Asn Gly Ile
        355                 360                 365

Trp Ser Thr Glu Ile Leu Lys Asn Phe Lys Asn Lys Thr Phe Leu Lys
    370                 375                 380

Cys Glu Ala Pro Asn Tyr Ser Gly Arg Phe Thr Cys Ser Trp Leu Val
385                 390                 395                 400

Gln Arg Asn Met Asp Leu Lys Phe Asn Ile Lys Ser Ser Ser Ser Ser
                405                 410                 415

Pro Asp Ser Arg Ala Val Thr Cys Gly Met Ala Ser Leu Ser Ala Glu
            420                 425                 430

Lys Val Thr Leu Asp Gln Arg Asp Tyr Glu Lys Tyr Ser Val Ser Cys
            435                 440                 445

Gln Glu Asp Val Thr Cys Pro Thr Ala Glu Glu Thr Leu Pro Ile Glu
        450                 455                 460

Leu Ala Leu Glu Ala Arg Gln Gln Asn Lys Tyr Glu Asn Tyr Ser Thr
465                 470                 475                 480

Ser Phe Phe Ile Arg Asp Ile Ile Lys Pro Asp Pro Lys Asn Leu
                485                 490                 495

Gln Met Lys Pro Leu Lys Asn Ser Gln Val Glu Val Ser Trp Glu Tyr
            500                 505                 510

Pro Asp Ser Trp Ser Thr Pro His Ser Tyr Phe Ser Leu Lys Phe Phe
            515                 520                 525

Val Arg Ile Gln Arg Lys Lys Glu Lys Met Lys Glu Thr Glu Glu Gly
            530                 535                 540

Cys Asn Gln Lys Gly Ala Phe Leu Val Glu Lys Thr Ser Thr Glu Val
545                 550                 555                 560

Gln Cys Lys Gly Gly Asn Val Cys Val Gln Ala Gln Asp Arg Tyr Tyr
                565                 570                 575

Asn Ser Ser Cys Ser Lys Trp Ala Cys Val Pro Cys Arg Val Arg Ser
            580                 585                 590

Gly Gly Gly Gly Ser Gly Gly Gly Ser Gly Gly Gly Gly Ser Asp
            595                 600                 605

Lys Thr His Thr Cys Pro Pro Cys Pro Ala Pro Glu Leu Leu Gly Gly
        610                 615                 620

Pro Ser Val Phe Leu Phe Pro Pro Lys Pro Lys Asp Thr Leu Met Ile
625                 630                 635                 640

Ser Arg Thr Pro Glu Val Thr Cys Val Val Val Asp Val Ser His Glu
                645                 650                 655

Asp Pro Glu Val Lys Phe Asn Trp Tyr Val Asp Gly Val Glu Val His
            660                 665                 670

Asn Ala Lys Thr Lys Pro Arg Glu Glu Gln Tyr Asn Ser Thr Tyr Arg
        675                 680                 685

Val Val Ser Val Leu Thr Val Leu His Gln Asp Trp Leu Asn Gly Lys
        690                 695                 700

Glu Tyr Lys Cys Lys Val Ser Asn Lys Ala Leu Pro Ala Pro Ile Glu
705                 710                 715                 720

Lys Thr Ile Ser Lys Ala Lys Gly Gln Pro Arg Glu Pro Gln Val Tyr
                725                 730                 735
```

```
Thr Leu Pro Pro Cys Arg Asp Glu Leu Thr Lys Asn Gln Val Ser Leu
            740                 745                 750

Trp Cys Leu Val Lys Gly Phe Tyr Pro Ser Asp Ile Ala Val Glu Trp
        755                 760                 765

Glu Ser Asn Gly Gln Pro Glu Asn Asn Tyr Lys Thr Thr Pro Pro Val
    770                 775                 780

Leu Asp Ser Asp Gly Ser Phe Phe Leu Tyr Ser Lys Leu Thr Val Asp
785                 790                 795                 800

Lys Ser Arg Trp Gln Gln Gly Asn Val Phe Ser Cys Ser Val Met His
                805                 810                 815

Glu Ala Leu His Asn His Tyr Thr Gln Lys Ser Leu Ser Leu Ser Pro
            820                 825                 830

Gly Lys

<210> SEQ ID NO 46
<211> LENGTH: 802
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 46

Met Glu Pro Leu Val Thr Trp Val Val Pro Leu Leu Phe Leu Phe Leu
1               5                   10                  15

Leu Ser Arg Gln Gly Ala Ala Cys Arg Thr Ser Glu Cys Cys Phe Gln
            20                  25                  30

Asp Pro Pro Tyr Pro Asp Ala Asp Ser Gly Ser Ala Ser Gly Pro Arg
        35                  40                  45

Asp Leu Arg Cys Tyr Arg Ile Ser Ser Asp Arg Tyr Glu Cys Ser Trp
    50                  55                  60

Gln Tyr Glu Gly Pro Thr Ala Gly Val Ser His Phe Leu Arg Cys Cys
65                  70                  75                  80

Leu Ser Ser Gly Arg Cys Cys Tyr Phe Ala Ala Gly Ser Ala Thr Arg
                85                  90                  95

Leu Gln Phe Ser Asp Gln Ala Gly Val Ser Val Leu Tyr Thr Val Thr
            100                 105                 110

Leu Trp Val Glu Ser Trp Ala Arg Asn Gln Thr Glu Lys Ser Pro Glu
        115                 120                 125

Val Thr Leu Gln Leu Tyr Asn Ser Val Lys Tyr Glu Pro Pro Leu Gly
    130                 135                 140

Asp Ile Lys Val Ser Lys Leu Ala Gly Gln Leu Arg Met Glu Trp Glu
145                 150                 155                 160

Thr Pro Asp Asn Gln Val Gly Ala Glu Val Gln Phe Arg His Arg Thr
                165                 170                 175

Pro Ser Ser Pro Trp Lys Leu Gly Asp Cys Gly Pro Gln Asp Asp Asp
            180                 185                 190

Thr Glu Ser Cys Leu Cys Pro Leu Glu Met Asn Val Ala Gln Glu Phe
        195                 200                 205

Gln Leu Arg Arg Arg Leu Gly Ser Gln Gly Ser Ser Trp Ser Lys
    210                 215                 220

Trp Ser Ser Pro Val Cys Val Pro Pro Glu Asn Gly Gly Gly Ser
225                 230                 235                 240

Ser Gly Arg Ser Glu Asn Ile Arg Thr Ala Gly Gly Gly Ser Trp
                245                 250                 255
```

-continued

Glu Leu Lys Lys Asp Val Tyr Val Glu Leu Asp Trp Tyr Pro Asp
                260                 265                 270

Ala Pro Gly Glu Met Val Val Leu Thr Cys Asp Thr Pro Glu Glu Asp
        275                 280                 285

Gly Ile Thr Trp Thr Leu Asp Gln Ser Ser Glu Val Leu Gly Ser Gly
    290                 295                 300

Lys Thr Leu Thr Ile Gln Val Lys Glu Phe Gly Asp Ala Gly Gln Tyr
305                 310                 315                 320

Thr Cys His Lys Gly Gly Glu Val Leu Ser His Ser Leu Leu Leu Leu
                325                 330                 335

His Lys Lys Glu Asp Gly Ile Trp Ser Thr Asp Ile Leu Lys Asp Gln
            340                 345                 350

Lys Glu Pro Lys Asn Lys Thr Phe Leu Arg Cys Glu Ala Lys Asn Tyr
        355                 360                 365

Ser Gly Arg Phe Thr Cys Trp Trp Leu Thr Thr Ile Ser Thr Asp Leu
    370                 375                 380

Thr Phe Ser Val Lys Ser Ser Arg Gly Ser Ser Asp Pro Gln Gly Val
385                 390                 395                 400

Thr Cys Gly Ala Ala Thr Leu Ser Ala Glu Arg Val Arg Gly Asp Asn
                405                 410                 415

Lys Glu Tyr Glu Tyr Ser Val Glu Cys Gln Glu Asp Ser Ala Cys Pro
            420                 425                 430

Ala Ala Glu Glu Ser Leu Pro Ile Glu Val Met Val Asp Ala Val His
        435                 440                 445

Lys Leu Lys Tyr Glu Asn Tyr Thr Ser Ser Phe Phe Ile Arg Asp Ile
    450                 455                 460

Ile Lys Pro Asp Pro Pro Lys Asn Leu Gln Leu Lys Pro Leu Lys Asn
465                 470                 475                 480

Ser Arg Gln Val Glu Val Ser Trp Glu Tyr Pro Asp Thr Trp Ser Thr
                485                 490                 495

Pro His Ser Tyr Phe Ser Leu Thr Phe Cys Val Gln Val Gln Gly Lys
            500                 505                 510

Ser Lys Arg Glu Lys Lys Asp Arg Val Phe Thr Asp Lys Thr Ser Ala
        515                 520                 525

Thr Val Ile Cys Arg Lys Asn Ala Ser Ile Ser Val Arg Ala Gln Asp
    530                 535                 540

Arg Tyr Tyr Ser Ser Ser Trp Ser Glu Trp Ala Ser Val Pro Cys Ser
545                 550                 555                 560

Gly Gly Gly Gly Ser Gly Gly Gly Ser Gly Gly Gly Gly Ser Asp
                565                 570                 575

Lys Thr His Thr Cys Pro Pro Cys Pro Ala Pro Glu Leu Leu Gly Gly
            580                 585                 590

Pro Ser Val Phe Leu Phe Pro Pro Lys Pro Lys Asp Thr Leu Met Ile
        595                 600                 605

Ser Arg Thr Pro Glu Val Thr Cys Val Val Val Asp Val Ser His Glu
    610                 615                 620

Asp Pro Glu Val Lys Phe Asn Trp Tyr Val Asp Gly Val Glu Val His
625                 630                 635                 640

Asn Ala Lys Thr Lys Pro Arg Glu Glu Gln Tyr Asn Ser Thr Tyr Arg
                645                 650                 655

Val Val Ser Val Leu Thr Val Leu His Gln Asp Trp Leu Asn Gly Lys
            660                 665                 670

Glu Tyr Lys Cys Lys Val Ser Asn Lys Ala Leu Pro Ala Pro Ile Glu

```
                675                 680                 685
Lys Thr Ile Ser Lys Ala Lys Gly Gln Pro Arg Glu Pro Gln Val Tyr
    690                 695                 700

Thr Leu Pro Pro Cys Arg Asp Glu Leu Thr Lys Asn Gln Val Ser Leu
705                 710                 715                 720

Trp Cys Leu Val Lys Gly Phe Tyr Pro Ser Asp Ile Ala Val Glu Trp
                725                 730                 735

Glu Ser Asn Gly Gln Pro Glu Asn Asn Tyr Lys Thr Thr Pro Pro Val
            740                 745                 750

Leu Asp Ser Asp Gly Ser Phe Phe Leu Tyr Ser Lys Leu Thr Val Asp
        755                 760                 765

Lys Ser Arg Trp Gln Gln Gly Asn Val Phe Ser Cys Ser Val Met His
    770                 775                 780

Glu Ala Leu His Asn His Tyr Thr Gln Lys Ser Leu Ser Leu Ser Pro
785                 790                 795                 800

Gly Lys

<210> SEQ ID NO 47
<211> LENGTH: 457
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 47

Met Cys Gln Ser Arg Tyr Leu Leu Phe Leu Ala Thr Leu Ala Leu Leu
1               5                   10                  15

Asn His Leu Ser Leu Ala Arg Val Ile Pro Val Ser Gly Pro Ala Arg
            20                  25                  30

Cys Leu Ser Gln Ser Arg Asn Leu Leu Lys Thr Thr Asp Asp Met Val
        35                  40                  45

Lys Thr Ala Arg Glu Lys Leu Lys His Tyr Ser Cys Thr Ala Glu Asp
    50                  55                  60

Ile Asp His Glu Asp Ile Thr Arg Asp Gln Thr Ser Thr Leu Lys Thr
65                  70                  75                  80

Cys Leu Pro Leu Glu Leu His Lys Asn Glu Ser Cys Leu Ala Thr Arg
                85                  90                  95

Glu Thr Ser Ser Thr Thr Arg Gly Ser Cys Leu Pro Pro Gln Lys Thr
            100                 105                 110

Ser Leu Met Met Thr Leu Cys Leu Gly Ser Ile Tyr Glu Asp Leu Lys
        115                 120                 125

Met Tyr Gln Thr Glu Phe Gln Ala Ile Asn Ala Ala Leu Gln Asn His
    130                 135                 140

Asn His Gln Gln Ile Ile Leu Asp Lys Gly Met Leu Val Ala Ile Asp
145                 150                 155                 160

Glu Leu Met Gln Ser Leu Asn His Asn Gly Glu Thr Leu Arg Gln Lys
                165                 170                 175

Pro Pro Val Gly Glu Ala Asp Pro Tyr Arg Val Lys Met Lys Leu Cys
            180                 185                 190

Ile Leu Leu His Ala Phe Ser Thr Arg Val Val Thr Ile Asn Arg Val
        195                 200                 205

Met Gly Tyr Leu Ser Ser Ala Gly Gly Gly Ser Gly Gly Gly Gly
    210                 215                 220

Ser Gly Gly Gly Gly Ser Asp Lys Thr His Thr Cys Pro Pro Cys Pro
```

```
                225                 230                 235                 240
Ala Pro Glu Leu Leu Gly Gly Pro Ser Val Phe Leu Phe Pro Pro Lys
                    245                 250                 255

Pro Lys Asp Thr Leu Met Ile Ser Arg Thr Pro Glu Val Thr Cys Val
                260                 265                 270

Val Val Asp Val Ser His Glu Asp Pro Glu Val Lys Phe Asn Trp Tyr
            275                 280                 285

Val Asp Gly Val Glu Val His Asn Ala Lys Thr Lys Pro Arg Glu Glu
        290                 295                 300

Gln Tyr Asn Ser Thr Tyr Arg Val Val Ser Val Leu Thr Val Leu His
305                 310                 315                 320

Gln Asp Trp Leu Asn Gly Lys Glu Tyr Lys Cys Lys Val Ser Asn Lys
                325                 330                 335

Ala Leu Pro Ala Pro Ile Glu Lys Thr Ile Ser Lys Ala Lys Gly Gln
            340                 345                 350

Pro Arg Glu Pro Gln Val Cys Thr Leu Pro Pro Ser Arg Asp Glu Leu
        355                 360                 365

Thr Lys Asn Gln Val Ser Leu Ser Cys Ala Val Lys Gly Phe Tyr Pro
370                 375                 380

Ser Asp Ile Ala Val Glu Trp Glu Ser Asn Gly Gln Pro Glu Asn Asn
385                 390                 395                 400

Tyr Lys Thr Thr Pro Pro Val Leu Asp Ser Asp Gly Ser Phe Phe Leu
                405                 410                 415

Val Ser Lys Leu Thr Val Asp Lys Ser Arg Trp Gln Gln Gly Asn Val
            420                 425                 430

Phe Ser Cys Ser Val Met His Glu Ala Leu His Asn His Tyr Thr Gln
        435                 440                 445

Lys Ser Leu Ser Leu Ser Pro Gly Lys
    450                 455

<210> SEQ ID NO 48
<211> LENGTH: 461
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 48

Met Cys Pro Ala Arg Ser Leu Leu Leu Val Ala Thr Leu Val Leu Leu
1               5                   10                  15

Asp His Leu Ser Leu Ala Arg Asn Leu Pro Val Ala Thr Pro Asp Pro
                20                  25                  30

Gly Met Phe Pro Cys Leu His His Ser Gln Asn Leu Leu Arg Ala Val
            35                  40                  45

Ser Asn Met Leu Gln Lys Ala Arg Gln Thr Leu Glu Phe Tyr Pro Cys
        50                  55                  60

Thr Ser Glu Glu Ile Asp His Glu Asp Ile Thr Lys Asp Lys Thr Ser
65                  70                  75                  80

Thr Val Glu Ala Cys Leu Pro Leu Glu Leu Thr Lys Asn Glu Ser Cys
                85                  90                  95

Leu Asn Ser Arg Glu Thr Ser Phe Ile Thr Asn Gly Ser Cys Leu Ala
            100                 105                 110

Ser Arg Lys Thr Ser Phe Met Met Ala Leu Cys Leu Ser Ser Ile Tyr
        115                 120                 125
```

-continued

Glu Asp Leu Lys Met Tyr Gln Val Glu Phe Lys Thr Met Asn Ala Lys
            130                 135                 140

Leu Leu Met Asp Pro Lys Arg Gln Ile Phe Leu Asp Gln Asn Met Leu
145                 150                 155                 160

Ala Val Ile Asp Glu Leu Met Gln Ala Leu Asn Phe Asn Ser Glu Thr
                165                 170                 175

Val Pro Gln Lys Ser Ser Leu Glu Glu Pro Asp Phe Tyr Lys Thr Lys
            180                 185                 190

Ile Lys Leu Cys Ile Leu Leu His Ala Phe Arg Ile Arg Ala Val Thr
        195                 200                 205

Ile Asp Arg Val Met Ser Tyr Leu Asn Ala Ser Gly Gly Gly Gly Ser
210                 215                 220

Gly Gly Gly Ser Gly Gly Gly Ser Asp Lys Thr His Thr Cys
225                 230                 235                 240

Pro Pro Cys Pro Ala Pro Glu Leu Leu Gly Gly Pro Ser Val Phe Leu
                245                 250                 255

Phe Pro Pro Lys Pro Lys Asp Thr Leu Met Ile Ser Arg Thr Pro Glu
            260                 265                 270

Val Thr Cys Val Val Val Asp Val Ser His Glu Asp Pro Glu Val Lys
        275                 280                 285

Phe Asn Trp Tyr Val Asp Gly Val Glu Val His Asn Ala Lys Thr Lys
290                 295                 300

Pro Arg Glu Glu Gln Tyr Asn Ser Thr Tyr Arg Val Val Ser Val Leu
305                 310                 315                 320

Thr Val Leu His Gln Asp Trp Leu Asn Gly Lys Glu Tyr Lys Cys Lys
                325                 330                 335

Val Ser Asn Lys Ala Leu Pro Ala Pro Ile Glu Lys Thr Ile Ser Lys
            340                 345                 350

Ala Lys Gly Gln Pro Arg Glu Pro Gln Val Cys Thr Leu Pro Pro Ser
        355                 360                 365

Arg Asp Glu Leu Thr Lys Asn Gln Val Ser Leu Ser Cys Ala Val Lys
370                 375                 380

Gly Phe Tyr Pro Ser Asp Ile Ala Val Glu Trp Glu Ser Asn Gly Gln
385                 390                 395                 400

Pro Glu Asn Asn Tyr Lys Thr Thr Pro Pro Val Leu Asp Ser Asp Gly
                405                 410                 415

Ser Phe Phe Leu Val Ser Lys Leu Thr Val Asp Lys Ser Arg Trp Gln
            420                 425                 430

Gln Gly Asn Val Phe Ser Cys Ser Val Met His Glu Ala Leu His Asn
        435                 440                 445

His Tyr Thr Gln Lys Ser Leu Ser Leu Ser Pro Gly Lys
450                 455                 460

<210> SEQ ID NO 49
<211> LENGTH: 577
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 49

Met Cys Pro Gln Lys Leu Thr Ile Ser Trp Phe Ala Ile Val Leu Leu
1               5                   10                  15

Val Ser Pro Leu Met Ala Met Trp Glu Leu Glu Lys Asp Val Tyr Val
            20                  25                  30

```
Val Glu Val Asp Trp Thr Pro Asp Ala Pro Gly Glu Thr Val Asn Leu
         35                  40                  45

Thr Cys Asp Thr Pro Glu Glu Asp Ile Thr Trp Thr Ser Asp Gln
 50                  55                  60

Arg His Gly Val Ile Gly Ser Gly Lys Thr Leu Thr Ile Thr Val Lys
 65                  70                  75                  80

Glu Phe Leu Asp Ala Gly Gln Tyr Thr Cys His Lys Gly Gly Glu Thr
                 85                  90                  95

Leu Ser His Ser His Leu Leu Leu His Lys Lys Glu Asn Gly Ile Trp
                 100                 105                 110

Ser Thr Glu Ile Leu Lys Asn Phe Lys Asn Lys Thr Phe Leu Lys Cys
             115                 120                 125

Glu Ala Pro Asn Tyr Ser Gly Arg Phe Thr Cys Ser Trp Leu Val Gln
 130                 135                 140

Arg Asn Met Asp Leu Lys Phe Asn Ile Lys Ser Ser Ser Ser Ser Pro
145                 150                 155                 160

Asp Ser Arg Ala Val Thr Cys Gly Met Ala Ser Leu Ser Ala Glu Lys
                 165                 170                 175

Val Thr Leu Asp Gln Arg Asp Tyr Glu Lys Tyr Ser Val Ser Cys Gln
                 180                 185                 190

Glu Asp Val Thr Cys Pro Thr Ala Glu Glu Thr Leu Pro Ile Glu Leu
             195                 200                 205

Ala Leu Glu Ala Arg Gln Gln Asn Lys Tyr Glu Asn Tyr Ser Thr Ser
 210                 215                 220

Phe Phe Ile Arg Asp Ile Ile Lys Pro Asp Pro Lys Asn Leu Gln
225                 230                 235                 240

Met Lys Pro Leu Lys Asn Ser Gln Val Glu Val Ser Trp Glu Tyr Pro
                 245                 250                 255

Asp Ser Trp Ser Thr Pro His Ser Tyr Phe Ser Leu Lys Phe Phe Val
                 260                 265                 270

Arg Ile Gln Arg Lys Lys Glu Lys Met Lys Glu Thr Glu Glu Gly Cys
             275                 280                 285

Asn Gln Lys Gly Ala Phe Leu Val Glu Lys Thr Ser Thr Glu Val Gln
 290                 295                 300

Cys Lys Gly Gly Asn Val Cys Val Gln Ala Gln Asp Arg Tyr Tyr Asn
305                 310                 315                 320

Ser Ser Cys Ser Lys Trp Ala Cys Val Pro Cys Arg Val Arg Ser Gly
                 325                 330                 335

Gly Gly Gly Ser Gly Gly Gly Gly Ser Gly Gly Gly Gly Ser Asp Lys
                 340                 345                 350

Thr His Thr Cys Pro Pro Cys Pro Ala Pro Glu Leu Leu Gly Gly Pro
                 355                 360                 365

Ser Val Phe Leu Phe Pro Pro Lys Pro Lys Asp Thr Leu Met Ile Ser
 370                 375                 380

Arg Thr Pro Glu Val Thr Cys Val Val Val Asp Val Ser His Glu Asp
385                 390                 395                 400

Pro Glu Val Lys Phe Asn Trp Tyr Val Asp Gly Val Glu Val His Asn
                 405                 410                 415

Ala Lys Thr Lys Pro Arg Glu Glu Gln Tyr Asn Ser Thr Tyr Arg Val
                 420                 425                 430

Val Ser Val Leu Thr Val Leu His Gln Asp Trp Leu Asn Gly Lys Glu
             435                 440                 445
```

Tyr Lys Cys Lys Val Ser Asn Lys Ala Leu Pro Ala Pro Ile Glu Lys
450                 455                 460

Thr Ile Ser Lys Ala Lys Gly Gln Pro Arg Glu Pro Gln Val Tyr Thr
465                 470                 475                 480

Leu Pro Pro Cys Arg Asp Glu Leu Thr Lys Asn Gln Val Ser Leu Trp
                485                 490                 495

Cys Leu Val Lys Gly Phe Tyr Pro Ser Asp Ile Ala Val Glu Trp Glu
                500                 505                 510

Ser Asn Gly Gln Pro Glu Asn Asn Tyr Lys Thr Thr Pro Pro Val Leu
                515                 520                 525

Asp Ser Asp Gly Ser Phe Phe Leu Tyr Ser Lys Leu Thr Val Asp Lys
530                 535                 540

Ser Arg Trp Gln Gln Gly Asn Val Phe Ser Cys Ser Val Met His Glu
545                 550                 555                 560

Ala Leu His Asn His Tyr Thr Gln Lys Ser Leu Ser Leu Ser Pro Gly
                565                 570                 575

Lys

<210> SEQ ID NO 50
<211> LENGTH: 570
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 50

Met Cys His Gln Gln Leu Val Ile Ser Trp Phe Ser Leu Val Phe Leu
1               5                   10                  15

Ala Ser Pro Leu Val Ala Ile Trp Glu Leu Lys Lys Asp Val Tyr Val
                20                  25                  30

Val Glu Leu Asp Trp Tyr Pro Asp Ala Pro Gly Glu Met Val Val Leu
                35                  40                  45

Thr Cys Asp Thr Pro Glu Glu Asp Gly Ile Thr Trp Thr Leu Asp Gln
50                  55                  60

Ser Ser Glu Val Leu Gly Ser Gly Lys Thr Leu Thr Ile Gln Val Lys
65                  70                  75                  80

Glu Phe Gly Asp Ala Gly Gln Tyr Thr Cys His Lys Gly Gly Glu Val
                85                  90                  95

Leu Ser His Ser Leu Leu Leu Leu His Lys Lys Glu Asp Gly Ile Trp
                100                 105                 110

Ser Thr Asp Ile Leu Lys Asp Gln Lys Glu Pro Lys Asn Lys Thr Phe
                115                 120                 125

Leu Arg Cys Glu Ala Lys Asn Tyr Ser Gly Arg Phe Thr Cys Trp Trp
130                 135                 140

Leu Thr Thr Ile Ser Thr Asp Leu Thr Phe Ser Val Lys Ser Ser Arg
145                 150                 155                 160

Gly Ser Ser Asp Pro Gln Gly Val Thr Cys Gly Ala Ala Thr Leu Ser
                165                 170                 175

Ala Glu Arg Val Arg Gly Asp Asn Lys Glu Tyr Glu Tyr Ser Val Glu
                180                 185                 190

Cys Gln Glu Asp Ser Ala Cys Pro Ala Ala Glu Glu Ser Leu Pro Ile
                195                 200                 205

Glu Val Met Val Asp Ala Val His Lys Leu Lys Tyr Glu Asn Tyr Thr
210                 215                 220

Ser Ser Phe Phe Ile Arg Asp Ile Ile Lys Pro Asp Pro Lys Asn
225                 230                 235                 240

Leu Gln Leu Lys Pro Leu Lys Asn Ser Arg Gln Val Glu Val Ser Trp
            245                 250                 255

Glu Tyr Pro Asp Thr Trp Ser Thr Pro His Ser Tyr Phe Ser Leu Thr
            260                 265                 270

Phe Cys Val Gln Val Gln Gly Lys Ser Lys Arg Glu Lys Lys Asp Arg
        275                 280                 285

Val Phe Thr Asp Lys Thr Ser Ala Thr Val Ile Cys Arg Lys Asn Ala
    290                 295                 300

Ser Ile Ser Val Arg Ala Gln Asp Arg Tyr Tyr Ser Ser Ser Trp Ser
305                 310                 315                 320

Glu Trp Ala Ser Val Pro Cys Ser Gly Gly Gly Ser Gly Gly Gly
            325                 330                 335

Gly Ser Gly Gly Gly Ser Asp Lys Thr His Thr Cys Pro Pro Cys
            340                 345                 350

Pro Ala Pro Glu Leu Leu Gly Gly Pro Ser Val Phe Leu Phe Pro Pro
            355                 360                 365

Lys Pro Lys Asp Thr Leu Met Ile Ser Arg Thr Pro Glu Val Thr Cys
370                 375                 380

Val Val Val Asp Val Ser His Glu Asp Pro Glu Val Lys Phe Asn Trp
385                 390                 395                 400

Tyr Val Asp Gly Val Glu Val His Asn Ala Lys Thr Lys Pro Arg Glu
                405                 410                 415

Glu Gln Tyr Asn Ser Thr Tyr Arg Val Val Ser Val Leu Thr Val Leu
            420                 425                 430

His Gln Asp Trp Leu Asn Gly Lys Glu Tyr Lys Cys Lys Val Ser Asn
        435                 440                 445

Lys Ala Leu Pro Ala Pro Ile Glu Lys Thr Ile Ser Lys Ala Lys Gly
    450                 455                 460

Gln Pro Arg Glu Pro Gln Val Tyr Thr Leu Pro Pro Cys Arg Asp Glu
465                 470                 475                 480

Leu Thr Lys Asn Gln Val Ser Leu Trp Cys Leu Val Lys Gly Phe Tyr
            485                 490                 495

Pro Ser Asp Ile Ala Val Glu Trp Glu Ser Asn Gly Gln Pro Glu Asn
            500                 505                 510

Asn Tyr Lys Thr Thr Pro Pro Val Leu Asp Ser Asp Gly Ser Phe Phe
        515                 520                 525

Leu Tyr Ser Lys Leu Thr Val Asp Lys Ser Arg Trp Gln Gln Gly Asn
    530                 535                 540

Val Phe Ser Cys Ser Val Met His Glu Ala Leu His Asn His Tyr Thr
545                 550                 555                 560

Gln Lys Ser Leu Ser Leu Ser Pro Gly Lys
            565                 570

<210> SEQ ID NO 51
<211> LENGTH: 792
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 51

Met Ala Gln Thr Val Arg Glu Cys Ser Leu Ala Leu Leu Phe Leu Phe
1               5                   10                  15

```
Met Trp Leu Leu Ile Lys Ala Asn Ile Asp Val Cys Lys Leu Gly Thr
            20                  25                  30

Val Thr Val Gln Pro Ala Pro Val Ile Pro Leu Gly Ser Ala Ala Asn
        35                  40                  45

Ile Ser Cys Ser Leu Asn Pro Lys Gln Gly Cys Ser His Tyr Pro Ser
50                  55                  60

Ser Asn Glu Leu Ile Leu Leu Lys Phe Val Asn Asp Val Leu Val Glu
65                  70                  75                  80

Asn Leu His Gly Lys Lys Val His Asp His Thr Gly His Ser Ser Thr
                85                  90                  95

Phe Gln Val Thr Asn Leu Ser Leu Gly Met Thr Leu Phe Val Cys Lys
            100                 105                 110

Leu Asn Cys Ser Asn Ser Gln Lys Lys Pro Pro Val Pro Val Cys Gly
            115                 120                 125

Val Glu Ile Ser Val Gly Val Ala Pro Glu Pro Pro Gln Asn Ile Ser
        130                 135                 140

Cys Val Gln Glu Gly Glu Asn Gly Thr Val Ala Cys Ser Trp Asn Ser
145                 150                 155                 160

Gly Lys Val Thr Tyr Leu Lys Thr Asn Tyr Thr Leu Gln Leu Ser Gly
                165                 170                 175

Pro Asn Asn Leu Thr Cys Gln Lys Gln Cys Phe Ser Asp Asn Arg Gln
            180                 185                 190

Asn Cys Asn Arg Leu Asp Leu Gly Ile Asn Leu Ser Pro Asp Leu Ala
        195                 200                 205

Glu Ser Arg Phe Ile Val Arg Val Thr Ala Ile Asn Asp Leu Gly Asn
    210                 215                 220

Ser Ser Ser Leu Pro His Thr Phe Thr Phe Leu Asp Ile Val Ile Pro
225                 230                 235                 240

Leu Pro Pro Trp Asp Ile Arg Ile Asn Phe Leu Asn Ala Ser Gly Ser
                245                 250                 255

Arg Gly Thr Leu Gln Trp Glu Asp Glu Gly Gln Val Val Leu Asn Gln
            260                 265                 270

Leu Arg Tyr Gln Pro Leu Asn Ser Thr Ser Trp Asn Met Val Asn Ala
        275                 280                 285

Thr Asn Ala Lys Gly Lys Tyr Asp Leu Arg Asp Leu Arg Pro Phe Thr
    290                 295                 300

Glu Tyr Glu Phe Gln Ile Ser Ser Lys Leu His Leu Ser Gly Gly Ser
305                 310                 315                 320

Trp Ser Asn Trp Ser Glu Ser Leu Arg Thr Arg Thr Pro Glu Glu Glu
                325                 330                 335

Pro Gly Gly Gly Gly Ser Ser Gly Arg Ser Glu Asn Ile Arg Thr Ala
            340                 345                 350

Gly Gly Gly Gly Ser Arg Val Ile Pro Val Ser Gly Pro Ala Arg Cys
        355                 360                 365

Leu Ser Gln Ser Arg Asn Leu Leu Lys Thr Thr Asp Asp Met Val Lys
    370                 375                 380

Thr Ala Arg Glu Lys Leu Lys His Tyr Ser Cys Thr Ala Glu Asp Ile
385                 390                 395                 400

Asp His Glu Asp Ile Thr Arg Asp Gln Thr Ser Thr Leu Lys Thr Cys
                405                 410                 415

Leu Pro Leu Glu Leu His Lys Asn Glu Ser Cys Leu Ala Thr Arg Glu
            420                 425                 430
```

```
Thr Ser Ser Thr Thr Arg Gly Ser Cys Leu Pro Pro Gln Lys Thr Ser
            435                 440                 445

Leu Met Met Thr Leu Cys Leu Gly Ser Ile Tyr Glu Asp Leu Lys Met
450                 455                 460

Tyr Gln Thr Glu Phe Gln Ala Ile Asn Ala Ala Leu Gln Asn His Asn
465                 470                 475                 480

His Gln Gln Ile Ile Leu Asp Lys Gly Met Leu Val Ala Ile Asp Glu
                485                 490                 495

Leu Met Gln Ser Leu Asn His Asn Gly Glu Thr Leu Arg Gln Lys Pro
                500                 505                 510

Pro Val Gly Glu Ala Asp Pro Tyr Arg Val Lys Met Lys Leu Cys Ile
            515                 520                 525

Leu Leu His Ala Phe Ser Thr Arg Val Val Thr Ile Asn Arg Val Met
            530                 535                 540

Gly Tyr Leu Ser Ser Ala Gly Gly Gly Ser Gly Gly Gly Gly Ser
545                 550                 555                 560

Gly Gly Gly Gly Ser Asp Lys Thr His Thr Cys Pro Pro Cys Pro Ala
                565                 570                 575

Pro Glu Leu Leu Gly Gly Pro Ser Val Phe Leu Phe Pro Pro Lys Pro
            580                 585                 590

Lys Asp Thr Leu Met Ile Ser Arg Thr Pro Glu Val Thr Cys Val Val
            595                 600                 605

Val Asp Val Ser His Glu Asp Pro Glu Val Lys Phe Asn Trp Tyr Val
            610                 615                 620

Asp Gly Val Glu Val His Asn Ala Lys Thr Lys Pro Arg Glu Glu Gln
625                 630                 635                 640

Tyr Asn Ser Thr Tyr Arg Val Val Ser Val Leu Thr Val Leu His Gln
                645                 650                 655

Asp Trp Leu Asn Gly Lys Glu Tyr Lys Cys Lys Val Ser Asn Lys Ala
                660                 665                 670

Leu Pro Ala Pro Ile Glu Lys Thr Ile Ser Lys Ala Lys Gly Gln Pro
            675                 680                 685

Arg Glu Pro Gln Val Cys Thr Leu Pro Pro Ser Arg Asp Glu Leu Thr
690                 695                 700

Lys Asn Gln Val Ser Leu Ser Cys Ala Val Lys Gly Phe Tyr Pro Ser
705                 710                 715                 720

Asp Ile Ala Val Glu Trp Glu Ser Asn Gly Gln Pro Glu Asn Asn Tyr
                725                 730                 735

Lys Thr Thr Pro Pro Val Leu Asp Ser Asp Gly Ser Phe Phe Leu Val
            740                 745                 750

Ser Lys Leu Thr Val Asp Lys Ser Arg Trp Gln Gln Gly Asn Val Phe
            755                 760                 765

Ser Cys Ser Val Met His Glu Ala Leu His Asn His Tyr Thr Gln Lys
770                 775                 780

Ser Leu Ser Leu Ser Pro Gly Lys
785                 790

<210> SEQ ID NO 52
<211> LENGTH: 780
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 52
```

```
Met Ala His Thr Phe Arg Gly Cys Ser Leu Ala Phe Met Phe Ile Ile
1               5                   10                  15

Thr Trp Leu Leu Ile Lys Ala Lys Ile Asp Ala Cys Lys Arg Gly Asp
            20                  25                  30

Val Thr Val Lys Pro Ser His Val Ile Leu Leu Gly Ser Thr Val Asn
            35                  40                  45

Ile Thr Cys Ser Leu Lys Pro Arg Gln Gly Cys Phe His Tyr Ser Arg
50                  55                  60

Arg Asn Lys Leu Ile Leu Tyr Lys Phe Asp Arg Arg Ile Asn Phe His
65                  70                  75                  80

His Gly His Ser Leu Asn Ser Gln Val Thr Gly Leu Pro Leu Gly Thr
                85                  90                  95

Thr Leu Phe Val Cys Lys Leu Ala Cys Ile Asn Ser Asp Glu Ile Gln
            100                 105                 110

Ile Cys Gly Ala Glu Ile Phe Val Gly Val Ala Pro Glu Gln Pro Gln
            115                 120                 125

Asn Leu Ser Cys Ile Gln Lys Gly Glu Gln Gly Thr Val Ala Cys Thr
            130                 135                 140

Trp Glu Arg Gly Arg Asp Thr His Leu Tyr Thr Glu Tyr Thr Leu Gln
145                 150                 155                 160

Leu Ser Gly Pro Lys Asn Leu Thr Trp Gln Lys Gln Cys Lys Asp Ile
                165                 170                 175

Tyr Cys Asp Tyr Leu Asp Phe Gly Ile Asn Leu Thr Pro Glu Ser Pro
            180                 185                 190

Glu Ser Asn Phe Thr Ala Lys Val Thr Ala Val Asn Ser Leu Gly Ser
            195                 200                 205

Ser Ser Ser Leu Pro Ser Thr Phe Thr Phe Leu Asp Ile Val Arg Pro
210                 215                 220

Leu Pro Pro Trp Asp Ile Arg Ile Lys Phe Gln Lys Ala Ser Val Ser
225                 230                 235                 240

Arg Cys Thr Leu Tyr Trp Arg Asp Glu Gly Leu Val Leu Leu Asn Arg
            245                 250                 255

Leu Arg Tyr Arg Pro Ser Asn Ser Arg Leu Trp Asn Met Val Asn Val
            260                 265                 270

Thr Lys Ala Lys Gly Arg His Asp Leu Leu Asp Leu Lys Pro Phe Thr
275                 280                 285

Glu Tyr Glu Phe Gln Ile Ser Ser Lys Leu His Leu Tyr Lys Gly Ser
290                 295                 300

Trp Ser Asp Trp Ser Glu Ser Leu Arg Ala Gln Thr Pro Glu Glu Glu
305                 310                 315                 320

Pro Gly Gly Gly Ser Ser Gly Arg Ser Glu Asn Ile Arg Thr Ala
            325                 330                 335

Gly Gly Gly Gly Ser Arg Asn Leu Pro Val Ala Thr Pro Asp Pro Gly
            340                 345                 350

Met Phe Pro Cys Leu His His Ser Gln Asn Leu Leu Arg Ala Val Ser
            355                 360                 365

Asn Met Leu Gln Lys Ala Arg Gln Thr Leu Glu Phe Tyr Pro Cys Thr
370                 375                 380

Ser Glu Glu Ile Asp His Glu Asp Ile Thr Lys Asp Lys Thr Ser Thr
385                 390                 395                 400

Val Glu Ala Cys Leu Pro Leu Glu Leu Thr Lys Asn Glu Ser Cys Leu
            405                 410                 415
```

-continued

```
Asn Ser Arg Glu Thr Ser Phe Ile Thr Asn Gly Ser Cys Leu Ala Ser
                420                 425                 430

Arg Lys Thr Ser Phe Met Met Ala Leu Cys Leu Ser Ser Ile Tyr Glu
            435                 440                 445

Asp Leu Lys Met Tyr Gln Val Glu Phe Lys Thr Met Asn Ala Lys Leu
        450                 455                 460

Leu Met Asp Pro Lys Arg Gln Ile Phe Leu Asp Gln Asn Met Leu Ala
465                 470                 475                 480

Val Ile Asp Glu Leu Met Gln Ala Leu Asn Phe Asn Ser Glu Thr Val
                485                 490                 495

Pro Gln Lys Ser Ser Leu Glu Glu Pro Asp Phe Tyr Lys Thr Lys Ile
            500                 505                 510

Lys Leu Cys Ile Leu Leu His Ala Phe Arg Ile Arg Ala Val Thr Ile
        515                 520                 525

Asp Arg Val Met Ser Tyr Leu Asn Ala Ser Gly Gly Gly Ser Gly
        530                 535                 540

Gly Gly Gly Ser Gly Gly Gly Ser Asp Lys Thr His Thr Cys Pro
545                 550                 555                 560

Pro Cys Pro Ala Pro Glu Leu Leu Gly Gly Pro Ser Val Phe Leu Phe
                565                 570                 575

Pro Pro Lys Pro Lys Asp Thr Leu Met Ile Ser Arg Thr Pro Glu Val
            580                 585                 590

Thr Cys Val Val Val Asp Val Ser His Glu Asp Pro Glu Val Lys Phe
        595                 600                 605

Asn Trp Tyr Val Asp Gly Val Glu Val His Asn Ala Lys Thr Lys Pro
            610                 615                 620

Arg Glu Glu Gln Tyr Asn Ser Thr Tyr Arg Val Val Ser Val Leu Thr
625                 630                 635                 640

Val Leu His Gln Asp Trp Leu Asn Gly Lys Glu Tyr Lys Cys Lys Val
                645                 650                 655

Ser Asn Lys Ala Leu Pro Ala Pro Ile Glu Lys Thr Ile Ser Lys Ala
            660                 665                 670

Lys Gly Gln Pro Arg Glu Pro Gln Val Cys Thr Leu Pro Pro Ser Arg
        675                 680                 685

Asp Glu Leu Thr Lys Asn Gln Val Ser Leu Ser Cys Ala Val Lys Gly
        690                 695                 700

Phe Tyr Pro Ser Asp Ile Ala Val Glu Trp Glu Ser Asn Gly Gln Pro
705                 710                 715                 720

Glu Asn Asn Tyr Lys Thr Thr Pro Pro Val Leu Asp Ser Asp Gly Ser
                725                 730                 735

Phe Phe Leu Val Ser Lys Leu Thr Val Asp Lys Ser Arg Trp Gln Gln
            740                 745                 750

Gly Asn Val Phe Ser Cys Ser Val Met His Glu Ala Leu His Asn His
        755                 760                 765

Tyr Thr Gln Lys Ser Leu Ser Leu Ser Pro Gly Lys
        770                 775                 780

<210> SEQ ID NO 53
<211> LENGTH: 10
<212> TYPE: PRT
<213> ORGANISM: Artificial Sequence
```

-continued

```
<220> FEATURE:
<223> OTHER INFORMATION: Description of Artificial Sequence: Synthetic
      peptide

<400> SEQUENCE: 53

Ser Gly Arg Ser Glu Asn Ile Arg Thr Ala
1               5                   10
```